United States Patent [19]

Dilella

[11] Patent Number: 4,680,803
[45] Date of Patent: Jul. 14, 1987

[54] METHOD AND APPARATUS FOR ISOLATING IMAGE DATA FOR CHARACTER RECOGNITION

[75] Inventor: Antonio Dilella, Waterloo, Canada

[73] Assignee: NCR Corporation, Dayton, Ohio

[21] Appl. No.: 683,074

[22] Filed: Dec. 17, 1984

[51] Int. Cl.[4] .............................................. G06K 9/34
[52] U.S. Cl. .......................................... 382/9; 382/21
[58] Field of Search ............................ 382/8, 48, 21, 9

[56] References Cited

U.S. PATENT DOCUMENTS

| | | | |
|---|---|---|---|
| 3,500,324 | 3/1970 | Gorbatenko et al. | 340/146.3 |
| 3,500,325 | 3/1970 | Greanias et al. | 340/146.3 |
| 3,517,387 | 6/1970 | Andrews et al. | 340/146.3 |
| 3,629,826 | 12/1971 | Catala et al. | 340/146.3 |
| 3,694,807 | 9/1972 | Bond et al. | 340/146.3 |
| 3,863,218 | 1/1975 | Oka et al. | 382/21 |
| 4,013,999 | 3/1977 | Erwin et al. | 382/48 |
| 4,024,500 | 5/1977 | Herbst et al. | 340/146.3 |
| 4,461,027 | 7/1984 | Ikeda et al. | 382/9 |

OTHER PUBLICATIONS

IBM Technical Disclosure Bulletin, vol. 15, No. 12, May 1973, pp. 3879-3883, "Line/Symbol Separation for Raster Image Processing", Nolan, B. E.

Primary Examiner—Leo H. Boudreau
Assistant Examiner—Jacqueline Todd
Attorney, Agent, or Firm—Wilbert Hawk, Jr.; Albert L. Sessler, Jr.; Elmer Wargo

[57] ABSTRACT

A banking system in which this invention is used is disclosed. The system includes an imaging device which produces digitized image data of one side of documents, like checks, as they are moved along a document transporter. The system is designed to read, automatically, the "courtesy" or monetary amount of the documents from the digitized image data. Handwritten, courtesy amounts which have touching or overlapping characters or numbers must be separated or segmented prior to being subjected to character recognition. According to this invention, the digitized data is processed to "single out" image data which ostensibly contains data for more than one character. Special window "masks" are used to examine the image data (which is binary) to search for a potential joint between the "two characters". When the potential joint is found, potential segmentation vectors at different angles are examined to determine the preferred segmentation vector. The image data for more than one character is divided along the preferred segmentation vector and the divided image data is later subjected to character recognition.

8 Claims, 22 Drawing Figures

212

214

216

218

SEGMENTATION VECTORS

METHOD AND APPARATUS FOR ISOLATING IMAGE DATA FOR CHARACTER RECOGNITION

This application is related to Application Ser. No. 452,563 entitled "Banking System and Method" which was filed on Dec. 23, 1982 and which is assigned to the same assignee as is this application.

BACKGROUND OF THE INVENTION

This invention relates to a method and apparatus for segmenting image data associated with two characters, for example, so as to present the segmented image data to character recognition apparatus to effect machine character recognition.

In the continuing trend to automate business operations, like banking operations, for example, there have been efforts to read, automatically, machine and handwritten data. In banking operations, for example, efforts have been made to machine read handwritten "courtesy" or monetary amounts on documents, like checks. One of the problems in this regard is that individuals do not always write the numbers for monetary amounts in regularly-spaced areas without overlapping or touching adjacent numbers. While touching or overlapping numbers on a document can be read routinely by a human operator, such numbers cannot be read accurately by character recognition apparatus.

In the named co-pending application, there is disclosed a system for automatically reading the courtesy or monetary amount of a check from its associated digitized image. The present invention is useful in such a system.

SUMMARY OF THE INVENTION

An object of this invention is to provide a relatively simple and low-cost method and apparatus for processing image data associated with characters so as to facilitate character recognition.

In one aspect of the invention, there is disclosed a process of segmenting data bits derived in response to scanning characters, comprising the steps of: (a) isolating a discrete group of said data bits which may be associated with more than one character; (b) examining said discrete group of data bits according to predetermined criteria in search for a possible joint between first and second groups of data bits within said group; (c) selecting a segmentation vector according to second predetermined criteria to separate said first and second groups of data bits; and (d) separating said first and second groups of data bits at said joint along a selected said segmentation vector.

In another aspect of the invention there is disclosed an apparatus for facilitating character recognition, comprising: means for receiving image data bits derived in response to scanning characters; means for isolating a discrete group of said data bits which may be associated with more than one character; means for examining said discrete group of data bits according to predetermined criteria in search for a possible joint between first and second groups of data bits within said group; means for selecting a segmentation vector according to second predetermined criteria to separate said first and second groups of data bits; means for separating said first and second groups of data bits at said joint along a selected said segmentation vector; means for recognizing characters; and means for forwarding said first and second groups of data bits to said recognizing means to effect character recogntion.

Other aspects and the advantages of this invention will become more readily understood in connection with the following specification, claims, and drawing.

DETAILED DESCRIPTION OF THE INVENTION

Figure 1:
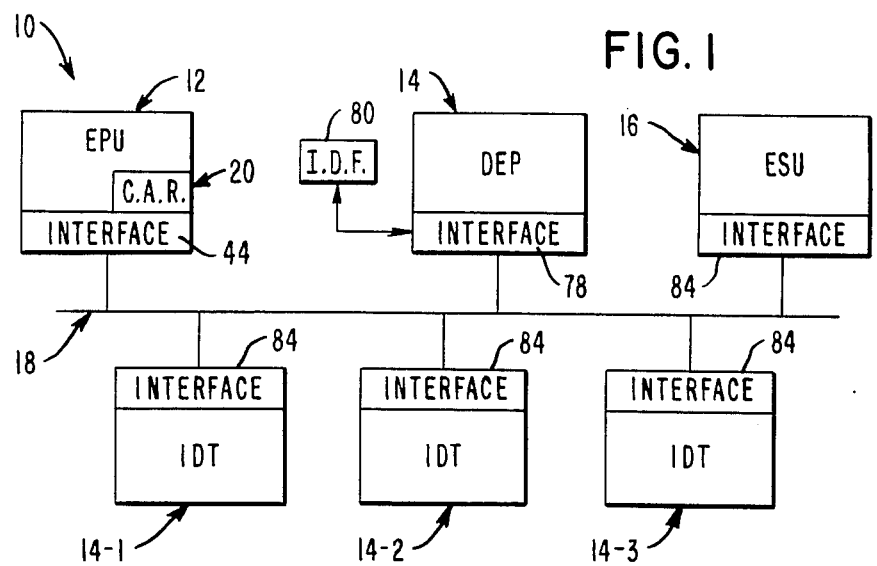
FIG. 1 is a general schematic diagram, in block form, of a banking system, showing an entry processing unit (EPU) including a courtesy amount recognition (C.A.R.) module, data entry processor (DEP) with its associated image display terminals (IDT), and an encode and sort unit (ESU) which are all interconnected by a local area network.

FIG. 1 is a general schematic diagram, in block form, of a banking system which is designated generally as system 10. The system 10 includes an entry processing unit (EPU) 12, a data entry processor (DEP) 14 with its associated image display terminals (IDT) 14-1, 14-2, and 14-3, and an encode and sort unit (ESU) 16 which are all interconnected by a conventional, local-area network 18 as shown.

In general, the function of the EPU 12 is to receive documents such as checks and deposit slips, for example, and mechanically read certain data from the documents which are processed in batches of about 200–300 documents per batch. The EPU 12 includes a courtesy amount reader (C.A.R.) module 20 in which this invention is incorporated. The DEP 14, along with the IDTs 14-1, 14-2, and 14-3, in general, perform the function of using the output of the EPU and completing the data not mechanically read at the EPU 12, correcting misread data where necessary, and performing certain banking procedures such as proofing and reconciliation, for example. The ESU 16, in general, receives the completed data for a batch of documents from the DEP 14 and encodes the corresponding courtesy or monetary amount for a document on the associated document such as a check or deposit slip as it moves through the ESU 16. Certain other functions such as stamping, endorsing and microfilming are performed at the ESU 16 prior to having the documents sorted into various sorting pockets according to the bank's sorting instructions.

Figure 2:
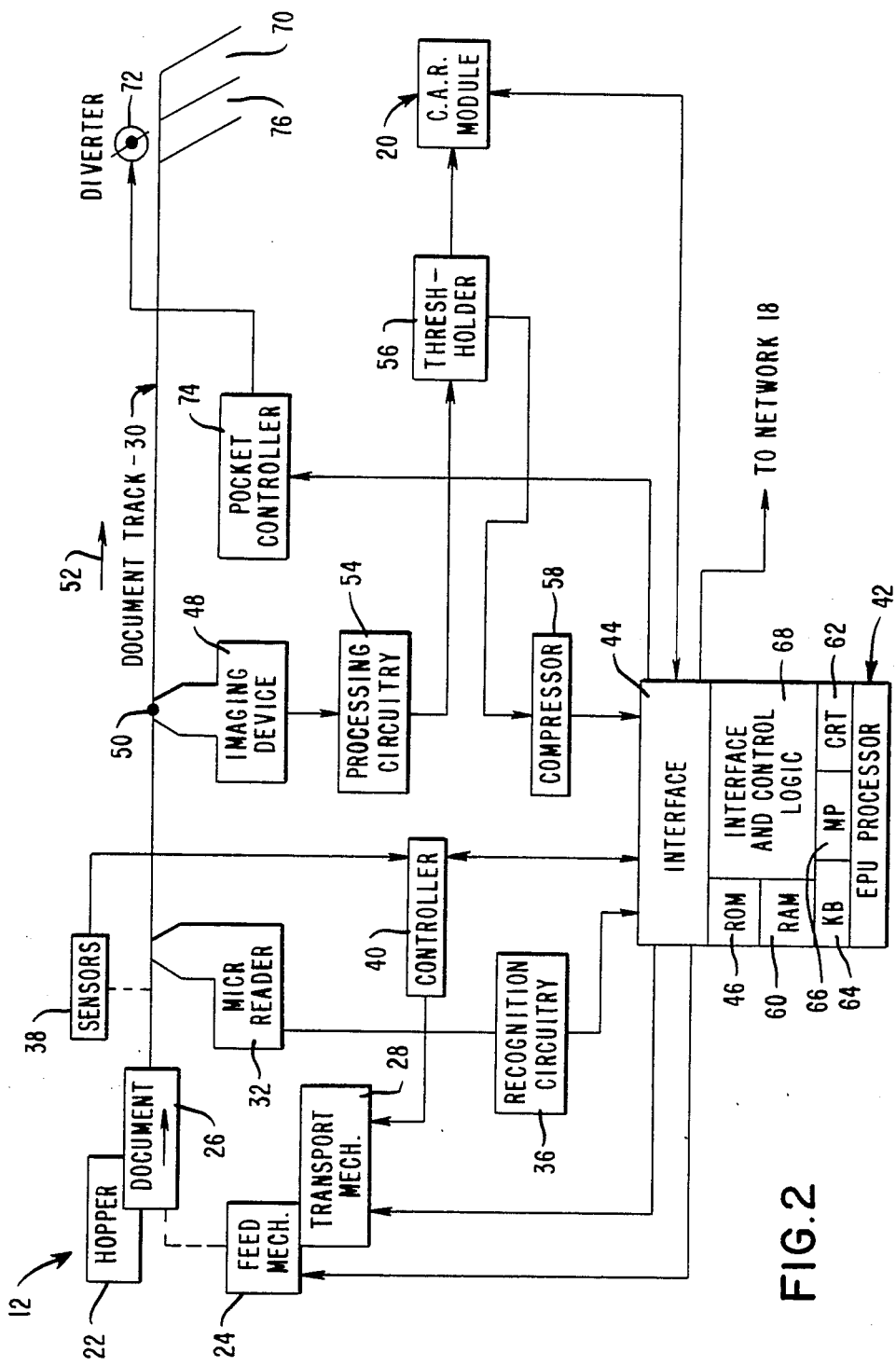
FIG. 2 is a schematic diagram, in block form, showing more details of the EPU shown in FIG. 1 and the C.A.R. module which contains a preferred embodiment of this invention.

The EPU 12 is shown in more detail in FIG. 2, and it has a general construction which is similar to a reader/sorter which is used to process documents such as checks and deposit slips, for example, in "batches" as previously described herein.

A batch of such documents is placed in a stacker or hopper 22 (FIG. 2), and a conventional feed mechanism 24 is used to pick a document 26 from the hopper 22, and thereafter, a conventional transport mechanism 28 moves the document 26 along the document track 30 at a constant velocity and at a rate of 200 documents per minute in the embodiment described.

As each document 26 is moved along the track 30, it is brought into operative, reading relationship with a conventional, magnetic ink character recognition (MICR) reader 32. The MICR reader 32 is positioned along the track 30 so as to read the MICR line 34 (FIG. 3) on the document 26 as the document 26 is moved thereby. The MICR line 34 contains, for example, the identification of the associated bank number (transit routing number), customer's account number, and check number. The output of the MICR reader 32 is fed into conventional recognition circuitry 36 which interprets the data read.

There are sensors designated collectively as 38, for example, which are positioned along the track 30 (FIG. 2) to check on the status of each of the documents as it is moved along the track 30. The sensors 38 are coupled to a conventional controller 40 which may include a microprocessor (not shown) to perform the routine tasks associated with moving documents along the track, such tasks as controlling the feed mechanism 24 and the transport mechanism 28, for example. The controller 40 is coupled to the EPU processor 42 (FIG. 2) via the interface 44.

Continuing with the example being described, when the sensors 38 (FIG. 2) indicate that a document 26 approaches the MICR reader 32, the EPU processor 42 receives this notification from the controller 40 as just described, and the EPU processor 42 assigns a document reference number (DRN) to the data associated with the document 24 to be read by the MICR reader 32. This DRN is unique for each document and will be used by the system 10 to identify the various data associated with a document 24 and to facilitate the processing of the documents in the system 10. The MICR data from the MICR reader 32 is processed by the recognition circuitry 36. Typical MICR data such as bank number, customer account number, and check number, for example, coming from the recognition circuitry 36 pass through the interface 44 to the random access memory (RAM) 60 of the EPU processor 42 where it is stored therein according to the now-available DRN.

After a document 26 is read by the MICR reader 32, it is moved into operative relationship with a conventional imaging device 48 (FIG. 2) which is positioned along the document track 30.

The imaging device 48 is conventional and in normal operation, the document 26 is moved on its lower, long edge, with the front of the document 26 facing the imaging device 48 as it is moved thereby.

As a document 26 is moved past a vertical scanning line (shown as a dot 50 in FIG. 2), the right-most edge of the document 26 (as viewed in FIG. 3) is illuminated by sources of light (not shown), and light reflected therefrom is focused by a suitable lens system (not shown) on to the imaging sensor array included in the imaging device 48. In the embodiment described, the sensor array may be of a type which produces a fixed number of picture elements or pixels along the scanning line 50. One such array, such as RL-1024B, which is manufactured by Reticon Corporation, for example, produces 1024 pixels along the scanning line 50, although only 640 pixels are utilized to meet the resolution requirements of the embodiment described herein. As the document 26 (FIG. 2) is moved in the downstream direction shown by arrow 52, a new area of the document is presented to the scanning line 50, and a new set of 640 pixels is produced. Each pixel from the sensor array has an associated analog, gray-scale value which is converted or digitized by the processing circuitry 54 to produce, for example, a six bit byte of data for each pixel, thereby recording 64 shades of gray ranging from white to black. The 64 shades of gray may be reduced, for example, to two shades, i.e., either black or white, by the processing circuitry 54. As the scans are completed, a stream of bytes or bits of data is issued from the processing circuitry 54. Because this aspect is conventional, it need not be described in any further detail.

The stream of data or pixels from the scanning line 50 (FIG. 2) of the "image" of a document 26 is further processed by having the output of the processing circuitry 54 fed into a high pass filter/thresholder 56 (FIG. 2), hereinafter called thresholder 56, whose output, in turn, is fed into a compressor 58. The thresholder 56 is conventional and is a circuit which is used to eliminate unnecessary background information and to make the pertinent data stand out from background information, for example. The compressor 58 is a conventional circuit which receives the binary data from the thresholder 56 and eliminates that data which is "redundant" and thereby "compresses" the binary data to produce compressed, digitized-image data which reduces the amount of transmission time necessary to transmit the data associated with an image of a document 26 and which also reduces memory storage requirements. The output of the compressor 58 is fed via the interface 44 to the RAM 60 of the EPU processor 42, where this image data associated with a document 26 is stored temporarily by its associated DRN. As an optional feature, a second imaging device and associated circuitry (not shown) may be used to image the rear of a document 26 as described herein.

The EPU processor 42 (FIG. 2) includes the interface 44 already mentioned, the ROM 46, the RAM 60, a display such as a cathode ray tube (CRT) 62, a keyboard (KB) 64, a processor (MP) 66 and interface and control logic 68. The processing routines associated with the EPU processor 42 may reside in the ROM 46; however, the routines are loaded, more typically in the RAM 60 from disc or tape storage (not shown), for example, as part of a conventional start-up procedure. The CRT 62 is used to provide communication with an operator who uses the KB 64 to enter data or instructions. The interface and control logic 68 provides the interconnections among the various components of the processor 42 to enable it to function, conventionally, as an "intelligent" application processor. The form of the processor 42 shown in FIG. 2 is utilized to portray the various functions performed thereby, and the actual form of the processor 42 may be different.

Continuing with the movement of a document 24 along the document track 30, after a document 24 passes the imaging device 48 (FIG. 2), it is moved into operative relationship with a conventional printer (not shown) which prints the DRN on the front of the associated document 26. The DRN was assigned earlier by the EPU processor 42. Various other conventional elements such as an endorser, and microfilmers, (not shown) are positioned along the track 30 in operative relationship with each document 26 passing thereby.

Normally, the documents 26 (FIG. 2) are processed in a batch, as previously described, and after microfilming and endorsing, they are diverted sequentially into a single pocket 70 by a diverter 72 which is controlled by a pocket controller 74 which is coupled to the EPU processor 42 via the interface 44. If the processor 42 wishes to single out one or more documents 26 (for various processing reasons) at this point, the processor 42 then sends out the appropriate instruction to the pocket controller 74 which causes the affected documents to be diverted into the reject pocket 76.

As the documents 26 are moved, sequentially, past the imaging device 50 (FIG. 2), the associated image data is processed, enhanced, filtered, and compressed as previously described, and the compressed, image data for each document is buffered in the RAM 60. The DRN associated with the compressed image data is combined therewith, and this compressed, image data is immediately transferred out of the EPU processor 42 via its interface 44 over the network 18 to the DEP 14 (FIG. 1) via its interface 78. The DEP 14 then immediately transfers the compressed, image data via the interface 78 to an image disc file (I.D.F.) 80 where it is stored by the associated DRN. Because the documents 24 are processed in batches of about 200–300 per batch, for example, a batch header card may be used to identify each batch of documents being processed. The batch header card is the first document to be processed in the associated batch and a batch number associated with the header card may be used to identify the various document data associated with that batch of documents. In this regard, the compressed, image data in the image disc file 80 may be arranged by DRN within a batch number to facilitate the accessing thereof.

The image data derived from the imaging device 48 (FIG. 2) is also utilized to perform machine character recognition to ascertain the courtesy amount on the documents 24 being processed. The image data coming from the thresholder 56 (prior to compression) is fed into a courtesy amount recognition (C.A.R.) module 82 where courtesy amount recognition is performed.

Figure 3:
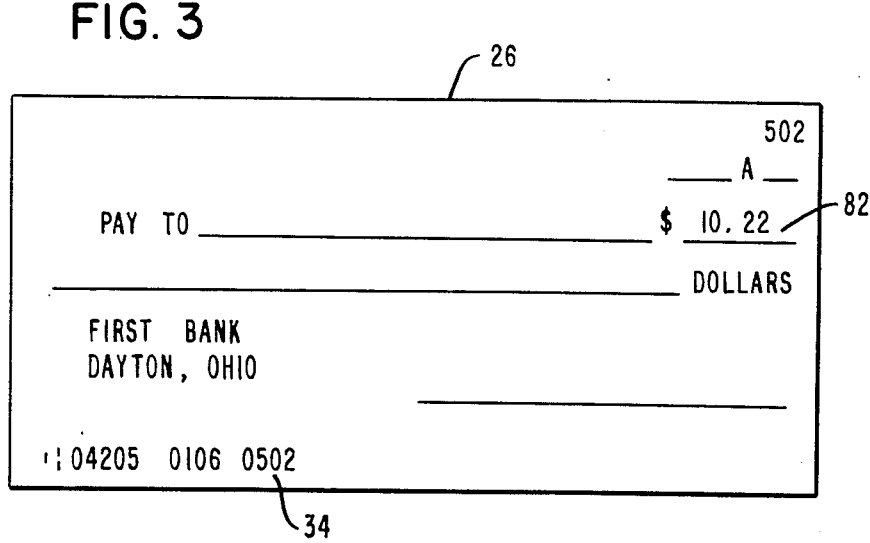
FIG. 3 shows an example of a document which is processed by the system shown in FIG. 1.

The function of the C.A.R. module 20 (FIG. 2) is to perform automatic reading of the courtesy amount shown by reference numeral 82 in FIG. 3. The courtesy amount is the monetary amount of a check, which amount is written or printed in numerical form. The C.A.R. module 82 attempts to read the monetary amount 82 of each document 26 as it is moved along the document track past the imaging device 48. The output from the C.A.R. module 20 includes the monetary amount read along with a confidence level for each of the numbers read. For example, if a particular number of the monetary amount 82 cannot be automatically read at all, a confidence level of "0" may be applied to that particular number or digit. Correspondingly, if there is a high degree of confidence that a particular digit of the monetary amount 82 is read correctly, a confidence level of "9" may be applied to that particular number or digit. The numbers processed by the C.A.R. module 20 along with their associated confidence levels are routed to the EPU processor 42, from where they are routed to the DEP 14 for further processing as previously described. The IDT's 14-1, 14-2 and 14-3, and the ESU 16 are coupled to the local area network 18 via conventional interfaces 84 to provide conventional coupling among these named elements.

Figure 4:
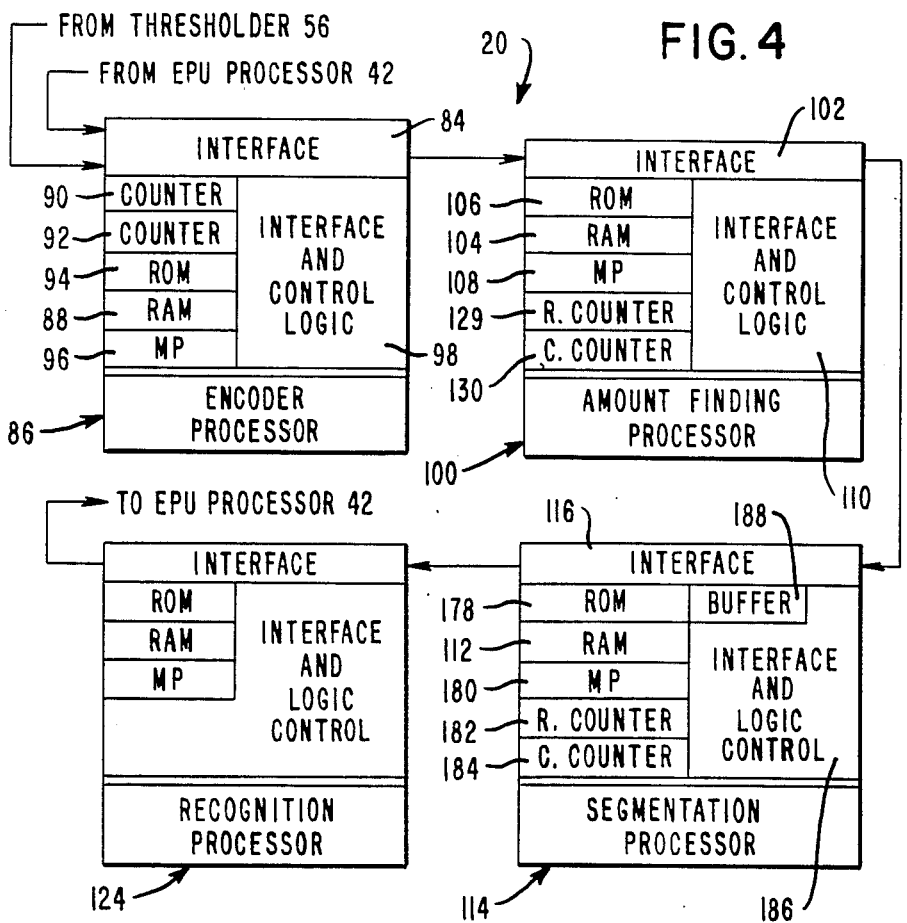
FIG. 4 is a schematic diagram showing additional details of the C.A.R. module shown in Fig. 2.
Figure 5:
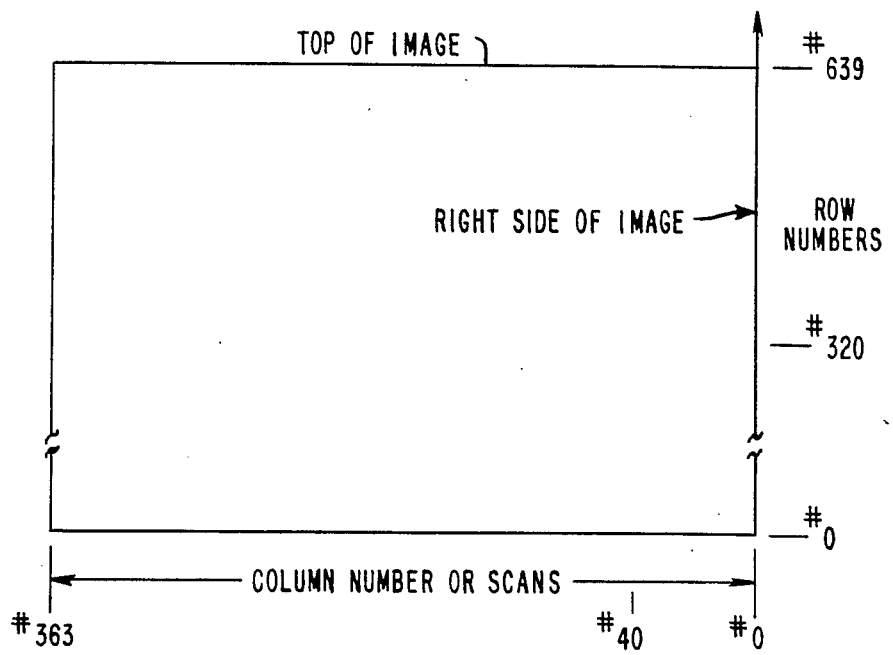
FIG. 5 is a diagrammatic showing of the various rows and columns of pixels comprising image data for the embodiment described.

The C.A.R. module 20, shown in FIG. 2, is shown in more detail in FIG. 4. To perform automatic courtesy amount reading, the C.A.R. module 20 receives the binary image data (about a document 26) coming from the thresholder 56. It should be recalled that the data from the thresholder 56 comprises a stream of binary "ones" and "zeros", and this data stream is fed through the interface 84 of an encoder processor 86, and is stored in the associated RAM 88. One of the sensors 38 (FIG. 2) is utilized to indicate the start of data for a new document 26 and this fact is utilized by the encoder processor 86 to initialize the counters 90 and 92. Counter 90 is used to count the number of pixels in a scan and counter 92 is used to count the number of scans associated with an image as shown in FIG. 5. In the embodiment described, there are 640 pixels in each scan ranging from row #0 through row #639 to handle documents 26 which are about four inches high. Counter 90 may be placed in a downcounting mode to facilitate having the bottom of the document referenced as #0. In the embodiment described, 364 scans are used to cover the portion of the document 26 where the monetary amount 82 is located. The encoder processor 86 is conventional, and it includes a ROM 94, a MP 96, and interface and control logic 98. The necessary instructions for operating the processor 86 may be stored in the ROM 94, or most likely, they are loaded daily into the RAM 88 as part of the normal start up procedure. In some situations, it may be desirable to encode the stream of data bits coming from the thresholder 56 so as to minimize memory requirements and processing time by the system 10. One encoding technique which may be used is the typical "run-length" encoding. Because this aspect is not important to an understanding of the present invention, it need not be described in any further detail.

Either the full matrix of data or the encoded data (if encoded by encoder processor 86 (FIG. 4) is transferred to the amount finding processor 100 via the interfaces 84 and 102 and is stored in the RAM 104 of the processor 100. The amount finding processor 100 is conventional and includes, also, a ROM 106, MP 108, and interface and control logic 110. The function of the amount finding processor 100 is to pick out the image data that is associated with courtesy or monetary amount 82 and to transfer this image data to the RAM 112 of the segmentation processor 114 via the interface 116. The techniques for picking out the image data associated with the monetary amount 82 may be conventional. If the image data were encoded at the encoder processor 86, it would be decoded at the amount finding processor 100 prior to being forwarded to the segmentation processor 114.

Figure 6:
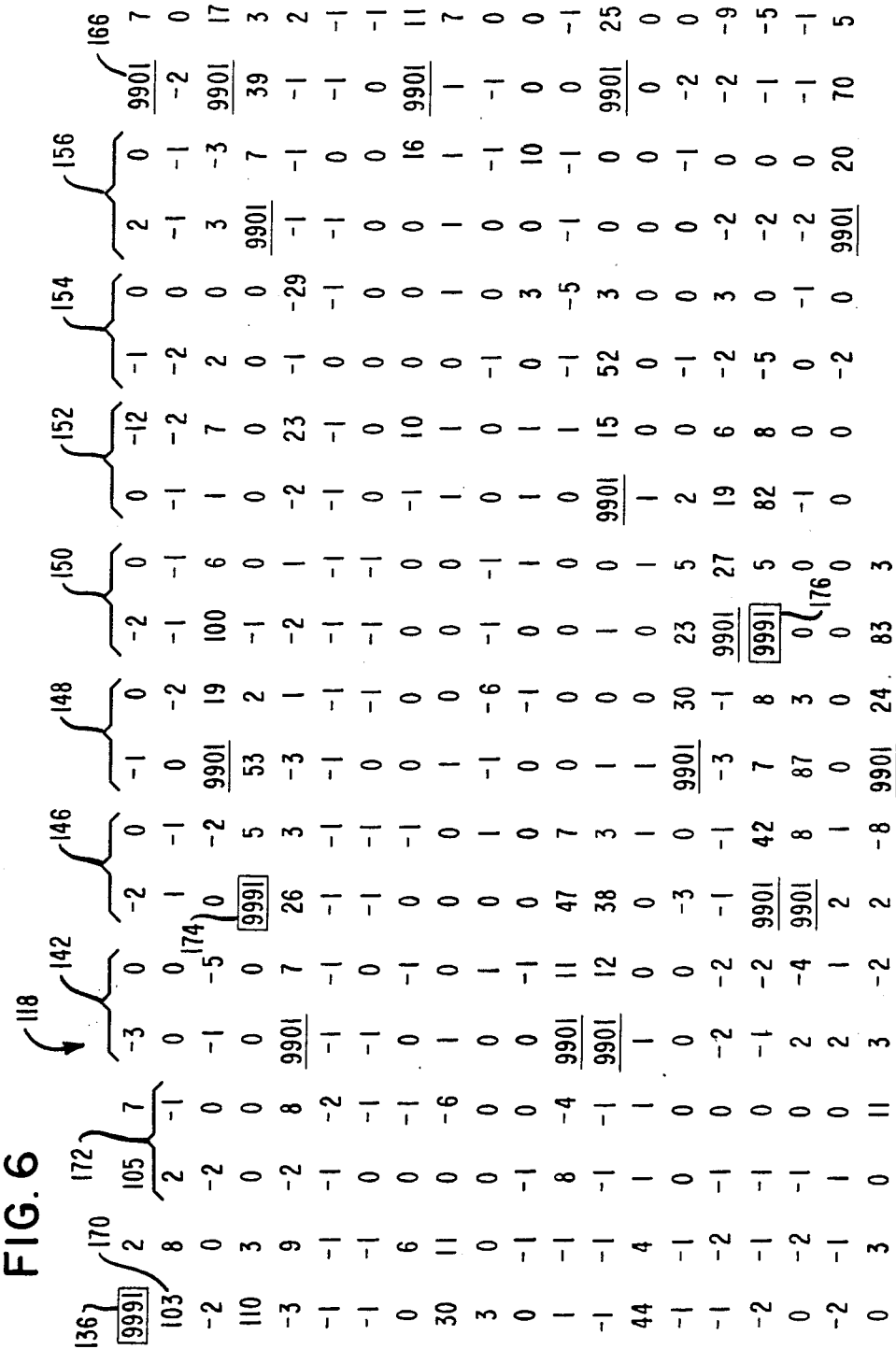
FIG. 6 is a chart showing how image data associated with a monetary amount is received by the segmentation processor shown in FIG. 4.
Figure 7A:
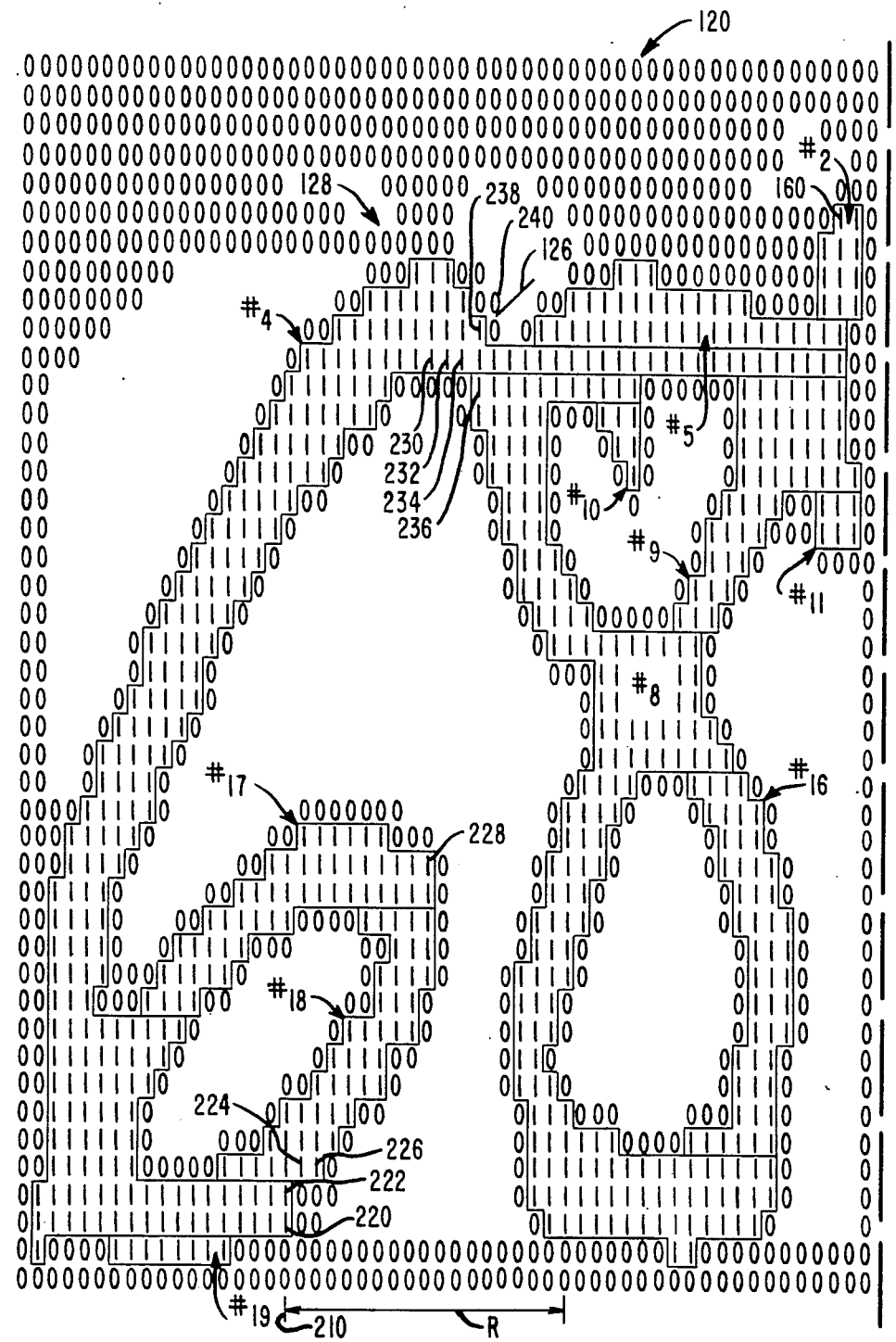
FIGS. 7A and 7B taken together represent a schematic diagram of the image data associated with the monetary amount on a document.
Figure 7B:
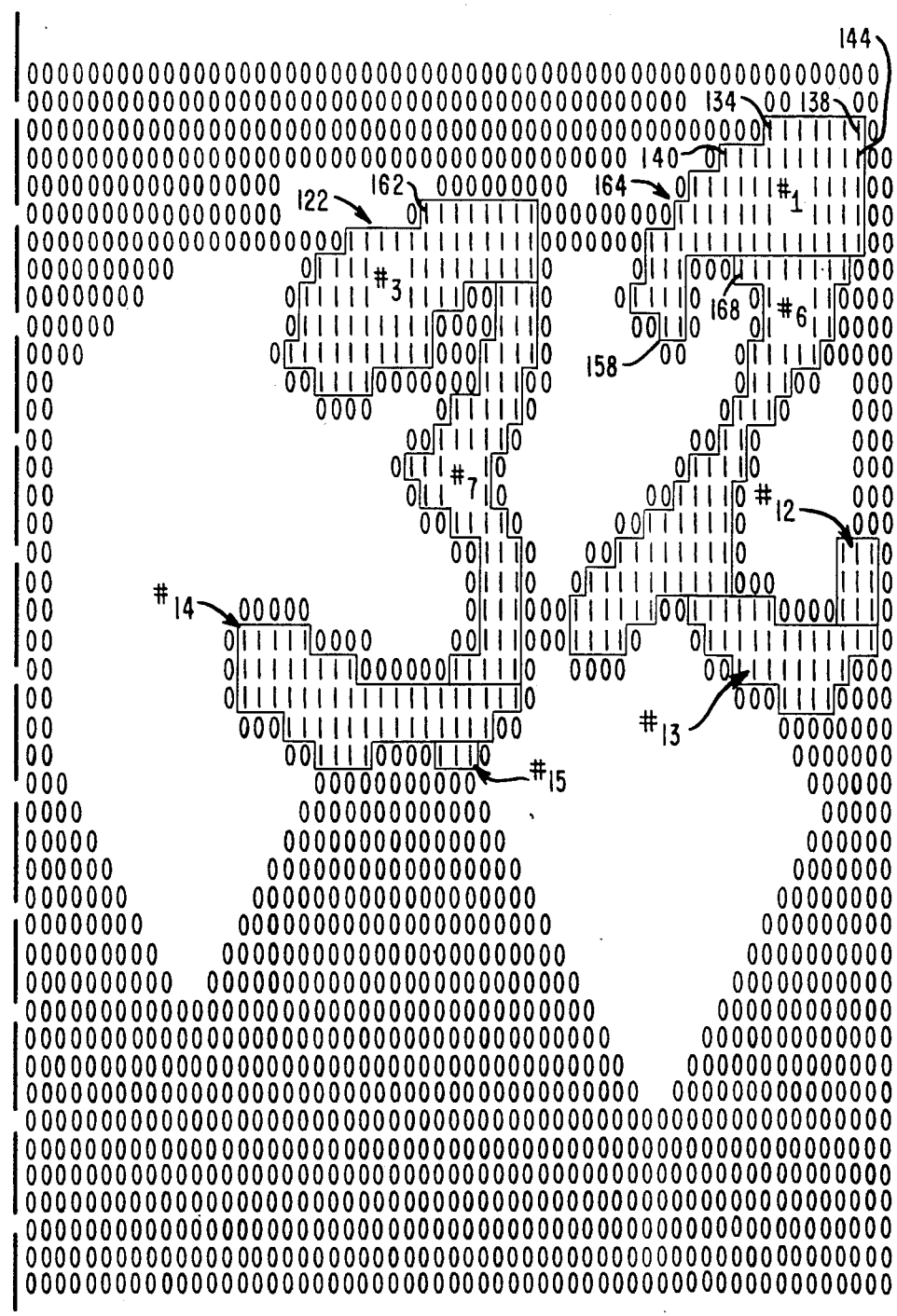

The image data associated with the monetary amount 82 is in the format shown in FIG. 6 when it is forwarded to the segmentation processor 114 from the amount finding processor 100 as previously mentioned. The chart 118 (FIG. 6) represents the encoding of the image data associated with a courtesy or monetary amount 82 on a document 26, and the encoding of chart 118 corresponds to the image data designated generally as 120 and as shown in FIGS. 7A and 7B. In the example described, the image data 120 consists of binary "zeros" and "ones", with a binary "zero" corresponding to a white pixel, and with a binary "one" corresponding to a black pixel. The binary "ones" are enclosed in solid lines to group together those black pixels which form a record associated with an object. A record as used herein means a collection of binary ones forming a discrete area, and an object may be comprised of several related records. For example, the records marked "3", "7", "14", and "15" in FIG. 7B comprise an object which is designated generally as 122. The object 122 appears to be the numeral "3", and all the image data 120 in FIGS. 7A and 7B comprises the courtesy or monetary amount coming from the amount finding processor 100. The function of the segmentation processor 114 (FIG. 4) is to analyze the encoded data as presented in chart 118 (FIG. 6) and separate those records which should be separated so as to facilitate character recognition by the recognition processor 124 shown in FIG. 4. For example record #4 should be separated from record #8 in FIG. 7A along the line 126 to facilitate the reading of the apparent "6" and "8" which make up the combined object 128. A feature of this invention is that when the image data 120 shown in FIGS. 7A and 7B is presented in the form shown in chart 118 (FIG. 6), the records and objects shown therein can be separated quite readily to facilitate character recognition at a subsequent operation.

It should be recalled that when the amount finding processor 100 (FIG. 4) finds the monetary amount 82 (FIG. 3), the associated image data 120 (FIGS. 7A and 7B) consist of about 150 columns of data which are about 50 rows high as discussed in relation to FIG. 5. The amount finding processor 100 has a row (R) counter 129 and a column (C) counter 130 for counting various row and column positions to be discussed hereinafter.

Some additional points need explanation prior to discussing the encoding technique associated with FIGS. 7A and 7B. Basically, the encoding technique used is simple run-length encoding. In the embodiment described, the image data 120 is examined along rows although the image data could be examined along columns; all that is needed is consistency in this regard. When the image data 120 (FIGS. 7A and 7B) for the monetary amount 82 is received, the absolute row and column numbers shown in FIG. 5 are not used; for convenience, the top row may be numbered zero and the left-most column in FIG. 7A is also numbered zero, for example. For the run-length encoding used, scanning (in search for black pixels) is done by starting at the top row in FIGS. 7A and 7B and proceeding from left to right as viewed in FIGS. 7A and 7B. After the top row is scanned, the scanning is performed on the next lower row while starting at the left side thereof and while proceeding again from left to right.

The encoding technique embodied in the chart 118 shown in FIG. 6 proceeds as follows. The top row (row #0) in FIGS. 7A and 7B is scanned from left to right in search for black pixels which are designated as "1"s. The next row (row #1) is also scanned from left to right and no black pixels are found. Again, the next row (row #2) is also scanned from left to right and the first black pixel encountered is marked 134 (FIG. 7B). In the example described, the column position for this pixel 134 is obtained from the C counter 130 (FIG. 4); this counter is reset to zero when the right-most column (as viewed in FIG. 7B) is reached in the scanning or examining process. Black pixel 134 is the first black pixel encountered by the scanning technique mentioned, and accordingly, the record with which pixel 134 is associated is referred to as record #1. The length of the run of black pixels in row 2 is seven prior to a white pixel being encountered. This means that the length of record #1 in row #2 is seven black pixels long. When the last column for the image data is reached, the C counter 130 is reset to zero and the R counter 129 is incremented by one.

This data just obtained from row #2 (FIGS. 7A and 7B) is recorded or encoded in the chart 118 (FIG. 6) as follows. A number such as 9991 that is enclosed in the rectangle 136 is used to indicate the start of a new character or object. The number 9991 and the other numbers shown in FIG. 6 are entered in the RAM 104 of the amount finding processor 100. In the embodiment described, a sixteen bit word is used for each of the entries to be made. The entries are entered into the RAM 104 as a single dimension memory; this aspect will be discussed hereinafter. The next entry after the 9991 in rectangle 136 is a "2" which stands for row "2". The next entry in chart 118 is "105" which stands for the column 105 in which the first black pixel 134 is encountered; this is column 105 counting from the left side of FIG. 7A. The next number which is "7" refers to the number of black pixels which exist in a row containing the first black pixel 134. The length of the row of black pixels starting from black pixel 134 and ending with black pixel 138 is obtained by using the counts from the C counter 130 (FIG. 4). Thus, the first row for record #1 is established at row 2, starting at column 105, and extending for 7 columns wide. The next scan relates to row 3, and the first black pixel encountered in this row is pixel 140 (FIG. 7B).

The method for recording these subsequent scans is to record a run's "growth" as compared to the prior run associated with that record. For example, the run starting with black pixel 134 (FIG. 7B) is seven black pixels long. The next run that starts with black pixel 140 starts at column 102 compared to column 105 for black pixel 134. This means that the row starting with black pixel 140 starts three columns before the row beginning with black pixel 134; accordingly a (−3) is entered in the next position in the chart 118. This (−3) is included under bracket 142. The last black pixel 144 in the row starting with black pixel 140 ends in the same column as does black pixel 138; accordingly, the record growth is (0), and the number 0 is placed on the right side under bracket 142. The remaining pairs of entries included in the brackets 146, 148, 150, 152, 154, and 156 show how the subsequent rows for record #1 are recorded. The entries included in bracket 156 (Fig. 6) relate to the row beginning with black pixel 158. The number 9901 on the first line of FIG. 6 is used to indicate the start of a new record which is associated with an object. In this case, this number 9901 relates to record #6.

A point should be made at this portion of the description relative to the encoding represented by FIG. 6. It should be recalled that the scanning to search for black pixels was done on a row basis while searching from left to right as viewed in FIGS. 7A and 7B. The assignment of record numbers is also done from left to right while proceeding from the top row to the bottom row shown in FIGS. 7A and 7B. When scanning along row 5, a black pixel 160 is encountered. This black pixel is part of record #2. When proceeding further to the right along the fifth row, the next black pixel encountered (after a white pixel) is black pixel 162 which represents the start of record #3. Normally, the data for record #2 is entered before the data for record #6; however, the chart 118 in FIG. 6 represents the final memory arrangement in RAM 104 after several manipulations of data (when necessary) are performed. For example while the data for records #2 and #3 are entered prior to record #6, for example, record #6 is positioned in memory after record #1. This is done as to have all records associated with an object grouped together. A general rule is that all the records associated with a particular object are grouped, ultimately, with the first record encountered (by the scanning technique mentioned) for that object. In this regard, record #6 is grouped with record #1 because record #1 is the first record encountered by the scanning technique mentioned for the object 164 which includes records #1, #6, #12, and #13. Accordingly, the entry 9901 (shown by reference number 166 in FIG. 6) refers to record #6.

Continuing with the new record #6 indicated by reference numeral 166 (FIG. 6), the next number "7" refers to the row number in which record #6 starts (via black pixel 168 in FIG. 7B), and the number 103, shown by reference numeral 170, indicates the column number at which record #6 starts. The next entry on the same line as number 103 represents the "run length" or the number of black pixels for this record in row 7, and the "run length" is "8". The next two numbers "2" and "−1" that are included in bracket 172 represent the record growth for row 8 of record #6 by the technique previously applied.

The next new object which appears in the chart 118 in FIG. 6 relates to object 128 which is shown in FIG. 7A. The first record encountered for object 128 is record #2, and accordingly, the new object code "9991" that is referenced by numeral 174 in FIG. 6 refers to record #2 shown in FIG. 7A. Similarly, the next object which appears in chart 118 in FIG. 6 relates to object 122 (FIG. 7B). The first record encountered for object 122 is record #3, and accordingly, the new object code "9991" that is referenced by numeral 176 in FIG. 6 refers to record #3 shown in FIG. 7B.

As previously stated, records associated with an object are recorded by the first record encountered (by the scanning technique mentioned) for that object. In this regard, the records shown in FIGS. 7A and 7B are encoded and presented by the arrangement shown in chart #118 (FIG. 6). The order of presentation of records associated with the various objects shown in FIGS. 7A and 7B is as follows:

Records 1, 2, and 3 in FIGS. 7A and 7B are the first records associated with objects 164, 128, and 122, respectively. For object 164, records #6, #12, and #13 are also associated therewith; a shorthand way of expressing this relationship is by the expression:

1, 6(1), 12(1), 13(1).

Similarly, those records associated with the second object 128 are:

2, 5(2), 4(2), 8(2), 9(2), 10(2), 11(2), . . . . . . 16(2), 18(2), 17(2), 19(2).

Finally, those records associated with the third object 122 are:

3, 7(3), 14(3), 15(3).

Some additional comments with regard to FIGS. 6, 7A, and 7B appear appropriate. The portion of the RAM 104 (FIG. 4) associated with the amount finding processor 100 is arranged as a serial memory with each word being comprised of sixteen bits in the embodiment described. Anytime a new record is formed, its associated column and row positions are determined. Pointers are used to indicate where all the data is located in the RAM 104. If, for example, at the end of accumulating data for the objects shown in FIGS. 7A and 7B, the processor 100 finds that record #13 is associated with record #1 of object 164, and the processor 100 also finds that four bytes of data are required to record the data associated with record #13, then the following takes place. The data in the RAM 104 is examined until the last record for object #1 (or object 164 in FIG. 7B) is obtained, and when this last record is found, all the remaining records (like the entries in FIG. 6) are "shifted down" by four word positions to make room for the four bytes of data associated with record #13 which are entered into the just-cleared, word positions in the RAM 104.

The arrangement of data in the chart 118 in FIG. 6 facilitates the reconstruction of data. For example, when it is desired to reconstruct image 164 in FIGS. 7A and 7B from the records or encoding shown in FIG. 6, the data on the first line of FIG. 6 is read serially, beginning with the start of new object code 9991 that is referenced by numeral 136 and ending with the start of new object code 9991 that is referenced by numeral 174 in FIG. 6. This data is built up according to the + and − designations for record growth or contraction as previously described; these designations are shown within the brackets 142 and 172, for example.

To summarize, the encoding which is shown in chart 118 in FIG. 6 produces the matrix of image data 120 shown in FIGS. 7A and 7B. The encoding mentioned is handled by the amount finding processor 100 shown in FIG. 4. By this encoding, the ability to separate the objects 164, 122, and 128 or their associated records #1–#19 is facilitated. The image data shown in FIGS. 7A and 7B is then subjected to segmentation (where necessary) by the segmentation processor 114 (FIG. 4) as alluded to earlier herein. The processor 114 also includes a ROM 178, a processor (MP) 180, a row (R) counter 182, a column (C) counter 184, and interface and control logic 186 interconnecting the various elements shown.

The image data 120 shown in FIGS. 7A and 7B is divided up by objects so that each individual object 164, 122, and 128 is placed in a separate buffer 188 associated with the RAM 112. The image data for object 128, for example, is stored in the buffer 188 as pixels, and is present in binary form as previously described. At this point, the outer boundaries (row and column) of the monetary amount of a document are also known. The image data relating to the monetary amount is then forwarded to the segmentation processor 114 (FIG. 4) to begin the segmentation process which is designated generally as 190 in FIG. 8.

Figure 8:
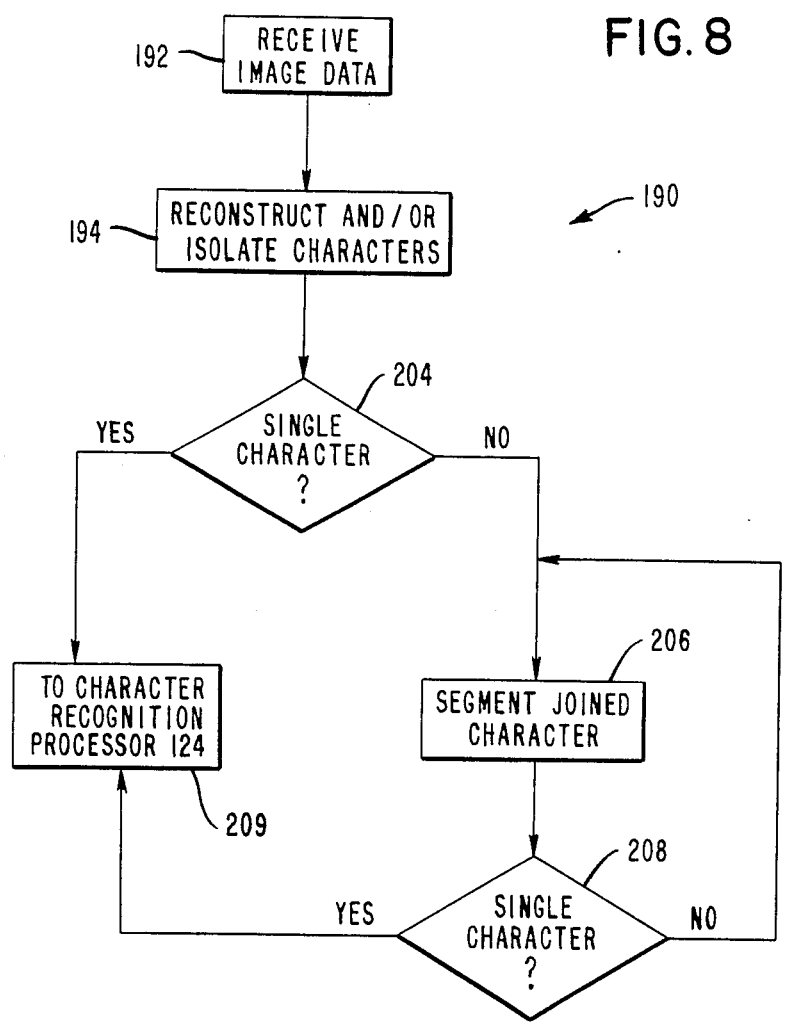
FIG. 8 is a flowchart showing, very generally, the steps involved in the process of segmenting joined characters to facilitate character recognition at a subsequent operation.

The segmentation process 190 is shown very generally in FIG. 8, and the first step therein includes the step 192 of receiving the image data like 120 (FIGS. 7A and 7B), for example. The data is received by the processor 114, and it is stored in the buffer 188. At this time each object or "character" of image data is separate from one another, and the image data is in the matrix form shown in FIGS. 7A and 7B. Note also at this time that an object or a "character" may be comprised of two joined digits like object 128 shown in FIG. 7A. The row counter 182 and the column counter 184 (FIG. 4) are used in the determination of certain calculations to be performed as will be described hereinafter.

A program listing for the segmentation process 190 is included as Appendix A at the end of the specification. The listed program is written in FORTRAN IV. These sheets are consecutively numbered #1–#65, with these numbers being enclosed in a circle to provide for easy reference to specific sheets when necessary.

The next step in the process 190 is step 194 (FIG. 8) in which the objects or characters are reconstructed and/or isolated. Reconstruction means that certain separate records or objects which probably should be grouped with an object are grouped with it. Isolation means that an object which probably contains two characters has been separated into two objects or characters.

Figure 9:
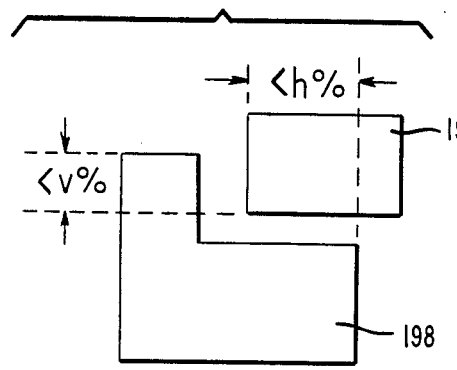
FIGS. 9 and 10 show certain relationships which exist with records associated with an object.
Figure 10:
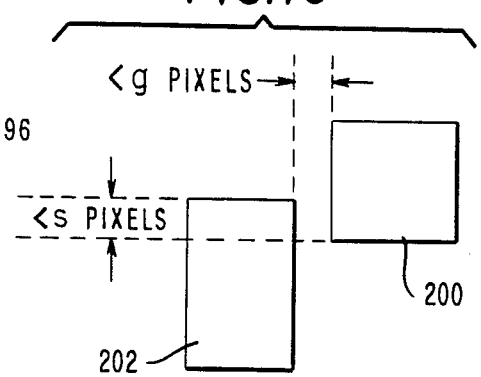

The basic problem in reconstruction is to recognize all the individual records or objects which are associated with a broken character and to store them as one object or "character". FIGS. 9 and 10 show two situations which are typical and which are encountered in reconstruction. The blocks or objects 196 and 198, shown in FIG. 9, represent areas of all black pixels which are located within the perimeters of these objects; the same is true for objects 200 and 202 shown in FIG. 10. Some definitions are in order:

1. An object like 196 is comprised of a group of black pixels which are connected in any direction.

2. Two objects are parts of broken characters if they satisfy the following condition (a) or condition (b).

(a) The thinner object overlaps the other by v % or less in the vertical direction and by h % or more in the horizontal direction. The phrase "thinner object" means that it is smaller than the other object in width.

(b) Overlap in the vertical direction (with regard to FIG. 10) is less than "s" pixels; there is a gap of less than "g" pixels in the horizontal direction; and the object on the left side of the two is below the right one.

After the objects or characters are reconstructed as just described with regard to step 194 in FIG. 8, the object is examined to determine whether or not it is a single character as indicated by step 204. An object includes connected characters if it satisfies certain conditions; the evaluations are made by the segmentation processor 114 (FIG. 4). It should be recalled that the data associated with a character or object at this time is in the matrix form shown in FIG. 7A and 7B, and that the row counter 182 and the column counter 184 (FIG. 4) may be used to obtain the various parameters which are to be described hereinafter. The following terms are used in step 204 and apply to the object:

P = Perimeter (Number of black edge pixels),
W = Width,
H = Height,
A = Number of black pixels in the object,
TA = Width × height = total area,
W/H = Width to height ratio,
A/TA = Area to total area ratio,
$P^2/A$ = Perimeter squared to area ratio, and
m = 200 in the embodiment described.

Having defined the terms used, an "object" includes connected characters or is not a single character as evaluated in step 204 if any one of the following three equations is satisfied. The equations are:

$$P > m; \tag{1}$$

$$W/H \geq r \text{ and } P^2/A \geq b; \text{ and} \tag{2}$$

$$W/H \geq i \text{ and } A/TA > t \text{ and } P \geq o. \tag{3}$$

For example, with regard to the first equation, if the perimeter (P) is greater than m (200 in the embodiment described) then it most likely means that the object is comprised of two characters, and the response at step 204 is a "no." In the embodiment described, there are 154 pixels per inch; the pixels are shown in exaggerated size in FIGS. 7A and 7B. A "no" from step 204 means that the "two character" object must be segmented at step 206 by techniques to be described later herein. After the object is segmented at step 206, it is subjected to step 208 at which the same tests already described in relation to step 204 are applied, and if a "two character" object is again suspected, it is subjected to step 206 again. After segmentation at step 206, if a single character results therefrom, the single character is placed in a discrete area of the buffer 188. When the segmentation process 190 shown in FIG. 8 is completed, the individual characters are transferred (step 209) from the buffer 188 to the recognition processor 124 (FIG. 4) where character recognition is performed as previously described.

As previously stated, when "joined characters" are found as an object in step 204 in FIG. 8, for example, an object like 128 in FIG. 7A is subjected to segmentation as shown by step 206 in FIG. 8. The purpose of segmentation is to locate the joint where the "joined characters" are connected and to remove it so that the joined characters can be isolated as single characters to facilitate character recognition.

The segmentation step 206 shown in FIG. 8 is comprised of three basic subroutines, namely:

1. JNTLOC, (See page 34 of Appendix A.)
2. REMJNT, (See page 38 of Appendix A.), and
3. ZEROUT. (See page 42 of Appendix A.)

In general, the function of routine JNTLOC is to scan an object like 128 that contains connected characters and to find the location of the joint between the two characters.

The general function of the routine REMJNT is to analyze joints along certain orientations. For example, the most common orientations of joints are 45°, 60°, 90°, 120° and 135°. The lengths of these joints are determined, and they are ranked according to length, with the shortest joint having the highest priority and the longest joint having the lowest priority. Segmenting joined characters along the shortest joint helps to preserve the original shapes of the joined characters better than segmenting characters along the longer joints.

The general function of the routine ZEROUT is to test the joint picked out by the routine REMJNT to determine whether or not the joint picked out is a true joint. A true joint is one which, after it is removed, causes the joined characters to become disconnected. If the joint tested is not a true joint, the joint with the second highest priority is then tested, etc. When a true joint is found, the two characters are segmented along the joint, and thereafter, the separated characters are each subjected to the tests (step 208 in FIG. 8) to determine whether or not a single character exists. This process is repeated to enable an object consisting of three characters to be segmented. If no true joint is found during the testing mentioned, then no segmentation of the joined characters is performed; these joined characters are simply routed to the character recognition processor 124 for processing. In all probability, the joined characters will not be read by the character recognition processor 124 (FIG. 4), and consequently, these joined characters will have to be read subsequently by an operator viewing the image of the document on one of the IDTs 14-1, 14-2, or 14-3 (FIG. 1) as previously explained.

The routine JNTLOC can be understood best by referring to the object 128 in FIG. 7A. It is apparent from viewing the binary ones and zeros shown therein that the object 128 represents the joined characters "6" and "8". The first step in routine JNTLOC is to scan the object (in a vertical direction as viewed in FIG. 7A) along lines where a joint joining the characters "6" and "8" may be found most likely. From a practical experience, such a joint is found between $\frac{1}{4}$ to $\frac{3}{4}$ of the width of the object 128. When the object 128 is to be scanned in this regard, its outer column and row parameters are known as each object is discrete in the buffer 188 (FIG. 4). The region in which the scanning is done is shown as R in FIG. 7A and is given by the equation:

$$(MP-MP/2) \leq R \leq (MP+MP/2);$$

in which "MP" is equal to the mid-point of the object 128. The scanning is done from left to right and from the bottom of the object towards the top as viewed in FIG. 7A. At this time in the processing, the left-most column of the object is referred to as column zero and increases to the right (FIG. 7A) and correspondingly, the bottom row of object 128 is referred to as row zero. The row and column counters 182 and 184 (FIG. 4) are utilized for counting and referencing in this regard.

Figure 11:
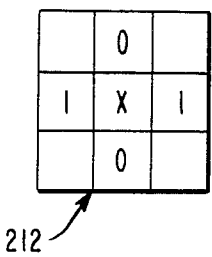
FIGS. 11, 12 and 13 show certain situations associated with an examining window.
Figure 12:
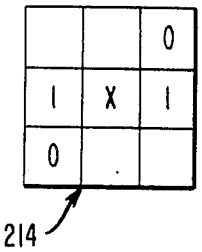
Figure 13:
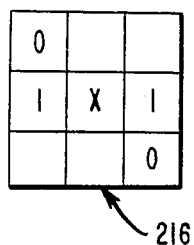

Assume that the scanning mentioned starts at the column marked 210 in FIG. 7A and proceeds upwardly from the bottom of the object 128. To detect a joint between two characters, a 3×3 examining window is moved over the object. The 3×3 matrix for the examining window was selected because it can detect joints consisting of one black pixel. FIGS. 11, 12, and 13 show three different pixel arrangements which are indicative of a joint between two characters to be separated. With regard to FIGS. 11, 12, and 13, the blank spaces in each 3×3 matrix represent "don't care" bits; the binary "1"s and "0"s shown are under consideration, with "x" being a black pixel or a binary "1" and also being the primary pixel under consideration. Each of the windows 212, 214, and 216 represents a potential joint between two characters. In order to select these windows 212, 214, and 216, binary weights are assigned to each of the squares within the windows. By summing up the total value for each window, those windows having predetermined binary values (for binary "1"s present) can be selected as having the configurations shown.

With regard to window 212 in FIG. 11, if the central pixel X were removed, the segmentation line to be used would be vertical and would pass through the "0"s shown therein.

With regard to window 214 in FIG. 12, if the central pixel X were removed, the segmentation line to be used would pass through the binary "0"s and rise from left to right along a 45 degree line with respect to a vertical line.

With regard to window 216 in FIG. 13, if the central pixel X were removed, the segmentation line to be used would pass through the binary "0"s and would fall from left to right along a 45 degree line with respect to a vertical line.

Figure 14:
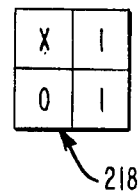
FIG. 14 shows a situation associated with a second type of examining window.

Another pattern which is indicative of a possible joint is shown by window 218 in FIG. 14. Window 218 is slightly different from the window 212 shown in FIG. 11, for example, in that window 218 represents a 2×2 matrix. The pattern shown in FIG. 14 in which X is equal to a binary one is used to pick out possible joints between two characters because the pattern shown is characteristic of the great majority of joints which do exist between connected characters. When a possible joint exists in the position of the "X" pixel in FIGS. 11-14, the associated particular row and column coordinates are utilized by the routine REMJNT as will be described hereinafter. For each black pixel which is evaluated by the window technique mentioned, the three by three matrix window is used (like FIGS. 11-13), and thereafter, the two by two matrix is used (like FIG. 14).

Having discussed the various examining windows used, it now seems appropriate to discuss how the windows are moved relative to the image data associated with object 128 shown in FIG. 7A. As earlier stated, the scanning is done in an upward direction and is done from left to right.

Starting with the column 210 in FIG. 7A and proceeding upwardly, the first black pixel encountered is marked 220. Column 210 is the first column (in the example described) within the range R within which segmentation is anticipated to be performed as previously explained. When the first black pixel is encountered in column 210, the window movement relative to that black pixel is expressed by the following steps:

Step #1. Move the window "diagonally" to the lower right from the black pixel under consideration;

Step #2. Move the window to the right from the black pixel under consideration;

Step #3. Move the window "diagonally" to the upper right from the black pixel under consideration; and Step #4. Move the window directly upwardly from the black pixel under consideration.

When a black pixel is found as a result of the Steps #1-#4 mentioned, that newly-found black pixel becomes the reference point for the window movement mentioned. As soon as a black pixel is found by any of the Steps #1-#3, the steps remaining in the sequence of Steps #1-#4 need not be performed. Basically, the technique being described is to search for the outer boundary of a record (which probably is one character of two or more characters within an object like 128) and to follow it generally upwardly and to the right in the expectation of finding a point at which segmentation can be made. The segmentation is made along the lines expressed by situations shown in windows 212, 214, and 216 (FIGS. 11, 12 and 13) for example. An example of window movement will be explained with regard to FIG. 7A.

As seen from FIG. 7A, the first column within the region R, where segmentation is anticipated to take place is column 210. When proceeding upwardly along column 210, the first black pixel encountered is black pixel 220. From black pixel 220, the adjacent pixels are examined via Steps #1–#4 as previously described. In this regard, a zero or white pixel exists diagonally down and to the right; a zero exists to the right of pixel 220; a zero exists diagonally up and to the right of black pixel 220; and finally, by Step #4, a black pixel 222 is found above black pixel 220. Black pixel 222 is now used as the reference pixel and Steps #1–#4 are repeated resulting in black pixel 224 being used as the next reference pixel. In the next examination sequence, black pixel 226 is found as a result of Step #2. Steps #1–#4 are repeated until the examination process proceeds to black pixel 228. Using black pixel 228 as a reference pixel, Steps #1–#4 reveal that there is no "adjacent" black pixel as examined by these Steps #1–#4. When such a situation is encountered, the process proceeds upwardly (in the column in which the current reference pixel or black pixel 228 is located) until a black pixel is encountered. In this regard, black pixel 230 is located above black pixel 228, and the examination continues with black pixel 230 being the reference pixel. The next black pixels 232 and 234 are found as a result of Step #2, and subsequently, black pixel 236 is found as a result of Step #1. Notice that black pixels 230, 232, and 234 are associated with record #4 and black pixel 236 is associated with record #8. It should be recalled that the image data shown in FIGS. 7A and 7B is found in buffer 188 (FIG. 4) at the time that it is being examined by steps #1–#4 mentioned, and it is comprised of binary ones and zeros as shown. Also, while Steps #1–#4 look for the outer boundary of a record, the reference black pixel which is used in Steps #1–#4 is also used as the "x" or center pixel in the windows 212, 214, and 216 shown in FIGS. 11, 12 and 13, respectively, and is also used as the "x" pixel in window 218 shown in FIG. 14. Notice that with black pixel 234 as the reference or "x" pixel, window 218 (FIG. 14) indicates that black pixel 234 might represent a point along which segmentation might be made between records #4 and #8 of object 128 in FIG. 7A.

After having found a possible segmentation point as represented by black pixel 234 in FIG. 7A, another examination process is introduced to ascertain the direction along which the segmentation between records #4 and #8 should take place. From experience, it has been determined that if segmentation is to take place, the most likely vectors along which the segmentations take place are along the vectors #1–#5 shown in FIG. 15. These vectors #1–#5 are numbered in the order of priority. For example, when a possible joint is found as represented by the windows in FIGS. 11–14, the first vector direction along which pixels are examined is represented by segmentation vector #1 in FIG. 15. Vector #1 represents a direction which is in the same column or directly "up" from the reference black pixel "x" located within the examining windows shown in FIGS. 11–14. Vector #2 represents a direction which is up and to the right at a 45 degree angle, with "up" and "to the right" being referenced from the standpoint of the image data shown in FIG. 7A in the example being described. Vector #3 represents a direction which is up and to the left at a 45 degree angle. Finally, vectors #4 and #5 represent angles of about 30 degrees with regard to vector #1 and they are positioned as shown. These vectors #1–#5 are given customary, angular trigomometric designations as shown.

Figure 15:
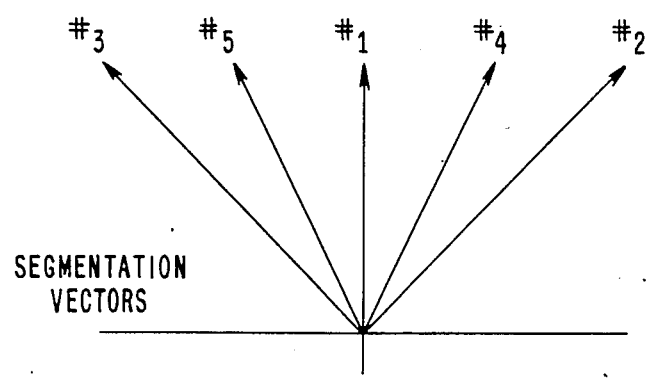
FIG. 15 is a diagram showing various segmentation vectors used to separate two records within an object.

When the examination for black pixels occurs along the directions represented by vectors #1–#5 in FIG. 15, a count of the number of black pixels encountered is kept in the buffer memory 188 (FIG. 4) for each of these vectors. The number of black pixels encountered along the vectors #1–#5 thus provides a first test or a measure of the length of the segmentation cut required along each of these vectors to separate the records associated with an object. Generally, that vector that is the shortest among the vectors #1–#5 is generally the direction selected for making the cut or segmentation; however, that is not always true and certain other tests are made prior to segmentation.

A second test to determine which of the vectors #1–#5 (FIG. 15) provides the best line along which to separate the records of an object is to examine the column in which a certain first white pixel is located. This first white pixel is the one which is encountered on the vectors #1–#5 in determining the length of these vectors which are comprised of black pixels. When this first white pixel is encountered, the column in which it is located is noted, and an examination of the pixels in that column is made beginning with the first white pixel and extending upwardly (as viewed in FIG. 7A) towards the top of the object. If no black pixels are encountered in the column in which the "first white pixel" is located at the end of a vector #1–#5, it means that the segmentation line may be an appropriate one, providing other criteria are met. If some black pixels are encountered in the column in which the "first white pixel" is located, the perimeter of the record associated with the first-found black pixels is examined by moving the examining window upwardly and to the right as previously explained. If the top of the image data (FIG. 7A) can be reached by this process without encountering a joint between two records, the second test is satisfied.

The third and final test is that the intended segmentation line must be within the range "R" previously mentioned. The range R represents the most-likely place where two characters forming as an object might be joined.

To summarize, the segmentation line to be selected is selected for the shortest vector of vectors #1–#5 whose associated "first white pixel" lies in a column with no black pixels in this column when proceeding towards the top of the associated image (FIG. 7A), and for that shortest vector which also lies within the R limit. Some examples will clarify these tests.

For example, with regard to FIG. 7A, black pixel 234 represents the x pixel located in window 218 shown in FIG. 14. When viewing the column in which black pixel 234 is located, there are three black pixels for a segmentation vector #1 (straight up) and only two black pixels (counting black pixel 234 and black pixel 238) for a segmentation vector #2. Segmentation vector #2 provides the shortest length for a segmentation line and it satisfies test #1. The first white pixel encountered to end the vector #2 is white pixel 240. White pixels exist in the column containing and starting with white pixel 240 and continuing to the top of the image data shown in FIG. 7A; therefore, test #2 is satisfied. The proposed segmentation line passing through black pixels 234 and 238 lies within the R limit shown at the bottom of FIG. 7A; therefore, test #3 is satisfied. Because tests #1–#3 are satisfied, the cut line 126 would be made along the line 126 which passes through black pixels 234 and 238.

Figure 16:
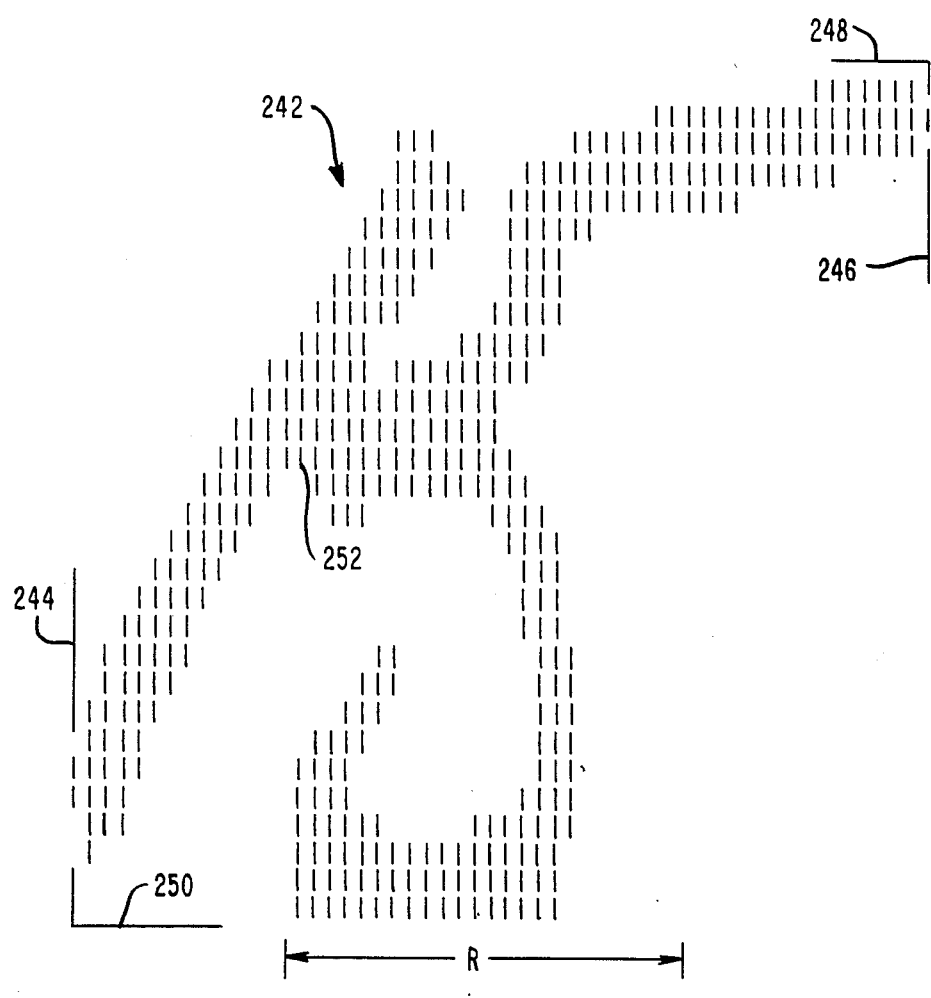
FIG. 16 is a schematic diagram of image data associated with a courtesy amount in which two characters are joined.

FIG. 16 shows another example of image data for an object 242 which appears to be the numbers "1" and "5" which are joined. As previously described, each object, like 242, has outer column markers 244 and 246 and outer row markers 248 and 250 to define the perimeter of the object 242. The binary zeros or white pixels are not shown in FIG. 16 to simplify the Figure; only the binary ones or black pixels are shown.

Figure 17:
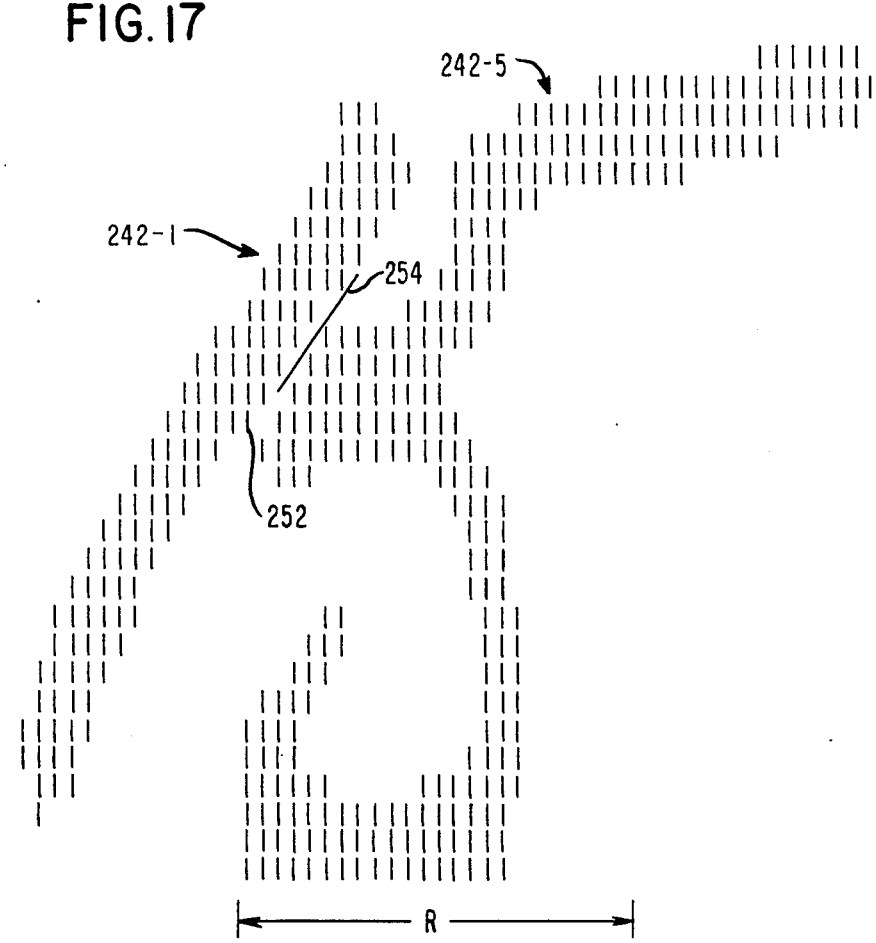
FIG. 17 is a schematic diagram of the image data shown in FIG. 16 after segmentation is performed.

In examining the object 242 (FIG. 16) to look for a joint between two records, the technique of moving the windows shown in FIGS. 11–14 through Steps #1–#4 is employed as previously described. In this regard, black pixel 252 represents the "x" pixel shown in window 218 in FIG. 14. After examining the possible cuts along segmentation vectors #1–#5 shown in FIG. 15, segmentation vector #2 is selected as previously described, and it passes through black pixel 252 to produce a segmentation line 254 (FIG. 17) which divides the object 242 (FIG. 16) into the two objects 242-1 and 242-5 shown in FIG. 17. The two objects 242-1 and 242-5 are again examined to determine whether or not these two objects represent single characters as previously discussed in relation to step 208 shown in FIG. 8. In this example, the two objects 242-1 and 242-5 would be interpreted as single characters, and consequently, they would be routed to the character recognition processor 124 to effect character recognition. When objects or characters are separated they are maintained in the same order as they appear on the document 26 (FIG. 3) so that the courtesy amount 82 can be read properly.

Some miscellaneous comments relative to the detailed program listing shown on pages 1–65 of Appendix A appear in order.

As previously stated, the program listing is written in FORTRAN IV. Pages 1–65 of the listing have various descriptions of the operations interspersed throughout to facilitate an understanding of the entire process.

Pages 1–9 of the listing relate to various initialization procedures for getting data from the various files utilized. Page 9 refers to a subroutine for preparing a name for the next file for the next document 26 being transported along the document track 30.

Pages 11 and 12 of the listing show the various steps included in a routine for segmenting machine printed characters. This particular routine is conventional, and basically, it just divides the joined, printed characters at their midpoint.

Page 14 of the listing contains the high-level, control portion for controlling various subroutine mentioned in the listing. SEGMEN is the name of the routine which will call the ENCODE, DECODE, PASTE, and SIFT routines also mentioned in the listing. The ENCODE routine is that one which was explained in developing the chart shown in FIG. 6, and the DECODE routine refers to reconstructing the figures from the chart shown in FIG. 6. The PASTE routine is mentioned on page 15 of the listing. The SIFT routine is mentioned on page 16 of the listing.

Page 15 of the listing refers to the process described in relation to FIGS. 9 and 10 which determines whether or not two elements or pieces are part of a broken character or are parts of two distance characters.

Figure 18:
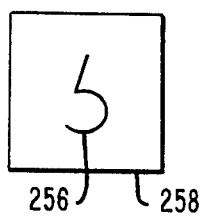
FIG. 18 and FIG. 19 show portions of the numeral "5"
Figure 19:
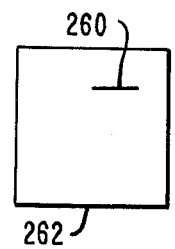
Figure 20:
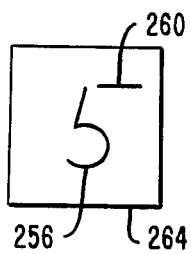
FIG. 20 shows how the portions shown in FIGS. 18 and 19 are combined as one character in FIG. 20.

Page 15 also mentions the PASTE routine, with the associated details being listed on pages 41 and 42. The PASTE routine is a routine which essentially reconstructs broken characters. In other words, it is a routine which attempts to put together in one discrete buffer those elements which should properly be together. For example, FIG. 18 shows a portion 256 of the numeral "5" which is in its buffer 258. FIG. 19 shows a second portion 260 of a character which is located in its buffer 262. The original coordinates for each of the buffers 258 and 262 are saved to enable the segmentation processor 114 to decide whether the portions 256 and 260 are separate characters or whether these portions should properly be included in one buffer 264 (FIG. 20) to represent a single character.

Page 16 of the listing refers to the SIFT routine which tests for the presence of connected characters. This routine is associated with the discussion of steps 204 as described earlier herein. If the SIFT routine indicates that there is just one character after an evaluation of the associated height, width, etc. paramenters, then there is no need for segmentation, and therefore, the character is sent to the recognition processor 124 for conventional character recognition.

Pages 18–30 of the listing relate to the detailed steps associated with the encoding process discussed in relation to the chart 118 shown in FIG. 6.

Pages 32 and 33 of the listing relate to the detailed steps for decoding the chart 118 shown in FIG. 6 to obtain the binary representation of the characters as shown in FIGS. 7A and 7B, for example.

Pages 35 and 36 of the listing relate to data manipulations which are made necessary because the program is written in FORTRAN which deals with words or bytes of data and the data for the particular embodiment discussed herein is stored in single bits or pixels.

Pages 37, 38 and 39 of the listing include detailed steps which relate to data manipulations associated with FORTRAN.

Pages 41 and 42 of the listing relate to the detailed steps associated with the PASTE routine mentioned on page 15 of the listing.

Pages 44 and 45 of the listing relate to the detailed steps associated with the SIFT routine mentioned on page 16 of the listing.

Figure 21:
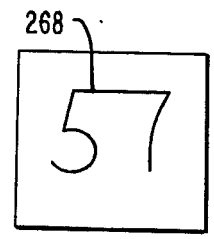
FIG. 21 shows a particular combined object like a joined "57" which can be segmented by this invention.

Page 47 of the listing relates to a HTRANS routine which is used to determine whether or not a character image contains a single character or connected characters. It is useful for joined characters like those shown in FIG. 21 which shows the numbers "57" being joined. The HTRANS routine performs a histogram analysis for those objects (FIG. 21) which do not have detectable corners. For this type of object 268, the number of pixel transitions which occur when scanning in a vertical direction from the left side of the object to the right side of the object are recorded. For this type of object 268, one can see that the center portion of the object has very few transitions in the horizontal line joining the "5" and "7". Generally, the width of this horizontal line is about one black pixel wide in the embodiment described. So, the joint at which segmentation would be made would be at that portion of the object which has the fewest number of transitions, and once that portion is found, that portion which has the fewest number of black pixels would indicate the narrowest portion of the joined characters. Segmentation is then made along this narrowest portion; in FIG. 21 this narrowest portion lies on the horizontal segment between the numbers "57".

Pages 50 and 51 of the listing refer to the routine JNTLOC discussed earlier herein with regard to step 206 shown in FIG. 8.

Pages 52-56 of the listing contain additional details of various portions of the process already described. For example, the routine REMJNT (for removing the joint between connected characters begins on page 54 of the listing.

Pages 59-65 of the listing contain additional details of various portions of the process described earlier herein. For example, the routine ZEROUT is found on page 59 of the listing.

Pages like 8, 10, 13, 31, 34, 43, 46, 48, 49, 57 and 58 of the program listing which were not specifically referred to in the description of the program listing contain certain lines which are not directly related to the processes described earlier herein.

Appendix A

```
         PROGRAM SEGMNT

REVISION 02

TASK BUILD    TKB>READFL=READFL,SEGMEN,PASTE,BITFNC,SIFT
                       TKB>HTRANS,FORSEG,HIST,LB:[1,1]CARLIB/LB
                       TKB>/
                       TKB>ACTFIL=3
                       TKB>MAXBUF=530
                       TKB>//

IMPLICIT INTEGER*2 (A-Z)
         INCLUDE 'LB:[1,1]DBDEFIN.FTN/NOLIST'

C        DATA AREA AND DEFINITIONS

INTEGER*2 IHEAD(40), IREC(5), MSK(16), LBUF(52)
         INTEGER*2 INEW(4,75,10), IOLD(5,200), IRUN(1000)
         INTEGER*2 RLN(4,25), RLO(4,25), LOC(4,10)
         BYTE SRCFL(30), DSTFL(30), MODNAM(6)
         LOGICAL ULB

COMMON /L1/ II,JJ,IOLD
         COMMON /L2/ INEW,LOC
         COMMON /L3/ RLN,NRLN,RLO,NRLO
         COMMON /L4/ ISEGFL,IPIXFL
         COMMON /L5/ MSK
         COMMON /L6/ IRUN
         COMMON /L8/ NTRIES

DATA MSK/128,64,32,16,8,4,2,1,"100000,16384,8192,4096,
        2            2048,1024,512,256/

15  FORMAT(/,1X,' ENTER NAME OF FIRST SOURCE FILE OR LIBRARY: ',$)
     25  FORMAT(Q,30A)
     35  FORMAT($,1X,' ENTER FIRST LIBRARY MODULE NAME: ')
     45  FORMAT(Q,6A)
     55  FORMAT($,1X,' ENTER NUMBER OF FILES TO PROCESS: N = ')
     65  FORMAT(I5)
     75  FORMAT($,1X,' ENTER NAME OF FIRST DESTINATION FILE: ')
     85  FORMAT(/,1X,' OPEN FAILURE ON FILE ',30A,/)
     95  FORMAT(/,1X,' OPEN FAILURE 'I5.5X,' MODULE ',6A,/)
    105  FORMAT(/,1X,' PROCESSING LIBRARY: ',30A,' MODULE ',6A,/)
    125  FORMAT(/,5X,' PROCESSING FILE: ',30A,/)
    135  FORMAT(/,1X,' UNSUPPORTED BITS PER PIXEL = ',I3,/)
    245  FORMAT(/,1X,' OPEN FAILURE ON DESTINATION FILE ',30A,/)

C        INITIALIZATION

DSTLUN = 3
         SRCLUN = 4
```

```
C   GET FILE SPECIFICATION FOR READ AND WRITE
C
10      ULB = .FALSE.
        TYPE 15
        ACCEPT 25,Q1,SRCFL
        IF(Q1 .LE. 0) STOP
        IF(Q1 .LT. 30) SRCFL(Q1+1) = 0
C
C   FIND DOT SEPARATOR
C
        DO 20 I=1,Q1
        IF(SRCFL(I) .EQ. 46) GOTO 30
20      CONTINUE
        GOTO 50
C
C   CHECK FILE EXTENSION
C
30      IF(SRCFL(I+1) .NE. 'U') GOTO 50
        IF(SRCFL(I+2) .NE. 'L') GOTO 50
        IF(SRCFL(I+3) .NE. 'B') GOTO 50
        ULB = .TRUE.
        TYPE 35
        ACCEPT 45,Q2,MODNAM
        IF(Q2 .EQ. 0) GOTO 10
C
C   GET NUMBER OF FILES TO PROCESS AND NAME OF DESTINATION FILE
C
50      TYPE 55
        ACCEPT 65,NFILES
        TYPE 75
        ACCEPT 25,Q3,DSTFL
        IF(Q3 .LT. 30) DSTFL(Q3+1) = 0
C
C   OPEN DATA FILE OR LIBRARY
C
70      CONTINUE
        OPEN (UNIT=SRCLUN,NAME=SRCFL,TYPE='OLD',ERR=80,
     2        ACCESS='SEQUENTIAL',FORM='UNFORMATTED',
     2        SHARED,READONLY)
        GOTO 90
C
80      TYPE 85,SRCFL
        GOTO 500
C
90      IF(ULB .EQ. .FALSE.) GOTO 120
        CALL ULOPEN(SRCLUN,MODNAM,LBUF,IERR)
        IF(IERR .EQ. 0) GOTO 100
        TYPE 95,IERR,MODNAM
        GOTO 500
C
100     TYPE 105,SRCFL,MODNAM
```

```
0163  C          WRITE(1,105) SRCFL,MODNAM
0164  C          GOTO 130
0165  C
0166  120        TYPE 125,SRCFL
0167  C          WRITE(1,125) SRCFL
0168  C
0169  130        READ(SRCLUN) IHEAD
0170             BPP = IHEAD(FZBPP)
0171             IF(BPP .EQ. 1) GOTO 200
0172             TYPE 135,BPP
0173             GOTO 500
0174  C
0175  C     READ IN DATA FILE
0176  C
0177  200        CONTINUE
0178             NCHAR = 0
0179             ISEGFL = 0
0180             NTRIES = 0
0181             IPIXFL = 0
0182  C
0183             II = IHEAD(FZPSL) / 16
0184             JJ = IHEAD(FZNSL)
0185             IF(II.GT.5 .OR. JJ.GT.200) GOTO 500
0186  C
0187             DO 210 J=JJ,1,-1
0188                READ(SRCLUN) (IREC(I), I=1,II)
0189                DO 220 I=1,II
0190                   IOLD(I,J) = IREC(I)
0191  220          CONTINUE
0192  210       CONTINUE
0193             CLOSE(UNIT=SRCLUN)
0194  D          CALL PRIOLD
0195  C
0196  C     CHECK FOR COURTESY AMOUNT FORMAT (MACHINE OR
0197  C     HAND PRINT).
0198  C
0199             IF(IHEAD(FZCAF) .NE. 2) GOTO 225
0200             CALL SEGMP(NCHAR)
0201             GOTO 230
0202  C
0203  225        CONTINUE
0204             CALL SEGMEN(NCHAR)
0205             IF(ISEGFL .EQ. 1) GOTO 225
0206  C
0207  230        CONTINUE
0208  D          WRITE(1,232)
0209  D232       FORMAT('1',15X,'COURTESY AMOUNT AFTER FORCED-SEGMENTATION',//)
0210  D          CALL PRIOLD
0211             IF(Q3 .LE. 0) GOTO 500
0212             DO 250 M=1,NCHAR
0213                NC = LOC(4,M) - LOC(2,M) + 3
0214                NR = LOC(3,M) - LOC(1,M) + 3
```

```
0215        IF(NR.LT.10 .OR. NC.LT.5) GOTO 250
0216   C
0217        OPEN(UNIT=DSTLUN,NAME=DSTFL,TYPE='NEW',ERR=235,
0218       2     ACCESS='SEQUENTIAL',FORM='UNFORMATTED',
0219       2     INITIALSIZE=1,EXTENDSIZE=1)
0220        GOTO 240
0221   C
0222   235  TYPE 245,DSTFL
0223        CLOSE(UNIT=DSTLUN)
0224        GOTO 500
0225   C
0226   240  IHEAD(FZNSL) = NC
0227        IHEAD(FZNDR) = NC
0228        IHEAD(FZHQI) = NR
0229        IHEAD(FZRX) = JJ - LOC(4,M) + 1
0230        IHEAD(FZLX) = JJ - LOC(2,M) + 1
0231        IHEAD(FZTY) = LOC(1,M)
0232        IHEAD(FZBY) = LOC(3,M)
0233        IHEAD(FZCAF) = NCHAR
0234        IHEAD(FZLRL) = M
0235        NW = (NR-1)/16 + 1
0236        IHEAD(FZPSL) = NW*16
0237        IHEAD(FZDRL) = NW*2
0238        WRITE(DSTLUN) (IHEAD(K),K=1,IHEAD(FZHLN)/2)
0239        DO 260 J=NC,1,-1
0240        WRITE(DSTLUN) (INEW(I,J,M),I=1,NW)
0241        CLOSE(UNIT=DSTLUN)
0242        CALL NXTNAM(DSTFL)
0243   260  CONTINUE
0244   250  NFILES = NFILES - 1
0245   C    CLOSE(UNIT=1)
0246   500  IF(ULB .EQ. FALSE) GOTO 550
0247   D    CALL ULCLOS(SRCLUN,LBUF,IERR)
0248        IF(NFILES .LE. 0) GOTO 550
0249        I = 7
0250   510  I = I - 1
0251        MODNAM(I) = MODNAM(I) + 1
0252        IF(MODNAM(I) .EQ. 58) MODNAM(I) = 48
0253        IF(MODNAM(I) .EQ. 48) GOTO 510
0254        GOTO 90
0255   C
0256   550  CLOSE (UNIT = SRCLUN)
0257        IF(NFILES .LE. 0) GOTO 900
0258        CALL NXTNAM(SRCFL)
0259        GOTO 70
0260   C
0261   900  TYPE 910,DSTFL
0262   910  FORMAT(/,' NEXT DESTINATION FILE = ',30A)
0263        GOTO 10
0264   C
0265   1000 CONTINUE
0266        STOP
0267        END
```

| Name | Bytes | Attributes | | | | |
|---|---|---|---|---|---|---|
| 0 $CODE | 1420 | PIC CON REL LCL SHR EXE RD NOWRT LONG |
| 1 $PDATA | 464 | PIC CON REL LCL SHR NOEXE RD NOWRT LONG |
| 2 $LOCAL | 528 | PIC CON REL LCL NOSHR NOEXE RD WRT LONG |
| 3 L1 | 2004 | PIC OVR REL GBL SHR NOEXE RD WRT LONG |
| 4 L2 | 6080 | PIC OVR REL GBL SHR NOEXE RD WRT LONG |
| 5 L3 | 404 | PIC OVR REL GBL SHR NOEXE RD WRT LONG |
| 6 L4 | 4 | PIC OVR REL GBL SHR NOEXE RD WRT LONG |
| 7 L5 | 32 | PIC OVR REL GBL SHR NOEXE RD WRT LONG |
| 8 L6 | 2000 | PIC OVR REL GBL SHR NOEXE RD WRT LONG |
| 9 L8 | 2 | PIC OVR REL GBL SHR NOEXE RD WRT LONG |

Total Space Allocated    12938

ENTRY POINTS

| Address | Type | Name |
|---|---|---|
| 0-00000000 | | SEGMNT |

VARIABLES

| Address | Type | Name | Address | Type | Name | Address | Type | Name |
|---|---|---|---|---|---|---|---|---|
| ** | I*2 | BPP | 2-00000104 | I*2 | DSTLUN | 2-00000112 | I*2 | FALSE | ** | I*2 | I |
| 2-00000114 | I*2 | IERR | 3-00000000 | I*2 | II | 6-00000002 | I*2 | IPIXFL | 6-00000000 | I*2 | ISEGFL |
| ** | I*2 | J | 3-00000002 | I*2 | JJ | ** | I*2 | K | ** | I*2 | M |
| ** | I*2 | NC | 2-00000116 | I*2 | NCHAR | 2-0000010E | I*2 | NFILES | ** | I*2 | NR |
| 5-00000008 | I*2 | NRLN | 5-00000192 | I*2 | NRLO | 9-00000000 | I*2 | NTRIES | ** | I*2 | NU |
| 2-00000108 | I*2 | Q1 | 2-0000010C | I*2 | Q2 | 2-00000110 | I*2 | Q3 | 2-00000106 | I*2 | SRCLUN |
| 2-00000120 | L*4 | ULB |

ARRAYS

| Address | Type | Name | Bytes | Dimensions |
|---|---|---|---|---|
| 2-000000E0 | L*1 | DSTFL | 30 | (30) |
| 2-00000000 | I*2 | IHEAD | 80 | (40) |
| 4-00000000 | I*2 | INEW | 6000 | (4, 75, 10) |
| 3-00000004 | I*2 | IOLD | 2000 | (5, 200) |
| 2-00000050 | I*2 | IREC | 10 | (5) |
| 8-00000000 | I*2 | IRUN | 2000 | (1000) |
| 2-0000005A | I*2 | LBUF | 104 | (52) |
| 4-00000000 | I*2 | LOC | 80 | (4, 10) |
| 2-000000FE | L*1 | MODNAM | 6 | (6) |
| 7-00000000 | I*2 | MSK | 32 | (16) |
| 5-00000000 | I*2 | RLN | 200 | (4, 25) |
| 5-000000CA | I*2 | RLO | 200 | (4, 25) |
| 2-000000C2 | L*1 | SRCFL | 30 | (30) |

LABELS

| Address | Label | Address | Label | Address | Label | Address | Label | Address | Label |
|---------|-------|---------|-------|---------|-------|---------|-------|---------|-------|
| 0-00000014 | 10 | 1-00000000 | 15' | ** | 20 | 0-0000008C | 30 | 1-0000003A | 35' |
| 1-00000063 | 45' | 0-000000F1 | 50 | 1-00000068 | 55' | 0-0000017D | 70 | 1-00000099 | 75' |
| 0-00000190 | 80 | 1-000000C7 | 85' | 0-000000EB | 90 | 0-0000023C | 100 | 1-0000010F | 105'' |
| 0-0000026C | 120 | 1-0000013E | 125' | 0-0000028D | 130 | 0-000002DC | 200 | ** | 210 |
| ** | 220 | 0-000003A4 | 225 | 0-000003B6 | 230 | ** | 240 | 1-00000183 | 245' |
| 0-00000540 | 250 | ** | 260 | 0-000001B4 | 500 | 0-0000054C | 550 | 0-00000568 | 900 |
| 1-000001AF | 910' | ** | 1000 | | 510 | | | | |

FUNCTIONS AND SUBROUTINES REFERENCED

| Type Name | Type Name | Type Name | Type Name | Type Name |
|-----------|-----------|-----------|-----------|-----------|
| FOR$CLOSE | FOR$OPEN | NXTNAM | SEGMEN | SEGMP | ULCLOS |
| ULOPEN | | | | |

```
0001        SUBROUTINE PRIOLD
0002        IMPLICIT INTEGER*2 (A-Z)
0003        BYTE BUF(130)
0004        COMMON /L1/ II,JJ
0005   C
0006        NR = 16*II
0007        NC = JJ
0008        IF(NC .GT. 129) NC = 129
0009   C
0010        DO 10 I=1,NR
0011          DO 20 J=1,NC
0012            BUF(J) = ' '
0013            IF(BITO(I,J) .EQ. 1) BUF(J) = '1'
0014   20     CONTINUE
0015          WRITE(1,15) (BUF(J),J=1,NC)
0016   15     FORMAT(1X,130A1)
0017   10   CONTINUE
0018        RETURN
0019        END
```

PROGRAM SECTIONS

| Name | Bytes | Attributes |
|---|---|---|
| 0 $CODE | 148 | PIC CON REL LCL SHR EXE RD NOWRT LONG |
| 1 $PDATA | 8 | PIC CON REL LCL SHR NOEXE RD NOWRT LONG |
| 2 $LOCAL | 148 | PIC CON REL LCL NOSHR NOEXE RD WRT LONG |
| 3 L1 | 4 | PIC OVR REL GBL SHR NOEXE RD WRT LONG |

Total Space Allocated  308

```
ENTRY POINTS
     Address    Type  Name
  0-00000000          PRIOLD

VARIABLES
     Address    Type  Name         Address    Type  Name         Address    Type  Name
  2-00000082    I*2   I         3-00000000    I*2   II        2-00000086    I*2   J         3-00000002    I*2   JJ
         **    I*2   NC                **    I*2   NR ARRAYS
     Address    Type  Name         Bytes  Dimensions
  2-00000000    L*1   BUF            130  (130)

LABELS
     Address    Label              Address    Label              Address    Label
         **    10                1-00000000   15'                      **   20

FUNCTIONS AND SUBROUTINES REFERENCED
     Type  Name
     I*2   BIT0

0001          C------
0002                  SUBROUTINE NXTNAM(NAME)
0003                  BYTE NAME(30)
0004          C
0005          C       SEARCH FOR SEPARATOR BETWEEN NAME AND EXTENSION
0006          C
0007                  DO 10 I=1,20
0008                    IF (NAME(I) .EQ. 0) GOTO 30
0009                    IF (NAME(I) .EQ. 46) GOTO 20
0010        10        CONTINUE
0011          C
0012          C       UPDATE NUMERIC PORTION OF NAME
0013          C
0014        20        I = I - 1
0015                  IF (NAME(I) .LT. 48 .OR. NAME(I) .GT. 57) GOTO 30
0016                  NAME(I) = NAME(I) + 1
0017                  IF (NAME(I) .EQ. 58) NAME(I) = 48
0018                  IF (NAME(I) .EQ. 48) GOTO 20
0019        30        RETURN
0020                  END
```

PROGRAM SECTIONS

| Name | Bytes | Attributes | | | | | | |
|---|---|---|---|---|---|---|---|---|
| 0 $CODE | 86 | PIC | CON | REL | LCL | SHR | EXE | RD NOWRT LONG |
| 2 $LOCAL | 20 | PIC | CON | REL | LCL | NOSHR | NOEXE | RD WRT LONG |

Total Space Allocated  106

ENTRY POINTS

| Address | Type | Name |
|---|---|---|
| 0-00000000 | | NXTNAM |

VARIABLES

| Address | Type | Name |
|---|---|---|
| ** | I*4 | I |

ARRAYS

| Address | Type | Name | Bytes | Dimensions |
|---|---|---|---|---|
| AP-00000042 | L*1 | NAME | 30 | (30) |

LABELS

| Address | Label | Address | Label | Address | Label |
|---|---|---|---|---|---|
| ** | 10 | 0-00000032 | 20 | 0-00000055 | 30 |

COMMAND QUALIFIERS

FORTRAN/NOF77/NOOBJ/LIST READFL.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:        6.31 seconds
Elapsed Time:    6.80 seconds
Page Faults:     791
Dynamic Memory:  471 pages

```
0001  C------------------------------------------------------------
0002        SUBROUTINE SEGMP(NCHAR)
0003        IMPLICIT INTEGER*2 (A-Z)
0004        INTEGER*2 IOLD(5,200), INEW(4,75,10), LOC(4,10)
0005        COMMON /L1/NW,NC,IOLD
0006        COMMON /L2/INEW,LOC
0007  C------------------------------------------------------------
0008  C     ** SEGMP ** IS A ROUTINE USED TO SEGMENT MACHINE PRINTED
0009  C     COURTESY AMOUNTS.  SEGMENTATION IS ACCOMPLISHED BY OBTAINING
0010  C     THE VERTICAL AND HORIZONTAL GATES OF THE COURTESY AMOUNT.
0011  C------------------------------------------------------------
0012        FLG1 = 0
0013        NR = NW*16
0014  C------------------------------------------------------------
0015  C     VERTICAL GATES ARE OBTAINED BY FINDING THE STARTING AND
0016  C     ENDING COLUMNS OF EACH CHARACTER IN THE COURTESY AMOUNT.
0017  C------------------------------------------------------------
0018        DO 10 J=NC,1,-1
0019        DO 20 I=1,NR
0020        IF(BITO(I,J) .EQ. 0) GOTO 20
0021        IF(FLG1 .EQ. 1) GOTO 10
0022        NCHAR = NCHAR + 1
0023        LOC(4,NCHAR) = J
0024        FLG1 = 1
0025        GOTO 10
0026  20    CONTINUE
0027        IF(FLG1 .EQ. 0) GOTO 10
0028        LOC(2,NCHAR) = J + 1
0029        FLG1 = 0
0030  10    CONTINUE
0031  C
0032        IF(FLG1 .EQ. 0) GOTO 25
0033        LOC(2,NCHAR) = 1
0034  25    CONTINUE
0035  C------------------------------------------------------------
0036  C     HORIZONTAL GATES ARE OBTAINED BY FINDING THE STARTING AND
0037  C     ENDING ROWS OF EACH CHARACTER IN THE COURTESY AMOUNT.
0038  C------------------------------------------------------------
0039        DO 30 K=1,NCHAR
0040        IMIN = 100
0041        IMAX = 0
0042        JMIN = LOC(2,K)
0043        JMAX = LOC(4,K)
0044        DO 40 I=1,NR
0045        DO 50 J=JMIN,JMAX
0046        IF(BITO(I,J) .EQ. 0) GOTO 50
0047        IF(I .LT. IMIN) IMIN = I
0048        IF(I .GT. IMAX) IMAX = I
0049        GOTO 40
0050  50    CONTINUE
0051  40    CONTINUE
0052  C
```

```
0053              LOC(1,K) = IMIN
0054              LOC(3,K) = IMAX
0055        C
0056              DO 60 I=IMIN,IMAX
0057                III = I - IMIN + 2
0058                DO 60 J=JMIN,JMAX
0059                  JJJ = J -JMIN + 2
0060                  BIT = BITO(I,J)
0061                  CALL PBN(III,JJJ,K,BIT)
0062        60    CONTINUE
0063        30  CONTINUE
0064        C
0065            RETURN
0066            END
```

PROGRAM SECTIONS

| Name | Bytes | Attributes |
|---|---|---|
| 0 $CODE | 335 | PIC CON REL LCL SHR EXE RD NOWRT LONG |
| 2 $LOCAL | 56 | PIC CON REL LCL NOSHR NOEXE RD WRT LONG |
| 3 L1 | 2004 | PIC OVR REL GBL SHR NOEXE RD WRT LONG |
| 4 L2 | 6080 | PIC OVR REL GBL SHR NOEXE RD WRT LONG |

Total Space Allocated    8475

ENTRY POINTS

| Address | Type | Name |
|---|---|---|
| 0-00000000 | | SEGMP |

VARIABLES

| Address | Type | Name | Address | Type | Name | Address | Type | Name |
|---|---|---|---|---|---|---|---|---|
| 2-00000014 | I*2 | BIT | ** | I*2 | FLG1 | 2-00000002 | I*2 | I | 2-0000000E | I*2 | III |
| ** | I*2 | IMAX | ** | I*2 | IMIN | 2-00000000 | I*2 | J | 2-00000012 | I*2 | JJJ |
| ** | I*2 | JMAX | ** | I*2 | JMIN | 2-00000006 | I*2 | K | 3-00000002 | I*2 | NC |
| AP-00000042 | I*2 | NCHAR | ** | I*2 | NR | 3-00000000 | I*2 | NW | | | |

ARRAYS

| Address | Type | Name | Bytes | Dimensions |
|---|---|---|---|---|
| 4-00000000 | I*2 | INEW | 6000 | (4, 75, 10) |
| 3-00000004 | I*2 | IOLD | 2000 | (5, 200) |
| 4-00001770 | I*2 | LOC | 80 | (4, 10) |

LABELS

| Address | Label | Address | Label | Address | Label | Address | Label | Address | Label | Address | Label |
|---------|-------|---------|-------|---------|-------|---------|-------|---------|-------|---------|-------|
| 0-0000006A | 10 | 0-0000004C | 20 | 0-00000086 | 25 | ** | 30 | 0-000000EB | 40 | 0-000000E4 | 50 |
| ** | 60 | | | | | | | | | | |

FUNCTIONS AND SUBROUTINES REFERENCED

| Type | Name | Type | Name |
|------|------|------|------|
| I*2  | BITO | | PBN |

COMMAND QUALIFIERS

FORTRAN/NOF77/NOOBJ/LIST SEGMP.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:        1.69 seconds
Elapsed Time:    2.20 seconds
Page Faults:     560
Dynamic Memory:  379 pages

```
0001   C------------------------------------------------------------
0002         SUBROUTINE SEGMEN(NCHAR)
0003         IMPLICIT INTEGER*2 (A-Z)
0004         INTEGER*2 IRUN(1000), LOC(4,10)
0005         INTEGER*2 INEW(4,75,10), IOLD(5,200)
0006         REAL*4 OLR,OVRLAP
0007   C
0008         COMMON /L1/NW,NC,IOLD
0009         COMMON /L2/INEW,LOC
0010         COMMON /L4/ISEGFL
0011         COMMON /L6/IRUN
0012         COMMON /L8/NTRIES
0013   C
0014   C------------------------------------------------------------
0015   C    ** SEGMEN ** IS A ROUTINE TO SEGMENT INDIVIDUAL CHARACTERS FROM
0016   C    AN IMAGE CONTAINING MULTIPLE CHARACTERS.  SEGMEN WORKS ONLY ON
0017   C    BINARY IMAGES AND INTERPRETS AS A CHARACTER ANY CONNECTED SET OF
```

```
0018      C          NON-ZERO PIXELS.
0019      C-----------------------------------------------------------
0020      C          ENCODE THE IMAGE USING 2-D RUN LENGTH ENCODING
0021      C-----------------------------------------------------------
0022                 CALL RL2COD(NIR)
0023                 NCHAR = 0
0024                 ISTART = 1
0025                 IF (NIR.GT.0) GOTO 30
0026      C-----------------------------------------------------------
0027      C          IF NOTHING HAS BEEN ENCODED RETURN ONE BLANK CHARACTER IMAGE
0028      C-----------------------------------------------------------
0029                 NCHAR = 1
0030                 DO 10 JJ = 1,75
0031                   DO 10 II = 1,4
0032       10            INEW(II,JJ,NCHAR) = 0
0033                 DO 20 II=1,4
0034       20          LOC(II,1) = 0
0035                 GOTO 200
0036       30        CONTINUE
0037      C-----------------------------------------------------------
0038      C          DECODE EACH CHARACTER AND STORE IN A SEPARATE CHARACTER IMAGE
0039      C-----------------------------------------------------------
0040      D          WRITE(1,35) (IRUN(M),M=1,NIR+5)
0041      D35        FORMAT (1X,2015)
0042      D          WRITE(1,45) NIR
0043      D45        FORMAT(10X,'NIR=',I6,/)
0044                 DO 50 I = 1,NIR
0045                   NCHAR = NCHAR + 1
0046                   DO 60 III = 1,4
0047                     DO 60 JJJ = 1,75
0048       60              INEW(III,JJJ,NCHAR) = 0
0049      C-----------------------------------------------------------
0050      C          RL2DCD IS THE 2-D RUN LENGTH DECODING ROUTINE
0051      C-----------------------------------------------------------
0052                   CALL RL2DCD(ISTART,NIR,IMIN,IMAX,JMIN,JMAX,NCHAR)
0053                   N = NCHAR
0054      C-----------------------------------------------------------
0055      C          THE CHARACTER IMAGE LOCATION WITHIN THE ORIGINAL IMAGE IS
0056      C          SAVED BY STORING THE ARRAY COORDINATES OF THE UPPER LEFT
0057      C          AND LOWER RIGHT CORNERS OF THE SMALLEST ARRAY CONTAINING
0058      C          THE CHARACTER.
0059      C-----------------------------------------------------------
0060                   LOC(1,NCHAR) = IMIN
0061                   LOC(2,NCHAR) = JMIN
0062                   LOC(3,NCHAR) = IMAX
0063                   LOC(4,NCHAR) = JMAX
0064      C
0065                   IF((JMAX-JMIN+1).GT.73 .OR. (IMAX-IMIN+1).GT.62) GOTO 100
0066                   IF((JMAX-JMIN+1).GT.2 .OR. (IMAX-IMIN+1).GT.2) GOTO 70
0067      C
0068                   NCHAR = NCHAR - 1
0069                   GOTO 90
```

```
0070  C
0071  C------------------------------------------------------------
0072  C     COMPARE THE CURRENT CHARACTER WITH THE PREVIOUS CHARACTER TO
0073  C     CHECK WHETHER THEY ARE TWO PIECES OF A BROKEN CHARACTER OR
0074  C     TWO DISTINCT CHARACTERS.  DECISION CRITERIA IS BASED ON
0075  C     VERTICAL AND HORIZONTAL OVERLAP.
0076  C------------------------------------------------------------
0077   70   CONTINUE
0078  D     TYPE *,'N =',NCHAR,(LOC(A,NCHAR),A=1,4)
0079        IF(NCHAR .LT. 2) GOTO 90
0080  C
0081        NM1 = N - 1
0082        IMINO = LOC(1,NM1)
0083        JMINO = LOC(2,NM1)
0084        IMAXO = LOC(3,NM1)
0085        JMAXO = LOC(4,NM1)
0086  C
0087        IHN = IMAX - IMIN + 1
0088        IHO = IMAXO - IMINO + 1
0089        IF(IHN.GT.21 .AND. IHO.GT.21) GOTO 90
0090  C
0091        IWN = JMAX - JMIN + 1
0092        IWO = JMAXO - JMINO + 1
0093        IOVR = 0.5 * IWN
0094        IF(IWO .LT. IWN) IOVR = 0.5 * IWO
0095  C
0096        JON = JMAXO - JMIN + 1             ! JMAXO-JMINN
0097        JNO = JMAX - JMINO + 1             ! JMAXN-JMINO
0098  C
0099        IF(JNO.LT.IOVR .OR. JON.LT.IOVR) GOTO 75
0100        LENGTH = IHN + IHO
0101        OVRLAP = IABS(IMINO-IMIN) + IABS(IMAXO-IMAX)
0102        OLR = OVRLAP / LENGTH
0103        IF(OLR .LT. 0.3) GOTO 75
0104        GOTO 80
0105  C
0106   75   ION = IMAXO - IMIN + 1             ! IMAXO - IMINN
0107        IF(JNO.LT.-4 .OR. ION.GT.6 .OR. IHN.LT.10) GOTO 90
0108  C------------------------------------------------------------
0109  C     PASTE ROUTINE RECONSTRUCTS BROKEN CHARACTERS.
0110  C------------------------------------------------------------
0111   80   CALL PASTE(IMIN,JMIN,IMAX,JMAX,IMINO,JMINO,IMAXO,JMAXO,NCHAR)
0112  D     TYPE *,'N =',NCHAR,(LOC(A,NCHAR),A=1,4)
0113  C
0114        IF (ISTART.GE.NIR) GOTO 100
0115   90   CONTINUE
0116  C
0117  C------------------------------------------------------------
0118  C     SIFT ROUTINE TESTS FOR THE PRESENCE OF CONNECTED CHARACTERS.
0119  C------------------------------------------------------------
0120  100   ISEGFL = 0
0121        NTRIES = NTRIES + 1
```

```
0122                IF(NTRIES .GT. 2) GOTO 200
0123                DO 110 M=1,NCHAR
0124                   CALL SIFT(M)
0125        110     CONTINUE
0126        C
0127    C   D
0128    C   D55  WRITE(1,55) NCHAR
0129    C   D55  FORMAT(/,5X,'NUMBER OF CHARACTERS SEGMENTED =',I2)
0129        200  CONTINUE
0130             RETURN
0131             END
```

PROGRAM SECTIONS

| | Name   | Bytes | Attributes |
|---|--------|-------|------------|
| 0 | $CODE  | 604   | PIC CON REL LCL    SHR   EXE    RD NOWRT LONG |
| 2 | $LOCAL | 116   | PIC CON REL LCL  NOSHR NOEXE   RD   WRT LONG |
| 3 | L1     | 2004  | PIC OVR REL GBL    SHR NOEXE   RD   WRT LONG |
| 4 | L2     | 6080  | PIC OVR REL GBL    SHR NOEXE   RD   WRT LONG |
| 5 | L3     | 2     | PIC OVR REL GBL    SHR NOEXE   RD   WRT LONG |
| 6 | L4     | 2000  | PIC OVR REL GBL    SHR NOEXE   RD   WRT LONG |
| 7 | L5     | 2     | PIC OVR REL GBL    SHR NOEXE   RD   WRT LONG |

Total Space Allocated     10808

ENTRY POINTS

| Address | Type | Name |
|---|---|---|
| 0-00000000 | | SEGMEN |

VARIABLES

| Address | Type | Name | Address | Type | Name | Address | Type | Name |
|---|---|---|---|---|---|---|---|---|
| ** | I*2 | I | ** | I*2 | IHN | 2-00000012 | I*2 | IHU | ** | I*2 | II |
| ** | I*2 | III | 2-00000008 | I*2 | IMAX | ** | I*2 | IMAX0 | 2-00000004 | I*2 | IMIN |
| 2-00000002 | I*2 | IMIN0 | ** | I*2 | ION | ** | I*2 | IOVR | 5-00000000 | I*2 | ISEQFL |
| 2-00000002 | I*2 | ISTART | ** | I*2 | IUN | ** | I*2 | IWO | ** | I*2 | J |
| 2-00000310 | I*2 | JJJ | 2-0000000C | I*2 | JMAX | 2-00000014 | I*2 | JMAX0 | 2-0000000A | I*2 | JMIN |
| 2-00000016 | I*2 | N | ** | I*2 | JMIN0 | ** | I*2 | JON | 4P-00000048 | I*2 | LENGTH |
| 2-00000300 | I*2 | NIR | ** | I*2 | NM1 | 3-00000002 | I*2 | NC | 3-00000000 | I*2 | NCHAR |
| ** | R*4 | OLR | ** | R*4 | OVRLAP | 7-00000000 | I*2 | NTRIES | ** | I*2 | NU |

ARRAYS

| Address | Type | Name | Bytes | Dimensions |
|---|---|---|---|---|
| 4-00000000 | I*2 | INEW | 6000 | (4, 75, 10) |
| 3-00000004 | I*2 | IOLD | 2000 | (5, 200) |
| 6-00000000 | I*2 | IRUN | 2000 | (1000) |
| 4-00001770 | I*2 | LOC | 80 | (4, 10) |

LABELS

| Address | Label | Address | Label | Address | Label | Address | Label | Address | Label | Address | Label |
|---|---|---|---|---|---|---|---|---|---|---|---|
| ** | 10 | ** | 20 | 0-00000078 | 30 | ** | 50 | ** | 60 | 0-00000140 | 70 |
| 0-000001F8 | 75 | 0-00000210 | 80 | 0-00000221 | 90 | 0-0000022E | 100 | 0-0000025B | 110 | 0-0000025B | 200 |

FUNCTIONS AND SUBROUTINES REFERENCED

| Type | Name | Type | Name | Type | Name |
|---|---|---|---|---|---|
| PASTE | | RL2COD | | RL2DCD | SIFT |

```
0001            SUBROUTINE RL2COD(NIR)
0002            IMPLICIT INTEGER*2 (A-Z)
0003            INTEGER*2 IRUN(1000), RLN(4,25), RLO(4,25)
0004            BYTE IPIXL(80)
0005       C
0006            COMMON /L1/NW,NC
0007            COMMON /L3/RLN,NRLN,RLO,NRLO
0008            COMMON /L6/IRUN
0009       C
0010       C-------
0011       C    ** RL2COD ** IS A ROUTINE TO ENCODE AN IMAGE USING A 2-D
0012       C       RUN LENGTH CODING SCHEME.
0013       C-------
0014    C  D        WRITE(1,5)
0015    C  D5    FORMAT (1X,'-RL2COD')
0016            NRLO=0
0017            NIR=0
0018            NR=NW*16
0019            DO 15 J=NC,1,-1
0020            DO 10 I=1,NR
0021               IPIXL(I) = 0
0022               IF(BITO(I,J) .NE. 0) IPIXL(I) = 1
0023    10      CONTINUE
0024       C
0025       C    SCAN AND OBTAIN THE RUN LENGTHS OF ONE LINE OF IMAGE
0026       C
```

```
0028              CALL SKAN(IPIXL,J,NR)
0029              IF(NRLN .EQ. 0) GOTO 50
0030              JJJ = J
0031      C------------------------------------------------
0032      C       DETERMINE THE CORRELATION OR CONNECTEDNESS BETWEEN ADJACENT
0033      C       LINES OF RUN LENGTHS.
0034      C------------------------------------------------
0035              CALL CORR(NIR,JJJ)
0036   50         CONTINUE
0037              IF (NIR.GT.1000) RETURN
0038      C------------------------------------------------
0039      C       SAVE THE JUST PROCESSED RUN LENGTH INFORMATION FOR
0040      C       CORRELATION WITH THE NEXT LINE OF RUN LENGTHS.
0041      C------------------------------------------------
0042              NRLO = NRLN
0043              IF (NRLN.EQ.0) GOTO 15
0044              DO 35 II = 1,4
0045              DO 30 JJ = 1,NRLN
0046   30         RLO(II,JJ) = RLN(II,JJ)
0047   35         CONTINUE
0048   15         CONTINUE
0049              RETURN
0050              END
```

PROGRAM SECTIONS

| Name | Bytes | Attributes | | | | | | | |
|---|---|---|---|---|---|---|---|---|---|
| 0 $CODE | 191 | PIC | CON | REL | LCL | SHR | EXE | RD | NOWRT LONG |
| 2 $LOCAL | 128 | PIC | CON | REL | LCL | NOSHR | NOEXE | RD | WRT LONG |
| 3 L1 | 4 | PIC | OVR | REL | GBL | SHR | NOEXE | RD | WRT LONG |
| 4 L3 | 404 | PIC | OVR | REL | GBL | SHR | NOEXE | RD | WRT LONG |
| 5 L6 | 2000 | PIC | OVR | REL | GBL | SHR | NOEXE | RD | WRT LONG |

Total Space Allocated  2727

ENTRY POINTS

| Address | Type | Name |
|---|---|---|
| 0-00000000 |  | RL2COD |

VARIABLES

| Address | Type | Name | Address | Type | Name | Address | Type | Name |
|---|---|---|---|---|---|---|---|---|
| 2-00000054 | I*2 | I | 2-00000052 | I*2 | J | ** | I*2 | JJ |
| 2-00000056 | I*2 | JJJ | AP-00000004@ | I*2 | NIR | 2-00000050 | I*2 | NR |
| 4-000000C8 | I*2 | NRLN | 3-00000000 | I*2 | NW | | | |
| ** | I*2 | II | 3-00000002 | I*2 | NC | | | |
| 4-00000192 | I*2 | NRLO | | | | | | |

ARRAYS

| Address | Type | Name | Bytes | Dimensions |
|---|---|---|---|---|
| 2-00000000 | L*1 | IPIXL | 80 | (80) |
| 5-00000000 | I*2 | IRUN | 2000 | (1000) |
| 4-00000000 | I*2 | RLN | 200 | (4, 25) |
| 4-000000CA | I*2 | RLO | 200 | (4, 25) |

LABELS

| Address | Label | Address | Label | Address | Label | Address | Label | Address | Label |
|---|---|---|---|---|---|---|---|---|---|
| ** | 10 | 0-000000B5 | 15 | ** | 30 | ** | 35 | 0-00000070 | 50 |

FUNCTIONS AND SUBROUTINES REFERENCED

| Type | Name | Type | Name |
|---|---|---|---|
| I*2 | BITO | | CORR |
| | | | SKAN |

```
0001   C-----------------------------------------------------------
0002         SUBROUTINE SKAN(IPIXL,ISKN,NR)
0003         IMPLICIT INTEGER*2 (A-Z)
0004         INTEGER*2 RLN(4,25)
0005         BYTE IPIXL(80)
0006   C
0007         COMMON /L3/RLN,NRLN
0008   C
0009   C    ** SKAN ** ENCODES THE RUN LENGTHS OF A SINGLE LINE OF
0010   C    PIXELS.
0011   C-----------------------------------------------------------
0012   D     WRITE(1,5) ISKN
0013   D  5  FORMAT(1X,'-SKAN LINE:'I4)
0014         NRLN=0
0015         IRL=0
0016         IGRL=0
0017         DO 10 I=1,NR
0018         IF (IPIXL(I).NE.IGRL) GOTO 20
0019         IRL = IRL + 1
0020         GOTO 10
0021   20    IF (IGRL.EQ.0) GOTO 30
0022         NRLN = NRLN + 1
0023         RLN(1,NRLN) = I-IRL
0024         RLN(2,NRLN) = IRL
0025         RLN(3,NRLN) = IGRL
0026         RLN(4,NRLN) = 0
0027   30    IGRL = IPIXL(I)
0028         IRL = 1
```

```
0029        10   CONTINUE
0030        C
0031        C         RLN(1,*) IS THE TOP OF THE RUN LENGTH
0032        C         RLN(2,*) IS THE LENGTH OF THE RUN
0033        C         RLN(3,*) IS THE GRAY LEVEL OF THE RUN
0034        C         RLN(4,*) EVENTUALLY BECOMES THE LOCATION OF THE LAST
0035        C         ENCODING WORD FOR THE RUN LENGTH IN THE SEQUENCE OF ALL
0036        C         ENCODING WORDS.
0037        C
0038                  IF(IGRL .EQ. 0) GOTO 40
0039                  NRLN = NRLN + 1
0040                  RLN(1,NRLN) = NR - IRL + 1
0041                  RLN(2,NRLN) = IRL
0042                  RLN(3,NRLN) = IGRL
0043                  RLN(4,NRLN) = 0
0044        40   CONTINUE
0045             RETURN
0046             END
```

PROGRAM SECTIONS

| Name | Bytes | Attributes |
|---|---|---|
| 0 $CODE | 155 | PIC CON REL LCL SHR EXE RD NOWRT LONG |
| 2 $LOCAL | 24 | PIC CON REL LCL NOSHR NOEXE RD WRT LONG |
| 3 L3 | 202 | PIC OVR REL GBL SHR NOEXE RD WRT LONG |

Total Space Allocated  381

ENTRY POINTS

| Address | Type | Name |
|---|---|---|
| 0-00000000 | | SKAN |

VARIABLES

| Address | Type | Name | Address | Type | Name | Address | Type | Name |
|---|---|---|---|---|---|---|---|---|
| ** | I*2 | I | ** | I*2 | IGRL | ** | I*2 | IRL |
| AP-000000CE | I*2 | NR | 3-000000C8 | I*2 | NRLN | AP-00000008@ | I*2 | ISKN |

ARRAYS

| Address | Type | Name | Bytes | Dimensions |
|---|---|---|---|---|
| AP-00000004@ | L*1 | IPIXL | 80 | (80) |
| 3-00000000 | I*2 | RLN | 200 | (4, 25) |

LABELS

| Address | Label | Address | Label | Address | Label | Address | Label |
|---------|-------|---------|-------|---------|-------|---------|-------|
| 0-0000006B | 10 | 0-00000040 | 20 | 0-00000064 | 30 | 0-0000009A | 40 |

```
0001      C------------------------------------------------------------
0002              SUBROUTINE CORR(NIR,IROW)
0003              IMPLICIT INTEGER*2 (A-Z)
0004              INTEGER*2 IRUN(1000), RLN(4,25), RLO(4,25)
0005      C
0006              COMMON /L3/RLN,NRLN,RLO,NRLO
0007              COMMON /L4/ISEGFL
0008              COMMON /L6/IRUN
0009      C
0010      C------------------------------------------------------------
0011      C      ** CORR ** CORRELATES RUN LENGTHS FROM LINE-TO-LINE AND
0012      C      CALLS UPDATE WHEN CORRELATIONS OCCUR (A CORRELATION IMPLIES
0013      C      A DEGREE OF OVERLAP OF RUN LENGTHS BETWEEN LINES).
0014      C------------------------------------------------------------
0015              NC = 1
0016              IF(ISEGFL.EQ.1) NC = 0
0017      C
0018      C      NC IS A PARAMETER TO SPECIFY THE DEGREE OF OVERLAP
0019      C      REQUIRED FOR A CORRELATION (NEGATIVE VALUES CAN BE USED
0020      C      TO ALLOW GAPS BETWEEN LINES).
0021      C------------------------------------------------------------
0022      C  D          WRITE(1,5)
0023      C  D5   FORMAT(1X,'-CORR')
0024              IF (NRLN.EQ.0) GOTO 100
0025              DO 10 I = 1,NRLN
0026              NFLAG = 0
0027              IF (NRLO.EQ.0) GOTO 60
0028              DO 20 J = 1,NRLO
0029              IFED = RLN(1,I) - RLO(1,J)
0030              IBED = RLN(2,I) - RLO(2,J)
0031      C
0032      C      TEST A AND B FOR CORRELATION BETWEEN RUN LENGTHS IN
0033      C      ADJACENT LINES
0034      C
0035              IA = 1 + IFED - RLO(2,J)
0036              IB = 1 - IFED - RLN(2,I)
0037              IF(IA.GT.NC .OR. IB.GT.NC) GOTO 20
0038              IF(NFLAG.EQ.1 .OR. RLO(3,J).EQ.0) GOTO 50
0039              NFLAG = 1
0040      C
0041      C      UPDATE THE LOCATIONS OF THE LAST ENCODING WORDS FOR ALL
0042      C      THE RUN LENGTHS BEING PROCESSED
0043      C
0044              LOC = RLO(4,J)
0045              RLN(4,I) = LOC
0046              RLO(3,J) = 0
```

```
0047              DO 30 K = 1,NRLO
0048              IF (RLO(4,K).GE.LOC) RLO(4,K) = RLO(4,K) + 2
0049         30   DO 40 K = 1,NRLN
0050              IF (RLN(4,K).GE.LOC) RLN(4,K) = RLN(4,K) + 2
0051         40   C
0052         C        UPDATE THE 2-D ENCODING
0053         C
0054              CALL UPDATE(NIR,LOC,IFED,IBED)
0055              IF (NIR.GT.1000) RETURN
0056              GOTO 20
0057         50   CONTINUE
0058              JJJ = J
0059              III = I
0060              IF (RLN(4,I).EQ.0) GOTO 70
0061              IF (RLO(3,J).NE.0) CALL INSERT(NIR,JJJ,III)
0062              GOTO 20
0063         70   IF(RLO(3,J) .EQ. 0) CALL STARTF(NIR,IROW,III)
0064              CALL INSERT(NIR,JJJ,III)
0065              NFLAG = 1
0066         20   CONTINUE
0067         60   CONTINUE
0068              III = I
0069              IF(RLN(4,I).EQ.0) CALL STARTF(NIR,IROW,III)
0070         10   CONTINUE
0071         100  CONTINUE
0072              RETURN
0073              END
```

PROGRAM SECTIONS

| Name | Bytes | Attributes | | | | | | |
|---|---|---|---|---|---|---|---|---|
| 0  $CODE  | 405 | PIC | CON | REL | LCL | SHR | EXE | RD NOWRT LONG |
| 2  $LOCAL | 68  | PIC | CON | REL | LCL | NOSHR | NOEXE | RD WRT LONG |
| 3  L3     | 404 | PIC | OVR | REL | GBL | SHR | NOEXE | RD WRT LONG |
| 4  L4     | 2   | PIC | OVR | REL | GBL | SHR | NOEXE | RD WRT LONG |
| 5  L6     | 2000| PIC | OVR | REL | GBL | SHR | NOEXE | RD WRT LONG |

Total Space Allocated    2879

ENTRY POINTS

| Address | Type | Name |
|---|---|---|
| 0-00000000 | | CORR |

VARIABLES

| Address | Type | Name | Address | Type | Name | Address | Type | Name |
|---|---|---|---|---|---|---|---|---|
| 2-00000000 | I*2 | I | ** | I*2 | IA | ** | I*2 | IB | 2-00000008 | I*2 | IBED |
| 2-00000006 | I*2 | IFED | 2-0000000E | I*2 | III | AP-0000008@ | I*2 | IROW | 4-00000000 | I*2 | ISEGFL |
| ** | I*2 | J | 2-0000000C | I*2 | JJJ | ** | I*2 | K | 2-0000000A | I*2 | LOC |
| ** | I*2 | NC | ** | I*2 | NFLAG | AP-00000004@ | I*2 | NIR | 3-000000C8 | I*2 | NRLN |
| 3-00000192 | I*2 | NRLO | | | | | | | | | |

ARRAYS

| Address | Type | Name | Bytes | Dimensions |
|---|---|---|---|---|
| 5-00000000 | I*2 | IRUN | 2000 | (1000) |
| 3-00000000 | I*2 | RLN | 200 | (4, 25) |
| 3-000000CA | I*2 | RLO | 200 | (4, 25) |

LABELS

| Address | Label | Address | Label | Address | Label | Address | Label | Address | Label |
|---|---|---|---|---|---|---|---|---|---|
| ** | 10 | 0-00000169 | 20 | ** | 30 | 40 | 0-00000118 | 50 | 0-0000016F | 60 |
| 0-00000140 | 70 | 0-00000194 | 100 | | | | | | |

FUNCTIONS AND SUBROUTINES REFERENCED

| Type | Name | Type | Name | Type | Name |
|---|---|---|---|---|---|
| | INSERT | | STARTF | | UPDATE |

```
0001        C
0002              SUBROUTINE UPDATE(NIR,LOC,IFED,IBED)
0003              IMPLICIT INTEGER*2 (A-Z)
0004              INTEGER*2 IRUN(1000)
0005        C
0006              COMMON /L6/IRUN
0007        C
0008        C     ** UPDATE ** UPDATES THE ENCODING WORDS IN 'IRUN' BY
0009        C     INSERTING THE RUN LENGTH INFORMATION IN THE
0010        C     APPROPRIATE LOCATION
0011        C
0012        C
0013      C D     WRITE(1,5)
0014      C D5    FORMAT(1X,'-UPDATE')
0015              NN = NIR - LOC
0016              IF (NN.EQ.0) GOTO 20
0017              DO 10 I = 1,NN
```

```
0018              II = NIR - I + 1
0019   10         IRUN(II + 2) = IRUN(II)
0020   20         CONTINUE
0021              IRUN(LOC+1) = IFED
0022              IRUN(LOC+2) = IBED
0023        C-------
0024        C     IFED IS THE CHANGE IN THE RUN LENGTH STARTING COLUMN
0025        C     IBED IS THE CHANGE IN THE RUN LENGTH
0026        C-------
0027              NIR = NIR + 2
0028   C    D     WRITE(1,15) (IRUN(K),K=1,NIR+5)
0029   C    D15   FORMAT(1X,2015)
0030              RETURN
0031              END
```

PROGRAM SECTIONS

```
   Name              Bytes    Attributes

0  $CODE               80     PIC CON REL LCL  SHR    EXE    RD NOWRT LONG
2  $LOCAL               4     PIC CON REL LCL  NOSHR  NOEXE  RD WRT   LONG
3  L6                2000     PIC OVR REL GBL  SHR    NOEXE  RD WRT   LONG

Total Space Allocated   2084
```

ENTRY POINTS

```
Address        Name 0-00000000     UPDATE
```

VARIABLES

```
Address         Type  Name       Address         Type  Name        Address  Type  Name

**              I*2   I          AP-00000010@    I*2   IFED        **       I*2   II
AP-00000008@    I*2   LOC        AP-00000004@    I*2   NN
```

ARRAYS

```
Address         Type  Name       Bytes   Dimensions 3-00000000      I*2   IRUN       2000    (1000)
```

LABELS

```
Address        Label       Address         Label

**             10          0-00000031      20
```

```
0001    C------------------------------------------------------------
0002            SUBROUTINE STARTF(NIR,II,I)
0003            IMPLICIT INTEGER*2 (A-Z)
0004            INTEGER*2 IRUN(1000), RLN(4,25)
0005    C
0006            COMMON /L3/RLN,NRLN
0007            COMMON /L6/IRUN
0008    C
0009    C------------------------------------------------------------
0010    C       STARTF STARTS A NEW SEQUENCE OF ENCODING WORDS FOR EACH
0011    C       SIMPLE 2-D SHAPE ENCODED
0012    C------------------------------------------------------------
0013  C         WRITE(1,5)
0014  C D5      FORMAT(1X,'-STARTF')
0015            LOC = RLN(4,I)
0016            IF (LOC.NE.0) GOTO 10
0017            IRUN(NIR+1) = RLN(3,I) + 9990
0018            IRUN(NIR+2) = II
0019            IRUN(NIR+3) = RLN(1,I)
0020            IRUN(NIR+4) = RLN(2,I)
0021            NIR = NIR + 4
0022            RLN(4,I) = NIR
0023            IF (NIR.GT.1000) RETURN
0024    10      CONTINUE
0025  C         WRITE(1,15) (IRUN(K),K=1,NIR+5)
0026  C D15     FORMAT(1X,20I5)
0027            RETURN
0028            END
```

PROGRAM SECTIONS

| Name | Bytes | Attributes | | | | | |
|---|---|---|---|---|---|---|---|
| 0  $CODE | 133 | PIC | CON | REL | LCL | SHR | EXE RD NOWRT LONG |
| 3  L3 | 202 | PIC | OVR | REL | GBL | SHR | NOEXE RD WRT LONG |
| 4  L6 | 2000 | PIC | OVR | REL | GBL | SHR | NOEXE RD WRT LONG |

Total Space Allocated    2335

ENTRY POINTS

| Address | Type | Name |
|---|---|---|
| 0-00000000 | | STARTF |

VARIABLES

| Address | Type | Name | Address | Type | Name | Address | Type | Name |
|---|---|---|---|---|---|---|---|---|
| AP-000000000@ | I*2 | I | AP-00000008@ | I*2 | II | ** | I*2 | LOC |
| 3-000000C8 | I*2 | NRLN | | | | AP-00000004@ | I*2 | NIR |

```
ARRAYS
        Address     Type    Name            Bytes    Dimensions 4-00000000  I*2     IRUN            2000     (1000)
        3-00000000  I*2     RLN              200     (4, 25)

LABELS
        Address     Label 0-00000084  10

0001    C--------------------------------------------------------------
0002            SUBROUTINE INSERT(NIR,KO,KN)
0003            IMPLICIT INTEGER*2 (A-Z)
0004            INTEGER*2 IRUN(1000), ITEMP(100), RLN(4,25), RLO(4,25)
0005    C
0006            COMMON /L3/RLN,NRLN,RLO,NRLO
0007            COMMON /L6/IRUN
0008    C
0009    C--------------------------------------------------------------
0010    C  ** INSERT ** SHIFTS AN ASSOCIATED RECORD FROM ITS CURRENT LOCATION
0011    C  IN THE ENCODING ARRAY (IRUN) TO A LOCATION ADJACENT TO THE LAST
0012    C  RECORD OF THE CHARACTER IT IS ASSOCIATED WITH.  AT THE SAME TIME
0013    C  THE HEADER WORD OF THE SHIFTED RECORD IS MODIFIED TO SIGNIFY THAT
0014    C  IT IS NOW AN ASSOCIATED RECORD.
0015    C--------------------------------------------------------------
0016          D     WRITE(1,5)
0017          D  5  FORMAT(1X,'-INSERT')
0018            IFLAG = 0
0019            IO = RLO(4,KO)
0020            IN = RLN(4,KN)
0021            IMAX = IO
0022            IMIN = IN
0023            IF (IN.LE. IO) GOTO 80
0024            IMAX = IN
0025            IMIN = IO
0026    C
0027      80    IF(IRUN(IMIN+1) .EQ. 9991) GOTO 90
0028            IMIN = IMIN + 1
0029            IF(IMIN .GE. IMAX) RETURN
0030            GOTO 80
0031    C
0032      90    IF(IRUN(IMAX+1).NE. 9901 .OR. (IMAX+1).GT.NIR) GOTO 100
0033            IMAX = IMAX + 1
0034      95    IF(IRUN(IMAX+1).EQ. 9991 .OR. (IMAX+1).GT.NIR) GOTO 100
0035            GOTO 95
0036    C
0037     100    CONTINUE
0038            IF (IFLAG .EQ. 1) IMIN = IMIN + INS
```

```
0039            DO 10 I = 1,IMAX
0040              II = IMAX - I + 1
0041              IF (IRUN(II).LT.9900) GOTO 10
0042              IF (IRUN(II).LT.9990) IFLAG = 1
0043              IF (IRUN(II).GT.9990) IFLAG = 0
0044              IF (IRUN(II).GT.9990) IRUN(II) = IRUN(II) - 90
0045              INS = IMAX - II + 1
0046              JEND = IMAX - IMIN - INS
0047              IF (JEND.LE.0.OR.INS.LE.0) RETURN
0048              DO 20 J = 1,INS
0049                JJ = IMAX - J + 1
0050 20           ITEMP(J) = IRUN(JJ)
0051              DO 30 J = 1,JEND
0052                JJ = IMAX - J + 1
0053                JJM = JJ - INS
0054 30           IRUN(JJ) = IRUN(JJM)
0055              DO 40 J = 1,INS
0056                JJ = IMIN + INS - J + 1
0057 40           IRUN(JJ) = ITEMP(J)
0058 C-----------------------------------------------------------------
0059 C       UPDATE THE LOCATIONS (OR POINTERS) OF THE LAST ENCODING WORD OF
0060 C       EACH RECORD THAT IS AFFECTED BY THE SHIFTING PROCESS.
0061 C-----------------------------------------------------------------
0062              DO 50 J = 1,NRLO
0063                IF(RLO(4,J).EQ.IMAX) GOTO 45
0064                IF (RLO(4,J).LE.IMIN.OR.RLO(4,J).GT.IMAX) GOTO 50
0065                RLO(4,J) = RLO(4,J) + INS
0066                GOTO 50
0067 45           RLO(4,J) = IMIN + INS
0068 50           CONTINUE
0069 C
0070              DO 60 J = 1,NRLN
0071                IF(RLN(4,J).EQ.IMAX) GOTO 55
0072                IF (RLN(4,J).LE.IMIN.OR.RLN(4,J).GT.IMAX) GOTO 60
0073                RLN(4,J) = RLN(4,J) + INS
0074                GOTO 60
0075 55           RLN(4,J) = IMIN + INS
0076 60           CONTINUE
0077              GOTO 700
0078 10         CONTINUE
0079 700       CONTINUE
0080           IF (IFLAG.EQ.1) GOTO 100
0081 500       CONTINUE
0082 D         WRITE(1,15) (IRUN(K),K=1,NIR+5)
0083 D15       FORMAT(1X,2015)
0084           RETURN
0085           END
```

PROGRAM SECTIONS

| Name | Bytes | Attributes |
|---|---|---|
| 0 $CODE | 512 | PIC CON REL LCL SHR EXE RD NOWRT LONG |
| 2 $LOCAL | 212 | PIC CON REL LCL NOSHR NOEXE RD WRT LONG |
| 3 L3 | 404 | PIC OVR REL GBL SHR NOEXE RD WRT LONG |
| 4 L6 | 2000 | PIC OVR REL GBL SHR NOEXE RD WRT LONG |

Total Space Allocated    3128

ENTRY POINTS

| Address | Type | Name |
|---|---|---|
| 0-00000000 | | INSERT |

VARIABLES

| Address | Type | Name | Address | Type | Name | Address | Type | Name |
|---|---|---|---|---|---|---|---|---|
| ** | I*2 | I | 2-000000C8 | I*2 | IFLAG | ** | I*2 | II | ** | I*2 | IMAX |
| ** | I*2 | IMIN | ** | I*2 | IN | 2-000000CA | I*2 | INS | ** | I*2 | IO |
| ** | I*2 | J | ** | I*2 | JEND | ** | I*2 | JJ | ** | I*2 | JJM |
| AP-000000C0 | I*2 | KN | AP-00000080 | I*2 | KO | AP-00000040 | I*2 | NIR | 3-000000C8 | I*2 | NRLN |
| 3-00000192 | I*2 | NRLO | | | | | | | | | |

ARRAYS

| Address | Type | Name | Bytes | Dimensions |
|---|---|---|---|---|
| 4-00000000 | I*2 | IRUN | 2000 | (1000) |
| 2-00000000 | I*2 | ITEMP | 200 | (100) |
| 3-00000000 | I*2 | RLN | 200 | (4, 25) |
| 3-000000CA | I*2 | RLO | 200 | (4, 25) |

LABELS

| Address | Label | Address | Label | Address | Label | Address | Label | Address | Label |
|---|---|---|---|---|---|---|---|---|---|
| 0-000001EC | 10 | ** | 20 | ** | 30 | 0-000001A4 | 40 | 0-000001AA | 50 |
| 0-000001DC | 55 | 0-000001E1 | 60 | 0-0000003F | 80 | ** | 45 | 0-00000098 | 100 |
| ** | 500 | 0-000001F2 | 700 | | | 0-00000064 | 90 | | 95 |

```
0001            SUBROUTINE RL2DCD(ISTART,NIR,IMIN,IMAX,JMIN,JMAX,M)
0002            IMPLICIT INTEGER*2 (A-Z)
0003            INTEGER*2 IRUN(1000), INEW(4,75,10), ILOC(2,800)
0004            BYTE IPIX(50,75)
0005      C
0006      C
0007            COMMON /L2/INEW
0008            COMMON /L6/IRUN
0009      C
0010      C     ** RL2DCD ** DECODES THE ENCODED INFORMATION CONTAINED IN IRUN
0011      C                  AND RECONSTRUCTS THE IMAGE IN INEW
0012      C
0013      C
0014      C  D   WRITE(1,5)
0015      C  D5  FORMAT(1X,'-RL2DCD-')
0016            JSUM = 0
0017            ISUM = ISTART - 1
0018            IMIN = 10000
0019            JMIN = 10000
0020            IMAX = -10000
0021            JMAX = -10000
0022            IFLAG = 0
0023            DO 5 I=1,50
0024            DO 5 J=1,75
0025      C5    IPIX(I,J) = 0
0026      C
0027            DO 10 K = ISTART,NIR
0028            IF (K.LE.ISUM) GOTO 10
0029            IF (IRUN(K).GT.9990.AND.IFLAG.EQ.1) GOTO 50
0030            IF (IRUN(K).GT.9990.AND.IFLAG.EQ.0) IFLAG = 1
0031            IF (IRUN(K).LT.9900) GOTO 20
0032            LEVEL = IRUN(K) - 9990
0033            IF (LEVEL.LT.0) LEVEL = LEVEL + 90
0034            JJ = IRUN(K + 1)
0035            IS = IRUN(K + 2)
0036            ID = IRUN(K + 3)
0037            IE = IS - 1 + ID
0038            ISUM = ISUM + 4
0039            GOTO 60
0040  20        IS = IS + IRUN(K)
0041            ID = ID + IRUN(K + 1)
0042            IE = IS - 1 + ID
0043            ISUM = ISUM + 2
0044            JJ = JJ - 1
0045            IF (IS.LT.IMIN) IMIN = IS
0046            IF (IE.GT.IMAX) IMAX = IE
0047            IF (JJ.LT.JMIN) JMIN = JJ
0048            IF (JJ.GT.JMAX) JMAX = JJ
0049  60        DO 40 I = IS,IE
0050            JSUM = JSUM + 1
0051            ILOC(1,JSUM) = I
0052            ILOC(2,JSUM) = JJ
```

```
0053  40         CONTINUE
0054  10      CONTINUE
0055  50      IDEL = IMIN - 2
0056          JDEL = JMIN - 2
0057          DO 55 J = 1,JSUM
0058             II = ILOC(1,J) - IDEL
0059             JJ = ILOC(2,J) - JDEL
0060  C          IPIX(II,JJ) = 1
0061             CALL PBN(II,JJ,M,1)
0062  55      CONTINUE
0063  C
0064  C       NC = JMAX - JMIN + 3
0065  C       NR = IMAX - IMIN + 3
0066  C       WRITE(1,65) NR,NC
0067  C65     FORMAT(/,5X,'NROWS =',I5,5X,'NCOLS =',I5)
0068  C       DO 70 I=1,NR
0069  C       WRITE(1,75) (IPIX(I,J),J=1,NC)
0070  C75     FORMAT(5X,70I1)
0071  C70     CONTINUE
0072          ISTART = K
0073          RETURN
0074          END
```

PROGRAM SECTIONS

| Name | Bytes | Attributes |
|---|---|---|
| 0 $CODE  | 334 | PIC CON REL LCL SHR EXE RD NOWRT LONG |
| 1 $PDATA | 4 | PIC CON REL LCL SHR NOEXE RD NOWRT LONG |
| 2 $LOCAL | 3232 | PIC CON REL LCL NOSHR NOEXE RD WRT LONG |
| 3 L2 | 6000 | PIC OVR REL GBL SHR NOEXE RD WRT LONG |
| 4 L6 | 2000 | PIC OVR REL GBL SHR NOEXE RD WRT LONG |

Total Space Allocated       11570

ENTRY POINTS

| Address | Type | Name |
|---|---|---|
| 0-00000000 | | RL2DCD |

VARIABLES

| Address | Type | Name | Address | Type | Name | Address | Type | Name |
|---|---|---|---|---|---|---|---|---|
| ** | I*2 | I | 2-00000CB8 | I*2 | ID | ** | I*2 | IDEL | ** | I*2 | IE |
| ** | I*2 | IFLAG | 2-00000CBA | I*2 | II | AP-0000010@ | I*2 | IMAX | AP-000000C@ | I*2 | IMIN |
| 2-00000CB6 | I*2 | IS | AP-0000004@ | I*2 | ISTART | ** | I*2 | ISUM | ** | I*2 | J |
| ** | I*2 | JDEL | 2-00000CB4 | I*2 | JJ | AP-0000018@ | I*2 | JMAX | AP-0000014@ | I*2 | JMIN |
| ** | I*2 | JSUM | 2-00000CB0 | I*2 | K | ** | I*2 | LEVEL | AP-000001C@ | I*2 | M |
| AP-0000008@ | I*2 | NIR | | | | | | | | | |

ARRAYS

| Address | Type | Name | Bytes | Dimensions |
|---|---|---|---|---|
| 2-00000000 | I*2 | ILOC | 3200 | (2, 800) |
| 3-00000000 | I*2 | INEW | 6000 | (4, 75, 10) |
| 4-00000000 | I*2 | IRUN | 2000 | (1000) |

LABELS

| Address | Label | Address | Label | Address | Label | Address | Label | Address | Label |
|---|---|---|---|---|---|---|---|---|---|
| 0-00000102 | 10 | 0-000000A4 | 20 | ** | 40 | 0-00000109 | 50 | ** | 55 |
| 0-000000BA | 60 | | | | | | | | |

FUNCTIONS AND SUBROUTINES REFERENCED

| Type | Name |
|---|---|
| | PBN |

COMMAND QUALIFIERS

FORTRAN/NOF77/NOOBJ/LIST SEGMEN.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:        11.23 seconds
Elapsed Time:    12.29 seconds
Page Faults:     809
Dynamic Memory:  408 pages

```
0001   C-----------------------------------------
0002          INTEGER FUNCTION BITN(I,J,M)
0003          IMPLICIT INTEGER*2 (A-Z)
0004          INTEGER*2 INEW(4,75,10), MSK(16)
0005          COMMON /L2/INEW
0006          COMMON /L5/MSK
0007   C
0008          BITN = 0
0009          BITADD = MOD(I-1,16) + 1
0010          WADD = (I-1)/16 + 1
0011   C
0012          IF((INEW(WADD,J,M) .AND. MSK(BITADD)) .NE. 0) BITN = 1
0013          RETURN
0014          END
```

PROGRAM SECTIONS

| Name | Bytes | Attributes |
|---|---|---|
| 0 $CODE | 94 | PIC CON REL LCL SHR EXE RD NOWRT LONG |
| 2 $LOCAL | 4 | PIC CON REL LCL NOSHR NOEXE RD WRT LONG |
| 3 L2 | 6000 | PIC OVR REL GBL SHR NOEXE RD WRT LONG |
| 4 L5 | 32 | PIC OVR REL GBL SHR NOEXE RD WRT LONG |

Total Space Allocated    6130

ENTRY POINTS

| Address | Type | Name |
|---|---|---|
| 0-00000000 | I*4 | BITN |

VARIABLES

| Address | Type | Name | Address | Type | Name | Address | Type | Name |
|---|---|---|---|---|---|---|---|---|
| AP-00000004@ | I*2 | I | AP-00000008@ | I*2 | J | AP-0000000C@ | I*2 | M |
| ** | I*2 | BITADD | | | | | | |
| ** | I*2 | WADD | | | | | | |

ARRAYS

| Address | Type | Name | Bytes | Dimensions |
|---|---|---|---|---|
| 3-00000000 | I*2 | INEW | 6000 | (4, 75, 10) |
| 4-00000000 | I*2 | MSK | 32 | (16) |

```
0001        C-----------------------------------------
0002                INTEGER FUNCTION BITO(I,J)
0003                IMPLICIT INTEGER*2 (A-Z)
0004                INTEGER*2 IOLD(5,200), MSK(16)
0005                COMMON /L1/II,JJ,IOLD
0006                COMMON /L5/MSK
0007        C
0008                BITO = 0
0009                BITADD = MOD(I-1,16) + 1
0010                WADD = (I-1)/16 + 1
0011        C
0012                IF((IOLD(WADD,J) .AND. MSK(BITADD)) .NE. 0) BITO = 1
0013                RETURN
0014                END
```

PROGRAM SECTIONS

| Name      | Bytes | Attributes |
|---|---|---|
| 0 $CODE   | 80   | PIC CON REL LCL   SHR   EXE   RD NOWRT LONG |
| 2 $LOCAL  | 4    | PIC CON REL LCL   NOSHR NOEXE RD WRT   LONG |
| 3 L1      | 2004 | PIC OVR REL GBL   SHR   NOEXE RD WRT   LONG |
| 4 L5      | 32   | PIC OVR REL GBL   SHR   NOEXE RD WRT   LONG |

Total Space Allocated    2120

ENTRY POINTS

| Address | Type | Name |
|---|---|---|
| 0-00000000 | I*4 | BITO |

VARIABLES

| Address | Type | Name | Address | Type | Name | Address | Type | Name |
|---|---|---|---|---|---|---|---|---|
| **         | I*2 | BITADD | AP-00000004@ | I*2 | I    | 3-00000000 | I*2 | II |
| 3-00000002 | I*2 | JJ     | **           | I*2 | WADD | AP-00000008@ | I*2 | J |

ARRAYS

| Address    | Type | Name | Bytes | Dimensions |
|---|---|---|---|---|
| 3-00000004 | I*2  | IOLD | 2000  | (5, 200) |
| 4-00000000 | I*2  | MSK  | 32    | (16) |

```
0001  C------
0002        SUBROUTINE PBN(I,J,M,BIT)
0003        IMPLICIT INTEGER*2 (A-Z)
0004        INTEGER*2 INEW(4,75,10), MSK(16)
0005        COMMON /L2/INEW
0006        COMMON /L5/MSK
0007  C
0008        BITADD = MOD(I-1,16) + 1
0009        WADD = (I-1)/16 + 1
0010        IF(BIT .EQ. 1) GOTO 10
0011        INEW(WADD,J,M) = IAND(INEW(WADD,J,M),NOT(MSK(BITADD)))
0012        RETURN
0013  C
0014  10    INEW(WADD,J,M) = IOR(INEW(WADD,J,M),MSK(BITADD))
0015        RETURN
0016        END
```

PROGRAM SECTIONS

| Name | Bytes | Attributes |
|---|---|---|
| 0 $CODE | 124 | PIC CON REL LCL SHR EXE RD NOWRT LONG |
| 3 L2 | 6000 | PIC OVR REL GBL SHR NOEXE RD WRT LONG |
| 4 L5 | 32 | PIC OVR REL GBL SHR NOEXE RD WRT LONG |

Total Space Allocated  6156

ENTRY POINTS

| Address | Type | Name |
|---|---|---|
| 0-00000000 | | PBN |

VARIABLES

| Address | Type | Name | Address | Type | Name | Address | Type | Name |
|---|---|---|---|---|---|---|---|---|
| AP-00000010@ | I*2 | BIT | ** | I*2 | BITADD | AP-00000004@ | I*2 | I |
| AP-0000000C@ | I*2 | M | ** | I*2 | WADD | AP-00000008@ | I*2 | J |

ARRAYS

| Address | Type | Name | Bytes | Dimensions |
|---|---|---|---|---|
| 3-00000000 | I*2 | INEW | 6000 | (4, 75, 10) |
| 4-00000000 | I*2 | MSK | 32 | (16) |

LABELS

| Address | Label |
|---|---|
| 0-00000050 | 10 |

```
0001    C-----
0002            SUBROUTINE PBO(I,J,BIT)
0003            IMPLICIT INTEGER*2 (A-Z)
0004            INTEGER*2 IOLD(5,200), MSK(16)
0005            COMMON /L1/II,JJ,IOLD
0006            COMMON /L5/MSK
0007    C
0008            BITADD = MOD(I-1,16) + 1
0009            WADD = (I-1)/16 + 1
0010            IF(BIT .EQ. 1) GOTO 10
0011            IOLD(WADD,J) = IAND(IOLD(WADD,J),NOT(MSK(BITADD)))
0012            RETURN
0013    C
0014    10      IOLD(WADD,J) = IOR(IOLD(WADD,J),MSK(BITADD))
0015            RETURN
0016            END
```

PROGRAM SECTIONS

| Name | Bytes | Attributes | | | | | | | |
|---|---|---|---|---|---|---|---|---|---|
| 0 $CODE | 98 | PIC | CON | REL | LCL | SHR | EXE | RD | NOWRT LONG |
| 3 L1 | 2004 | PIC | OVR | REL | GBL | SHR | NOEXE | RD | WRT LONG |
| 4 L5 | 32 | PIC | OVR | REL | GBL | SHR | NOEXE | RD | WRT LONG |

Total Space Allocated 2134

ENTRY POINTS

| Address | Type | Name |
|---|---|---|
| 0-00000000 | | PBO |

VARIABLES

| Address | Type | Name | Address | Type | Name | Address | Type | Name |
|---|---|---|---|---|---|---|---|---|
| AP-0000000C@ | I*2 | BIT | ** | I*2 | BITADD | AP-00000004@ | I*2 | I |
| AP-00000008@ | I*2 | J | 3-00000002 | I*2 | JJ | ** | I*2 | WADD |
| | | | | | | 3-00000000 | I*2 | II |

ARRAYS

| Address | Type | Name | Bytes | Dimensions |
|---|---|---|---|---|
| 3-00000004 | I*2 | IOLD | 2000 | (5,200) |
| 4-00000000 | I*2 | MSK | 32 | (16) |

LABELS

| Address | Label |
|---|---|
| 0-00000044 | 10 |

COMMAND QUALIFIERS

FORTRAN/NOF77/NOOBJ/LIST BITFNC.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19 /NOCROSS_REFERENCE /NOD_LINES /NOEXTEND_SOURCE /NOF77
/NOG_FLOATING /I4 /NOMACHINE_CODE /OPTIMIZE

COMPILATION STATISTICS

Run Time:        2.20 seconds
Elapsed Time:    2.75 seconds
Page Faults:     542
Dynamic Memory:  322 pages

```
0001        C
0002              SUBROUTINE PASTE(IMIN,JMIN,IMAX,JMAX,IMINO,JMINO,IMAXO,JMAXO,N)
0003              IMPLICIT INTEGER*2(A-Z)
0004              INTEGER*2 INEW(4,75,10), LOC(4,10)
0005              COMMON /L2/INEW,LOC
0006        C
0007        C------
0008        C ** PASTE ** RECONSTRUCTS THE CHARACTER IMAGES OF BROKEN
0009        C    CHARACTERS.
0010        C------
0011        C
0012              ISHIFT = 0
0013              JSHIFT = 0
0014              NM1 = N - 1
0015        C
0016           IF(IMINO .LE. IMIN) GOTO 10
```

```
0017            ISHIFT = IMIN0 - IMIN
0018            LOC(1,NM1) = LOC(1,N)
0019      C
0020    10      IF(JMIN0 .LE. JMIN) GOTO 20
0021            JSHIFT = JMIN0 - JMIN
0022            LOC(2,NM1) = LOC(2,N)
0023      C
0024    20      IF(ISHIFT.EQ.0 .AND. JSHIFT.EQ.0) GOTO 50
0025            NR0 = IMAX0 - IMIN0 + 2
0026            NC0 = JMAX0 - JMIN0 + 2
0027            DO 40 I=NR0,2,-1
0028              DO 40 J=NC0,2,-1
0029                IF(BITN(I,J,NM1) .EQ. 0) GOTO 40
0030                II = I + ISHIFT
0031                JJ = J + JSHIFT
0032                CALL PBN(II,JJ,NM1,1)
0033                CALL PBN(I,J,NM1,0)
0034    40      CONTINUE
0035      C
0036            ISHIFT = 0
0037            JSHIFT = 0
0038      C
0039    50      IF(IMIN .LE. IMIN0) GOTO 60
0040            ISHIFT = IMIN - IMIN0
0041      C
0042    60      IF(JMIN .LE. JMIN0) GOTO 70
0043            JSHIFT = JMIN - JMIN0
0044      C
0045    70      NRN = IMAX - IMIN + 2
0046            NCN = JMAX - JMIN + 2
0047            DO 80 I=1,NRN
0048              DO 80 J=1,NCN
0049                IF(BITN(I,J,N) .EQ. 0) GOTO 80
0050                II = I + ISHIFT
0051                JJ = J + JSHIFT
0052                CALL PBN(II,JJ,NM1,1)
0053    80      CONTINUE
0054      C
0055            IF(IMAX .GT. IMAX0) LOC(3,NM1) = LOC(3,N)
0056            IF(JMAX .GT. JMAX0) LOC(4,NM1) = LOC(4,N)
0057            N = NM1
0058            RETURN
0059            END
```

```
PROGRAM SECTIONS

Name                     Bytes    Attributes

0  $CODE                   373    PIC CON REL LCL  SHR    EXE    RD NOWRT LONG
  1  $PDATA                    8    PIC CON REL LCL  SHR    NOEXE  RD NOWRT LONG
  2  $LOCAL                   88    PIC CON REL LCL  NOSHR  NOEXE  RD WRT LONG
  3  L2                     6080    PIC OVR REL GBL  SHR    NOEXE  RD WRT LONG

Total Space Allocated    6549

ENTRY POINTS

Address       Type   Name 0-00000000           PASTE

VARIABLES

Address       Type   Name      Address       Type   Name      Address       Type   Name 2-00000002    I*2    I         AP-0000000C@  I*2    IMAX      AP-000001C@   I*2    IMAXO
  AP-00000014@  I*2    IMIN      **            I*2    ISHIFT    2-00000004    I*2    J
  2-00000008    I*2    JJ        AP-00000020@  I*2    JMAXO     AP-00000008@  I*2    JMIN
  AP-00000018@  I*2    JMINO     AP-00000024@  I*2    N                       I*2    NCN
  **            I*2    NCO       **            I*2    NRN                     I*2    NRO

ARRAYS

Address       Type   Name      Bytes    Dimensions 3-00000000    I*2    INEW      6000     (4, 75, 10)
  3-00001770    I*2    LOC         80     (4, 10)

LABELS

Address       Label      Address       Label      Address       Label      Address       Label 0-0000003E    10         0-00000062    20         0-000000AF    40         0-000000C5    50         0-000000D2    60         0-000000DF    70
  0-00000125    80

FUNCTIONS AND SUBROUTINES REFERENCED

Type   Name

I*2    BITN
         PBN
```

COMMAND QUALIFIERS

FORTRAN/NOF77/NOOBJ/LIST PASTE.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:        1.85 seconds
Elapsed Time:    2.27 seconds
Page Faults:     562
Dynamic Memory:  379 pages

```
0001        C
0002              SUBROUTINE SIFT(M)
0003              INTEGER*2 LOC(4,10), INEW(4,75,10)
0004              INTEGER*4 IPERIM
0005              COMMON /L2/INEW,LOC
0006              COMMON /L4/ISEGFL
0007        C
0008        C ** SIFT ** DETERMINES WHETHER THE CHARACTER IMAGE ARRAY CONTAINS
0009        C A SINGLE CHARACTER OR A CONNECTED CHARACTER. IF A CONNECTED
0010        C CHARACTER IS DETECTED, ITS COORDINATES WITHIN THE COURTESY-AMOUNT
0011        C ARRAY ARE SENT TO THE FORCED-SEGMENTATION ROUTINES.
0012        C
0013              IMIN = LOC(1,M)
0014              JMIN = LOC(2,M)
0015              IMAX = LOC(3,M)
0016              JMAX = LOC(4,M)
0017              NR = IMAX - IMIN + 1
0018              NC = JMAX - JMIN + 1
0019        C
0020              WHR = NC * 1.0 / NR
0021        C
0022              TA = NR * NC * 1.0
0023        C
0024              IPERIM = 0
0025              IAREA = 0
0026              DO 10 I=2,NR+1
0027                DO 20 J=2,NC+1
0028                  IF(BITN(I  ,J  ,M).EQ.0) GOTO 20
0029                  IAREA = IAREA + 1
0030                  IF(BITN(I-1,J  ,M).EQ.0) GOTO 30
0031                  IF(BITN(I+1,J  ,M).EQ.0) GOTO 30
```

```
0032              IF(BITN(I  ,J-1,M).EQ.0) GOTO 30
0033              IF(BITN(I  ,J+1,M).EQ.0) GOTO 30
0034              GOTO 20
0035   30         IPERIM = IPERIM + 1
0036   20      CONTINUE
0037   10   CONTINUE
0038      C
0039         IRATIO = IPERIM**2 / IAREA
0040      C
0041         ARAT = IAREA / TA
0042      C
0043    C       WRITE(1,15) WHR,IPERIM,IAREA,IRATIO,ARAT
0044    C  D15  FORMAT(/,1X,'W/H =',F4.2,3X,'P =',I4,3X,
0045    C  D          2 'A =',I4,3X,'P**2/A =',I4,3X,'A/TA =',F5.3)
0046    C
0047         IF (IPERIM .GT. 190) GOTO 35
0048         IF (WHR .GE. 1.25 .AND. IRATIO .GE. 90) GOTO 35
0049         IF (WHR .GE. 1.35 .AND. ARAT.GT.0.39 .AND. IPERIM.GE.110) GOTO 35
0050         GOTO 100
0051    C
0052   35   CONTINUE
0053         CALL HTRANS(M,NR,NC,ICONFL)
0054         IF(ICONFL .EQ. 0) GOTO 100
0055    C
0056    C       WRITE(1,45) M
0057    C  D45  FORMAT(/,10X,' *** CONNECTED CHARACTER ***',I5)
0058    C
0059         CALL JNTLOC(IMIN,IMAX,JMIN,JMAX)
0060    C
0061   100  CONTINUE
0062         RETURN
0063         END
```

PROGRAM SECTIONS

| Name | Bytes | Attributes |   |   |   |   |   |   |
|---|---|---|---|---|---|---|---|---|
| 0 $CODE | 367 | PIC | CON | REL | LCL | SHR | EXE | RD NOWRT LONG |
| 2 $LOCAL | 124 | PIC | CON | REL | LCL | NOSHR | NOEXE | RD WRT LONG |
| 3 L2 | 6080 | PIC | OVR | REL | GBL | SHR | NOEXE | RD WRT LONG |
| 4 L4 | 4 | PIC | OVR | REL | GBL | SHR | NOEXE | RD WRT LONG |

Total Space Allocated    6575

ENTRY POINTS

| Address | Type | Name |
|---|---|---|
| 0-00000000 | | SIFT |

VARIABLES

| Address | Type | Name | Address | Type | Name | Address | Type | Name |
|---|---|---|---|---|---|---|---|---|
| ** | R*4 | ARAT | 2-00000018 | I*4 | I | ** | I*4 | IAREA | 2-00000020 | I*4 | ICONFL |
| 2-00000008 | I*4 | IMAX | 2-00000000 | I*4 | IMIN | ** | I*4 | IPERIM | ** | I*4 | IRATIO |
| 4-00000000 | I*4 | ISEGFL | 2-0000001C | I*4 | J | 2-0000000C | I*4 | JMAX | 2-00000004 | I*4 | JMIN |
| AP-00000004@ | I*4 | M | 2-00000014 | I*4 | NC | 2-00000010 | I*4 | NR | ** | R*4 | TA |
| ** | R*4 | WHR | | | | | | |

ARRAYS

| Address | Type | Name | Bytes | Dimensions |
|---|---|---|---|---|
| 3-00000000 | I*2 | INEW | 6000 | (4, 75, 10) |
| 3-00001770 | I*2 | LOC | 80 | (4, 10) |

LABELS

| Address | Label | Address | Label | Address | Label | Address | Label |
|---|---|---|---|---|---|---|---|
| ** | 10 | 0-000000FA | 20 | 0-000000F8 | 30 | 0-0000014C | 35 | 0-0000016E | 100 |

FUNCTIONS AND SUBROUTINES REFERENCED

| Type | Name | Type | Name |
|---|---|---|---|
| R*4 | BITN | | HTRANS | | JNTLOC |

COMMAND QUALIFIERS

FORTRAN/NOF77/NOOBJ/LIST SIFT.FTN
/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:        1.86 seconds
Elapsed Time:    2.19 seconds
Page Faults:     592
Dynamic Memory:  366 pages

```
0001        SUBROUTINE HTRANS(M,NR,NC,ICONFL)
0002        IMPLICIT INTEGER*2(A-Z)
0003        COMMON /LB/NTRIES
0004
0005  C
0006  C  ** HTRANS ** DETERMINES WHETHER A CHARACTER IMAGE CONTAINS A
0007  C  SINGLE OR A CONNECTED CHARACTER BY ANALYZING THE NUMBER OF 1-0
0008  C  TRANSITIONS IN THE HORIZONTAL DIRECTION.
0009  C
0010        ICONFL = 0
0011        ITR1 = 0
0012        ITR3 = 0
0013  C
0014        DO 10 I=2,NR+1
0015        ITR = 0
0016        PIX = 1
0017        DO 20 J=2,NC+1
0018        IF(BITN(I,J,M) .NE. PIX) GOTO 20
0019        IF(PIX .EQ. 0) GOTO 25
0020        ITR = ITR + 1
0021        PIX = 0
0022        GOTO 20
0023  C
0024  25    PIX = 1
0025  20    CONTINUE
0026        IF(ITR .EQ. 1) ITR1 = ITR1 + 1
0027        IF(ITR1 .GT. NR/2.5) GOTO 50
0028        IF(ITR .GT. 2) ITR3 = ITR3 + 1
0029        IF(ITR3 .GT. NR/5) GOTO 30
0030  10    CONTINUE
0031        IF(NTRIES .GT. 1) GOTO 50
0032  C
0033  30    ICONFL = 1
0034  50    CONTINUE
0035        RETURN
0036        END
```

PROGRAM SECTIONS

| Name | Bytes | Attributes | | | | | | | |
|---|---|---|---|---|---|---|---|---|---|
| 0 $CODE | 142 | PIC | CON | REL | LCL | SHR | EXE | RD | NOWRT LONG |
| 2 $LOCAL | 24 | PIC | CON | REL | LCL | NOSHR | NOEXE | RD | WRT LONG |
| 3 LB | 2 | PIC | OVR | REL | GBL | SHR | NOEXE | RD | WRT LONG |

Total Space Allocated    168

ENTRY POINTS

| Address | Type | Name |
|---|---|---|
| 0-00000000 | | HTRANS |

VARIABLES

| Address | Type | Name | Address | Type | Name | Address | Type | Name |
|---|---|---|---|---|---|---|---|---|
| 2-00000000 | I*2 | I | AP-0000010@ | I*2 | ICONFL | AP-0000004@ | I*2 | ITR | ** | I*2 | ITR1 |
| ** | I*2 | ITR3 | 2-00000004 | I*2 | J | ** | I*2 | M | AP-000000Ce | I*2 | NC |
| AP-0000008@ | I*2 | NR | 3-00000000 | I*2 | NTRIES | ** | I*2 | PIX | | | |

LABELS

| Address | Label | Address | Label | Address | Label | Address | Label |
|---|---|---|---|---|---|---|---|
| ** | 10 | 0-0000004B | 20 | 0-0000004B | 25 | 0-00000089 | 30 | 0-000008D | 50 |

FUNCTIONS AND SUBROUTINES REFERENCED

| Type | Name |
|---|---|
| I*2 | BITN |

COMMAND QUALIFIERS

FORTRAN/NOF77/NOOBJ/LIST HTRANS.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:       1.11 seconds
Elapsed Time:   1.55 seconds
Page Faults:    550
Dynamic Memory: 346 pages

```
0001       C------------------------------------------------------------
0002              SUBROUTINE JNTLOC(IMIN,IMAX,JMIN,JMAX)
0003              IMPLICIT INTEGER*2(A-Z)
0004              COMMON /L1/NW,NC
```

```
0005            COMMON /L4/ISEGFL,IPIXFL
0006            COMMON /L7/JLB,JUB1,JUB,NCOLS
0007     C------
0008     C   ** JNTLOC ** LOCATES THE JOINT OF CONNECTED CHARACTERS.
0009     C   IT SEARCHES FOR CORNER JOINTS AND FOR 1-PIXEL JOINTS.
0010     C------
0011            JFLAG = 0
0012            MIDPFL = 0
0013            NTIMES = 0
0014            IT = 0
0015            JT = 0
0016            I1 = 0
0017            J1 = 0
0018     C
0019            NR = NW * 16
0020            NROWS = IMAX - IMIN + 1
0021            NCOLS = JMAX - JMIN + 1
0022     C------
0023     C   INSERT PIXELS TO MAKE DIAGONAL RUN LENGTHS OVERLAP
0024     C   ORTHOGONALLY.
0025     C   1 0  -> 1 1 ,  0 1  -> 1 1
0026     C   0 1     0 1    1 0     1 0
0027     C------
0028            IF(IPIXFL .NE. 0) GOTO 9
0029            DO 7 J=2,NC-1
0030            DO 8 I=2,NR-1
0031            IF(BITO(I,J) .EQ. 0) GOTO 8
0032            IF(BITO(I+1,J) .EQ. 1) GOTO 8
0033            IF(BITO(I,J+1).EQ.0.AND.BITO(I+1,J+1).EQ.1) CALL PBO(I,J+1,1)
0034            IF(BITO(I,J-1).EQ.0.AND.BITO(I+1,J-1).EQ.1) CALL PBO(I,J-1,1)
0035     8      CONTINUE
0036     7      CONTINUE
0037            IPIXFL = 1
0038     C------
0039     C   CALCULATE BOUNDARIES OF AREA TO BE SCANNED.
0040     C------
0041     9      JLB = JMIN + NCOLS / 4
0042            JMP = JMIN + NCOLS / 2
0043            JUB = JMIN + 3 * NCOLS / 4
0044            JLB1 = JMIN + 3 * NCOLS / 8
0045            JUB1 = JUB + 3
0046            IUB = IMIN + NROWS / 4
0047            IMAX1 = IMAX
0048            JLB2 = JLB
0049     C
0050     5      J = JLB2
0051            DO 10 I=IMAX1,IMIN,-1
0052            IF(BITO(I,J) .EQ. 0) GOTO 10
0053            GOTO 20
0054     10     CONTINUE
0055     C
0056            TYPE 15
0057     15     FORMAT(/,1X,'** -- NO CHARACTERS IN DATA BUFFER')
```

```
0058              RETURN
0059       C
0060       20     IF(J .LE. JLB1) GOTO 30
0061              IF((BITO( I ,J-1).EQ.0) .OR. (BITO( I ,J+1).EQ.0)) GOTO 30
0062              IF((BITO(I+1, J ).EQ.1) .OR. (BITO(I-1, J ).EQ.1)) GOTO 22
0063              JZ = J
0064              GOTO 100
0065       22     IF((BITO(I+1,J+1).EQ.1) .OR. (BITO(I-1,J-1).EQ.1)) GOTO 24
0066              JZ = J - 1
0067              GOTO 100
0068       24     IF((BITO(I+1,J-1).EQ.1) .OR. (BITO(I-1,J+1).EQ.1)) GOTO 30
0069              JZ = J + 1
0070              GOTO 100
0071       C-----------------------------------------------
0072       C      CODE TO FOLLOW BOUNDARY OF CHARACTER
0073       C-----------------------------------------------
0074       30     IF(BITO(I+1, J ) .NE. 1) GOTO 40
0075              IF(BITO(I+1,J-1) .NE. 1) GOTO 35
0076              IF(J.GE.JMP .OR. NTIMES.GT.1) GOTO 120
0077              NTIMES = NTIMES + 1
0078              JL82 = J + 1
0079              GOTO 5
0080       35     I = I + 1
0081              GOTO 30
0082       C
0083       40     IF(BITO(I+1, J+1) .NE. 1) GOTO 50
0084              I = I + 1
0085              J = J + 1
0086              IF(J-1 .GT. JUB) GOTO 120
0087       C
0088              IIT = I - IT
0089              JJT = J - JT
0090              IF(IUB.LT.IT .OR. IT.EQ.0) GOTO 42
0091              IF((IIT.EQ.2 .AND. JJT.QT.2) .OR.
0092             2 (IIT.LT.6 .AND. JJT.QT.9)) GOTO 45
0093       42     IF(IIT.EQ.2 .AND. JJT.GT.6 .AND. JJT.LT.11) GOTO 45
0094              IF(JFLAG.EQ.1 .AND. IT.LT.I-1) GOTO 20
0095       C
0096       C      IT,JT ARE THE COORDINATES OF THE CORNER JOINT LOCATION
0097       C-----------------------------------------------
0098       45     IT = I - 1
0099              JT = J - 1
0100              JFLAG = 1
0101              GOTO 20
0102       C
0103       50     IF(BITO( I ,J+1) .NE. 1) GOTO 60
0104              J = J + 1
0105              IF(J .GT. JUB) GOTO 120
0106              GOTO 20
0107       C
0108       60     IF(BITO(I-1,J+1) .NE. 1) GOTO 70
0109
```

```
0110              I = I - 1
0111              J = J + 1
0112              IF(J .GT. JUB) GOTO 120
0113              GOTO 20
0114     C
0115      70      I = I - 2
0116              JL31 = J
0117              J = J + 1
0118              JFLAG = 0
0119     C
0120      80      IF(BITO(I,J) .EQ. 1) GOTO 50
0121              I = I - 1
0122              IF(I .LT. IMIN) GOTO 120
0123              IF(J .GT. JLB) J = J - 1
0124              GOTO 80
0125     C
0126     100      IZ = I - 1
0127     C
0128     C   ZEROUT ROUTINE TESTS VALIDITY OF JOINTS.
0129     C
0130              CALL ZEROUT(IZ,JZ,IMIN,JNTFLG)
0131     C
0132              IF(JNTFLG .NE. 1) GOTO 30
0133              I1 = I
0134              J1 = J
0135              GOTO 30
0136     C
0137     120      CONTINUE
0138              IF(IT .GT. 0) GOTO 130
0139              IF(I1 .GT. 0) GOTO 135
0140              IF(MIDPFL .EQ. 1) GOTO 150
0141     C-------
0142     C   HISTV IS ANOTHER ROUTINE USED TO LOCATE AND REMOVE JOINTS.
0143     C-------
0144              ISFL = 0
0145              CALL HISTV(IMIN,IMAX,JMIN,JMAX,ISFL)
0146              IF(ISFL .EQ. 1) GOTO 200
0147     C
0148              IMAX1 = NROWS / 2 + IMIN
0149              MIDPFL = 1
0150              GOTO 5
0151     C
0152     130      IF(I1 .EQ. 0) GOTO 140
0153              IF(IABS(IT-I1) .GT. 3) GOTO 140
0154              CALL PBO(I1,J1,0)
0155              ISEGFL = 1
0156              GOTO 200
0157     C
0158     140      CALL REMJNT(IT,JT,IMIN)
0159     C
0160              IF(ISEGFL .EQ. 1) GOTO 200
0161     150      ISFL = 1
```

```
0162            CALL HISTV(IMIN, IMAX, JMIN, JMAX, ISFL)
0163    C
0164    200     CONTINUE
0165            RETURN
0166            END
```

PROGRAM SECTIONS

| Name | Bytes | Attributes |
|---|---|---|
| 0 $CODE | 1350 | PIC CON REL LCL SHR EXE   RD NOWRT LONG |
| 1 $PDATA | 48 | PIC CON REL LCL SHR NOEXE RD NOWRT LONG |
| 2 $LOCAL | 212 | PIC CON REL LCL NOSHR NOEXE RD WRT LONG |
| 3 L1 | 4 | PIC OVR REL GBL SHR NOEXE RD WRT LONG |
| 4 L4 | 4 | PIC OVR REL GBL SHR NOEXE RD WRT LONG |
| 5 L7 | 8 | PIC OVR REL GBL SHR NOEXE RD WRT LONG |

Total Space Allocated  1626

ENTRY POINTS

| Address | Type | Name |
|---|---|---|
| 0-00000000 | | JNTLOC |

VARIABLES

| Address | Type | Name | Address | Type | Name | Address | Type | Name | Address | Type | Name |
|---|---|---|---|---|---|---|---|---|---|---|---|
| 2-00000010 | I*2 | I | 2-00000008 | I*2 | I1 | ** | I*2 | IIT | AP-00000008@ | I*2 | IMAX |
| 2-00000016 | I*2 | IMAX1 | AP-00000004@ | I*2 | IMIN | 4-00000002 | I*2 | IPIXFL | 4-00000000 | I*2 | ISEGFL |
| 2-00000022 | I*2 | ISFL | 2-00000004 | I*2 | IT | 2-00000014 | I*2 | IUB | 2-0000001E | I*2 | IZ |
| 2-0000000E | I*2 | J | 2-0000000A | I*2 | J1 | ** | I*2 | JFLAG | ** | I*2 | JJT |
| 5-00000000 | I*2 | JLB | 2-00000012 | I*2 | JLB1 | 2-00000018 | I*2 | JLB2 | AP-00000010@ | I*2 | JMAX |
| AP-0000000C@ | I*2 | JMIN | 5-00000002 | I*2 | JMP | 2-00000020 | I*2 | JNTFLG | 2-00000006 | I*2 | JT |
| 5-00000004 | I*2 | JUB | 5-00000006 | I*2 | JUB1 | 2-0000001C | I*2 | JZ | 2-00000000 | I*2 | MIDPFL |
| 3-00000002 | I*2 | NC | 3-00000000 | I*2 | NCOLS | ** | I*2 | NR | 2-0000000C | I*2 | NROWS |
| 2-00000002 | I*2 | NTIMES | | | NJ | | | | | | |

LABELS

| Address | Label | Address | Label | Address | Label | Address | Label |
|---|---|---|---|---|---|---|---|
| ** | 5 | ** | 7 | 0-00000124 | 8 | 0-00000139 | 9 |
| 0-00000188 | 20 | 0-00000224 | 22 | 0-00000274 | 24 | 0-000002D8 | 30 |
| 0-000001A8 | 42 | 0-000003BE | 45 | 0-000003CC | 50 | 0-000003F8 | 60 |
| 0-0000039D | 100 | 0-00000464 | 120 | 0-000004B4 | 130 | 0-000004C9 | 135 |
| 0-000002B6 | 200 | | | | | | |
| 0-00000523 | | | | | | | |

| Address | Label |
|---|---|
| 1-00000008 | 15 |
| 0-0000033C | 40 |
| 0-00000440 | 80 |
| 0-00000500 | 150 |

FUNCTIONS AND SUBROUTINES REFERENCED

| Type | Name | Type | Name | Type | Name | Type | Name | Type | Name |
|------|------|------|------|------|------|------|------|------|------|
| I*2 | BITO | | HISTV | | PBO | | REM.INT | | ZEROUT |

```
0001            SUBROUTINE REMJNT(IT,JT,IMIN)
0002            IMPLICIT INTEGER*2(A-Z)
0003            INTEGER*2 PRI(2,5)
0004            COMMON /L4/IBEGFL
0005            COMMON /L7/JLB,JUB1
0006      C
0007      C ** REMJNT ** REMOVES THE JOINT BETWEEN CONNECTED CHARACTERS
0008      C
0009            I90 = 1
0010            I45 = 1
0011            I135 = 1
0012            I60 = 1
0013            I120 = 1
0014      C
0015      C  CALCULATE THE LENGTH OF THE JOINTS LOCATED AT
0016      C  45, 60, 90, 120, AND 135 DEGREES FROM THE HORIZONTAL
0017      C
0018            K = -2
0019     10     K = K + 1
0020            IF(K .GT. 1) GOTO 30
0021            I = IT
0022            J = JT
0023            IF(K .EQ. 1) J = JT + 1
0024      C
0025     20     IF(BITO(I-1,J+K) .NE. 1) GOTO 10
0026            I = I - 1
0027            J = J + K
0028            IF(K) 24,25,26
0029      C
0030     24     I135 = I135 + 1
0031            GOTO 20
0032      C
0033     25     I90 = I90 + 1
0034            GOTO 20
0035      C
0036     26     I45 = I45 + 1
0037            GOTO 20
0038      C
0039     30     K = -3
0040            K = K + 2
0041            IF(K .GT. 1) GOTO 50
0042            I = IT
0043            J = JT
0044            N = 0
0045      C
```

```
0047        40   IF(BITO(I-1, J ).NE.1 .OR. BITO(I-1,J+K).NE.1) GOTO 35
0048             I = I - 1
0049             N = N + 1
0050             IF(K .EQ. -1) I120 = I120 + 1
0051             IF(K .EQ.  1) I60  = I60  + 1
0052             IF(N .LT. 2) GOTO 40
0053             N = 0
0054             J = J + K
0055             GOTO 40
0056      C
0057      C NOW CODE IN ORDER OF PRIORITY (SHORTEST JOINT GETS HIGHEST PRIORITY)
0058      C
0059        50   K = 1
0060             K90  = I90
0061             K45  = I45
0062             K135 = I135
0063             K60  = I60
0064             K120 = I120
0065      C
0066        55   IF(K .GT. 5) GOTO 80
0067             K90 = K90 - 1
0068             IF(K90 .NE. 0) GOTO 60
0069             PRI(1,K) = I90
0070             PRI(2,K) = 0
0071             K = K + 1
0072      C
0073        60   K45 = K45 - 1
0074             IF(K45 .NE. 0) GOTO 65
0075             PRI(1,K) = I45
0076             PRI(2,K) = 1
0077             K = K + 1
0078      C
0079        65   K135 = K135 - 1
0080             IF(K135 .NE. 0) GOTO 70
0081             PRI(1,K) = I135
0082             PRI(2,K) = -1
0083             K = K + 1
0084      C
0085        70   K60 = K60 - 1
0086             IF(K60 .NE. 0) GOTO 75
0087             PRI(1,K) = I60
0088             PRI(2,K) = 2
0089             K = K + 1
0090      C
0091        75   K120 = K120 - 1
0092             IF(K120 .NE. 0) GOTO 55
0093             PRI(1,K) = I120
0094             PRI(2,K) = -2
0095             K = K + 1
0096             GOTO 55
0097      C
0098        80   CONTINUE
```

```
0099  C
0100  D           WRITE(1,90) I90,I45,I135,I60,I120
0101  D90         FORMAT(/,3X,'I90=',I3,3X,'I45=',I3,3X,'I135=',I3,3X,'I60=',I3,3X,
0102  D          2           'I120=',I3)
0103  D           WRITE(1,95) N1,N2,N3,N4,N5
0104  D95         FORMAT(/,3X,'N1=',I3,3X,'N2=',I3,3X,'N3=',I3,3X,'N4=',I3,3X,'N5=',I3)
0105  C
0106  C     CHECK IF SMALLEST JOINT CAN BE REMOVED; IF YES THEN REMOVE IT,
0107  C     ELSE TRY THE NEXT SMALLEST JOINT, ECT...
0108  C-----------
0109              DO 100 L=1,5
0110                 II = PRI(1,L)
0111                 JJ = PRI(2,L)
0112                 IZ = IT - II
0113                 JZ = JT + (II * JJ)
0114                 IF(JJ .EQ. 1) JZ = JZ + 1
0115  C
0116                 IF(IABS(JJ) .LT. 2) GOTO 99
0117                 JZ = JT + (II-1)/JJ
0118                 IF(BITO(IZ,JZ) .NE. 0) JZ = JZ + JJ / 2
0119  C
0120              CALL ZEROUT(IZ,JZ,IMIN,JNTFLG)
0121  C
0122  99            IF(JNTFLG .EQ. 1) GOTO 110
0123  100         CONTINUE
0124              ISEGFL = 0
0125              GOTO 200
0126  C
0127  110         ISEGFL = 1
0128              I = IT
0129              J = JT
0130              IF(IABS(JJ) .GT. 1) GOTO 150
0131  C
0132  120         IF(JJ .EQ. 1) J = J + 1
0133              CALL PBO(I,J,0)
0134                 I = I - 1
0135                 J = J + (1 * JJ)
0136              IF(I .LE. (IT - II)) GOTO 200
0137  C
0138              IF(JJ) 125,135,130
0139  125         IF(BITO(I+1,J-1) .EQ. 0) CALL PBO(I+1,J-1,1)
0140              IF(BITO(I-1,J+1) .EQ. 0) CALL PBO(I-1,J+1,1)
0141              GOTO 135
0142  C
0143  130         IF(BITO(I-1,J-1) .EQ. 0) CALL PBO(I-1,J-1,1)
0144              IF(BITO(I+1,J+1) .EQ. 0) CALL PBO(I+1,J+1,1)
0145  C
0146  135         IF(BITO( I ,J-1) .EQ. 0) CALL PBO( I ,J-1,1)
0147              IF(BITO( I ,J+1) .EQ. 0) CALL PBO( I ,J+1,1)
0148  C
0149              GOTO 120
0150  C
```

```
0151            N = 0
0152       150  JJ = JJ / 2
0153            CALL PBO(I,J,0)
0154            I = I - 1
0155            N = N + 1
0156            IF(I .LE. (IT - II)) GOTO 200
0157     C
0158            IF(BITO( I ,J-JJ) .EQ. 0) CALL PBO( I ,J-JJ,1)
0159     C
0160            IF(N .LT. 2) GOTO 160
0161            N = 0
0162            J = J + JJ
0163     C
0164            IF(BITO( I ,J+JJ) .EQ. 0) CALL PBO( I ,J+JJ,1)
0165            IF(BITO(I+1,J+JJ) .EQ. 0) CALL PBO(I+1,J+JJ,1)
0166     C
0167       160  GOTO 160
0168     C
0169       200  CONTINUE
0170            RETURN
0171            END
```

PROGRAM SECTIONS

| Name | Bytes | Attributes |
|---|---|---|
| 0 $CODE | 1113 | PIC CON REL LCL SHR EXE RD NOWRT LONG |
| 1 $PDATA | 8 | PIC CON REL LCL SHR NOEXE RD NOWRT LONG |
| 2 $LOCAL | 148 | PIC CON REL LCL NOSHR NOEXE RD WRT LONG |
| 3 L4 | 2 | PIC OVR REL GBL SHR NOEXE RD WRT LONG |
| 4 L7 | 4 | PIC OVR REL GBL SHR NOEXE RD WRT LONG |

. Total Space Allocated     1275

ENTRY POINTS

| Address | Type | Name |
|---|---|---|
| 0-00000000 | | REMJNT |

VARIABLES

| Address | Type | Name | Address | Type | Name | Address | Type | Name |
|---|---|---|---|---|---|---|---|---|
| 2-00000016 | I*2 | I | 2-00000014 | I*2 | I120 | ** | I*2 | I135 | ** | I*2 | I45 |
| ** | I*2 | I60 | ** | I*2 | I90 | ** | I*2 | II | AP-0000000C | I*2 | IMIN |
| 3-00000000 | I*2 | ISEGFL | AP-00000040 | I*2 | IT | 2-0000001A | I*2 | IZ | 2-00000018 | I*2 | J |
| ** | I*2 | JJ | 4-00000000 | I*2 | JLB | 2-0000001E | I*2 | JNTFLG | AP-00000008 | I*2 | JT |
| 4-00000002 | I*2 | JUB1 | 2-0000001C | I*2 | JZ | ** | I*2 | K | ** | I*2 | K120 |
| ** | I*2 | K135 | ** | I*2 | K45 | ** | I*2 | K60 | ** | I*2 | K90 |
| ** | I*2 | L | ** | I*2 | N | | | | | | |

```
ARRAYS
          Address  Type  Name           Bytes  Dimensions
       2-00000000  I*2   PRI             20    (2, 5)

LABELS
     Address     Label    Address     Label    Address     Label    Address     Label    Address     Label
  0-0000001C      10    0-00000035      20    0-000000**    24    0-00000070      25    0-00000074      26
  0-0000007C      35    0-00000090      40    0-000000F0    50    0-00000104      55    0-0000011E      60
  0-0000014A      70    0-00000160      75    0-0000017C    80    0-000001D6      99    0-**            100
  0-0000021C     120    0-**           125    0-000002C4   130    0-00000336     135    0-00000390     150
  0-00000458     200

Address     Label
                                                               0-00000078      30
                                                               0-00000134      65
                                                               0-000001F8     110
                                                               0-00000398     160

FUNCTIONS AND SUBROUTINES REFERENCED

Type   Name               Type   Name               Type   Name
  I*2    BITO               C      PBO                       ZEROUT                          (59)

0001        C
0002              SUBROUTINE ZEROUT(I,J,IMIN,JNTFLG)
0003              IMPLICIT INTEGER*2(A-Z)
0004              COMMON /L7/JLB,JUB1
0005        C
0006        C  ** ZEROUT ** FOLLOWS 'O' PIXELS TO THE TOP OF THE IMAGE ARRAY.
0007        C     IT DETERMINES IF THE REMOVAL OF A JOINT WILL RESULT IN THE
0008        C     DISCONNECTION OF CONNECTED CHARACTERS.
0009        C
0010              IF(J.LT.JLB .OR. J.GT.JUB1) GOTO 60
0011              IF(BITO(I-1, J ) .NE. 0) GOTO 12
0012              I = I - 1
0013              IF(I .LE. IMIN) GOTO 70
0014              GOTO 10
0015        C
0016     12       IF(BITO(I-1,J-1) .NE. 0) GOTO 20
0017              J = J - 1
0018              I = I - 1
0019              IF(J .LT. JLB) GOTO 60
0020              IF(I .LE. IMIN) GOTO 70
0021              GOTO 10
0022        C
0023     20       IF(BITO(I-1,J+1) .NE. 0) GOTO 30
0024              I = I - 1
0025              J = J + 1
0026              IF(J .GT. JUB1) GOTO 60
0027              GOTO 10
0028        C
0029     30       IF(BITO( I ,J+1) .NE. 0) GOTO 40
0030              J = J + 1
```

```
0031              IF(J .GT. JUB1) GOTO 60
0032              GOTO 20
0033        C
0034   40         IF(BITO(I+1,J+1) .NE. 0) GOTO 50
0035              I = I + 1
0036              J = J + 1
0037              IF(J .GT. JUB1) GOTO 60
0038              GOTO 20
0039        C
0040   50         IF(BITO(I+1, J ) .NE. 0) GOTO 60
0041              I = I + 1
0042              GOTO 40
0043        C
0044   60         JNTFLG = 0
0045              GOTO 100
0046        C
0047   70         JNTFLG = 1
0048   100        CONTINUE
0049              RETURN
0050              END
PROGRAM SECTIONS

Name              Bytes   Attributes

0  $CODE              336    PIC CON REL LCL  SHR    EXE    RD  NOWRT LONG
 2  $LOCAL              12    PIC CON REL LCL  NOSHR  NOEXE  RD  WRT   LONG
 3  L7                   4    PIC OVR REL GBL  SHR    NOEXE  RD  WRT   LONG

Total Space Allocated    352

ENTRY POINTS

Address       Type  Name 0-00000000          ZEROUT

VARIABLES

Address       Type  Name         Address       Type  Name         Address       Type  Name AP-00000004@  I*2   X            AP-0000000C@  I*2   IMIN         AP-0000000B@  I*2   J            3-00000000    I*2   JLB
    AP-00000010@  I*2   JNTFLG       3-00000002          JUB1

LABELS

Address       Label          Address       Label          Address       Label          Address       Label

**            10             0-0000004C    12             0-00000090    20             0-000000C8    30             0-000000F4    40             0-00000128    50
    0-0000014C    60             0-000000B8    70             0-0000014F    100
```

FUNCTIONS AND SUBROUTINES REFERENCED

```
Type    Name

I*2     BITO
```

COMMAND QUALIFIERS:

FORTRAN/NOF77/NOOBJ/LIST FORSEG.FTN

```
/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE
```

COMPILATION STATISTICS

```
Run Time:        10.24 seconds
Elapsed Time:    10.84 seconds
Page Faults:     768
Dynamic Memory:  455 pages
```

```
0001        C-----------------------------------------------------------
0002                SUBROUTINE HISTV(IMIN,IMAX,JMIN,JMAX,ISFL)
0003                IMPLICIT INTEGER*2 (A-Z)
0004                BYTE HIST(2,65)
0005                COMMON /L4/ISEGFL
0006                COMMON /L7/JLB,JUB1,JUB,JC
0007        C-----------------------------------------------------------
0008        C  ** HISTV ** SEARCHES FOR COLUMNS IN THE CHARACTER WHICH CONTAIN
0009        C  ONLY ONE 1-0 TRANSITION. IF SUCH COLUMNS EXIST, THE ONE WITH
0010        C  THE LEAST NUMBER OF PIXELS IS TAKEN TO BE THE JOINT LOCATION.
0011        C
0012        C  IF A JOINT IS FOUND, THEN IT IS REMOVED.
0013        C
0014        C  IF A JOINT IS NOT FOUND AND ISFL=1, THEN THE CHARACTER IMAGE
0015        C  IS CUT IN THE MIDDLE. IF ISFL=0, THEN NOTHING IS DONE.
0016        C
0017        C  HIST(1,*) = NO. OF PIXELS / COLUMN
0018        C  HIST(2,*) = NO. OF 0-1 TRANSITIONS / COLUMN
0019        C
0020        C-----------------------------------------------------------
0021                DO 10 J=JMIN,JMAX
0022                K = J - JMIN + 1
0023                HIST(1,K) = 0
0024                HIST(2,K) = 0
0025                NTRF = 0
0026                DO 15 I=IMIN,IMAX+1
0027                IF(BITO(I,J) .EQ. 1) GOTO 20
```

```
0028              IF(NTRF .EQ. 0) GOTO 15
0029              HIST(2,K) = HIST(2,K) + 1
0030              NTRF = 0
0031              GOTO 15
0032         15   HIST(1,K) = HIST(1,K) + 1
0033              NTRF = 1
0034         10   CONTINUE
0035      C       CONTINUE
0036      C
0037      C       WRITE(1,25)
0038      D25     FORMAT(/,5X,'----------+---------+---------+---------')
0039      D       DO 30 J=1,K
0040      D         INC = HIST(1,J)
0041      D         NTR = HIST(2,J)
0042      D         WRITE(1,35) J,NTR
0043      D35     FORMAT(2X,I3,<INC>X,I1)
0044      D30   CONTINUE
0045      C
0046              DO 40 KK=1,K
0047                IF(HIST(1,KK) .GT. 9) GOTO 45
0048         40   CONTINUE
0049              GOTO 70
0050      C
0051         45   DO 50 LL=K,KK,-1
0052                IF(HIST(1,LL) .GT. 9) GOTO 55
0053         50   CONTINUE
0054              GOTO 70
0055      C
0056         55   IRL = 9
0057              JX = 0
0058              DO 60 J=KK,LL
0059                IF(HIST(2,J) .NE. 1) GOTO 60
0060                IF(HIST(1,J) .GT. IRL) GOTO 60
0061                IRL = HIST(1,J)
0062                JX = JMIN + J - 1
0063         60   CONTINUE
0064              IF(JX .GT. 0) GOTO 95
0065      C
0066         70   IF(ISFL .EQ. 0) GOTO 200
0067              JK = JC / 2
0068              JX = JMIN + JK
0069              JL = JLB - JMIN
0070              JU = JUB - JMIN
0071      C
0072              DO 80 J=JL,JU
0073                IF(HIST(2,J) .GT. 1) GOTO 80
0074                JX = JMIN + J - 1
0075                GOTO 95
0076         80   CONTINUE
0077      C
0078              DO 90 J=JK,JU
```

```
0079              IF(HIST(2,J) .GT. 2) GOTO 90
0080              JX = JMIN + J - 1
0081              GOTO 95
0082  90       CONTINUE
0083      C-----
0084      C     SEGMENT CHARACTERS BY CHANGING ALL BLACK PIXELS TO WHITE IN THE
0085      C     COLUMN WHERE THE JOINT WAS FOUND.
0086      C-----
0087  95       ISFL = 1
0088           DO 100 I=IMAX,IMIN,-1
0089              IF(BITO(I,JX) .EQ. 0) GOTO 100
0090              CALL PBO(I,JX,0)
0091  100      CONTINUE
0092           ISEGFL = 1
0093      C
0094  200    CONTINUE
0095           RETURN
0096           END
```

PROGRAM SECTIONS

| Name | Bytes | Attributes | | | | | | |
|---|---|---|---|---|---|---|---|---|
| 0  $CODE   | 389 | PIC | CON | REL | LCL | SHR   | EXE   | RD NOWRT LONG |
| 1  $PDATA  | 4   | PIC | CON | REL | LCL | SHR   | NOEXE | RD NOWRT LONG |
| 2  $LOCAL  | 188 | PIC | CON | REL | LCL | NOSHR | NOEXE | RD WRT LONG |
| 3  L4      | 2   | PIC | OVR | REL | GBL | SHR   | NOEXE | RD WRT LONG |
| 4  L7      | 8   | PIC | OVR | REL | GBL | SHR   | NOEXE | RD WRT LONG |

Total Space Allocated    591

ENTRY POINTS

| Address | Type | Name |
|---|---|---|
| 0-00000000 | | HISTV |

VARIABLES

| Address | Type | Name | Address | Type | Name | Address | Type | Name |
|---|---|---|---|---|---|---|---|---|
| 2-00000086 | I*2 | I      | AP-00000008@ | I*2 | IMAX | AP-0000004@ | I*2 | IMIN | ** | I*2 | IRL |
| 3-00000000 | I*2 | ISEGFL | AP-00000014@ | I*2 | ISFL | 2-00000082   | I*2 | J    | 4-00000006 | I*2 | JC |
| **         | I*2 | JK     | **           | I*2 | JL   | 4-00000000   | I*2 | JLB  | AP-00000010@ | I*2 | JMAX |
| AP-0000000C@ | I*2 | JMIN | **         | I*2 | JU   | 4-00000004   | I*2 | JUB  | 4-00000002 | I*2 | JUB1 |
| 2-0000008C | I*2 | JX     | **           | I*2 | K    | **           | I*2 | KK   | ** | I*2 | LL |
| ** | I*2 | NTRF |

ARRAYS

```
  Address     Type  Name            Bytes  Dimensions 2-00000000    L*1   HIST             130   (2, 65)

LABELS

Address  Label    Address     Label    Address     Label    Address     Label    Address     Label
      **     10  0-00000060        15  0-00000058        20  **             40  0-000000BC        45   **           50
  0-000000A8  55  0-000000D6        60  0-000000E1        70  0-00000128     80  0-0000014C        90   0-00000152   95
  0-00000174 100  0-00000184       200

FUNCTIONS AND SUBROUTINES REFERENCED

Type  Name        Type  Name
  I*2   BITO              PBO

COMMAND QUALIFIERS

FORTRAN/NOF77/NOOBJ/LIST HIST.FTN

/CHECK=(NOBOUNDS,OVERFLOW,NOUNDERFLOW)
/DEBUG=(NOSYMBOLS,TRACEBACK)
/STANDARD=(NOSYNTAX,NOSOURCE_FORM)
/SHOW=(NOPREPROCESSOR,NOINCLUDE,MAP,NODICTIONARY,SINGLE)
/WARNINGS=(GENERAL,NODECLARATIONS)
/CONTINUATIONS=19  /NOCROSS_REFERENCE  /NOD_LINES  /NOEXTEND_SOURCE  /NOF77
/NOG_FLOATING  /I4  /NOMACHINE_CODE  /OPTIMIZE

COMPILATION STATISTICS

Run Time:        2.22 seconds
Elapsed Time:    2.54 seconds
Page Faults:     554
Dynamic Memory:  391 pages
```

What is claimed is:

1. A process of segmenting data bits derived in response to scanning characters, comprising the steps of:
   (a) isolating a descrete group of said data bits which may be associated with more than one character;
   (b) examining said discrete group of data bits according to predetermined criteria in search for a Possible joint between first and second groups of data bits within said group;
   (c) selecting a segmentation vector according to second predetermined criteria to separate said first and second groups of data bits; and
   (d) separating said first and second groups of data bits at said joint along a selected said segmentation vector;
   said data bits consisting of binary ones and zeros and said selecting step including the step of:
   (c-1) finding the length of the shortest segmentation vector consisting of binary ones which lies within a predetermined range and which also provides a path of binary zero from the outward end of said segmentation vector to a predetermined side of the associated object;
   said predetermined range being given by the equation:

$MP-MP/2 \leq R \leq (MP+MP/2)$;

wherein MP is equal to the midpoint of said discrete group of data bits and R is equal to said predetermined range.

2. The process as claimed in claim 1 in which said process includes the step of
   (e) repeating steps a, b, c, c-1, and d on thefirst and second groups of data bits obtained from step d.

3. A process of facilitating character recognition associated with image data derived in response to scanning characters, said image data being in the form of a plurality of records comprised of binary ones and zeroes corresponding to at least portions of images of said characters, said process comprising the steps of:
   (a) grouping said records into objects, with each said object ostensibly corresonding to at least one character;
   (b) isolating those of said objects which ostensibly contain at least two characters;
   (c) examining a said object from step b according to predetermined criteria in search for a possible joint between first and second groups of image data within said object;
   (d) selecting a segmentation vector according to second predetermined criteria to separate said first and second groups of image data at said joint;
   (e) separating said first and second groups of image data at said joint along a segmentation vector selected from step d to form discrete objects; and
   (f) forwarding said objects from step a and from step e to character recognition circuitry to effect character recognition;
   said examining step including the step of:
   (c-1) searching for said possible joint in a predetermined range which is determined from the physical size of the image data associated with said object;
   said predetermined range being given by the equation:

$MP-MP/2 < R < (MP+MP/2)$;

wherein MP is equal to the midpoint of said discrete group of data bits and R is equal to said predetermined range;
   said searching step including the step of:
   (c-2) using masks to search for particular patterns of binary ones and zeros which are indicative of a possible joint;
   said searching step being effected along columns of said image data, with said columns of image data having the same orientation as said characters which are scanned; and
   said selecting step including the step of:
   (d-1) finding the length of the shortest segmentation vector consisting of binary ones which lies within said predetermined range.

4. The process as claimed in claim 3 in which said selecting step includes the step of:
   (d-2) finding the length of the shortest segmentation vector consisting of binary ones which lies within said predetermined range and which also provides a path of binary zeros from the outward end of sid segmentation vector to a predetermined side of the associated object.

5. The process as claimed in claim 3 in which said finding step is effected by orienting said segmentation vector at predetermined angles with respect to said columns of image data.

6. The process as claimed in claim 5 in which said finding step is effected by orienting said segmentation vector at angles of 90, 45, 135, 60, and 120 degrees in that order; said angles of 90, 45, 135, 60, and 120 degrees being designated by the customary trigonometric designation and said columns of image data being aligned with said angle of 90 degrees.

7. A character recognition process comprising the steps of:
   (a) scanning a document having characters thereon to generate binary image data corresponding to said characters;
   (b) presenting said binary image data associated with a document in the form of discrete objects, with each said object being comprised of a matrix of data bits and with each said object ostensibly corresponding to at least one of said characters;
   (c) isolating those of said objects which ostensibly contain at least two characters;
   (d) moving an examining window relating to one of said objects from step c to search according to predetermined criteria for a possible joint between first and second sub-groups of data bits within a predetermined range of said object;
   (e) separating said first and second subgroups of data bits at a said joint when found to form discrete objects; and
   (f) forwarding said objects from steps b and e to character recognition apparatus to effect character recognition;
   said predetermined range being given by the equation;

$MP-MP/2 < R < (MP+MP/2)$;

wherein MP is equal to the midpoint of said discrete group of data bits and R is equal to said predetermined range;

said separating step including the step of:
(e-1) selecting a segmentation vector according to second predetermined criteria to separate said first and second sub-groups of data bits within said object;
said data bits consisting of binary ones and zeros and said selecting step including the step of:
(e-2) finding the length of the shortest segmentation vector consisting of binary ones which lies within said predetermined range and which also provides a path of binary zeros from the outward end of said segmentation vector to a predetermined side of the associated object.

8. An apparatus for facilitating character recognition associated with image data derived in response to scanning characters, said image data being in the form of a plurality of records comprised of binary ones and zeroes corresponding to at least portions of images of said characters, said apparatus comprising:
means for grouping said records into objects, with each said object ostensibly corresponding to at least one character;
means for isolating those of said objects which ostensibly contain at least two characters;
means for examining a said object from said isolating means according to predetermined criteria in search for a possible joint between first and second groups of data within said object;
means for selecting a segmentation vector according to second predetermined criteria to separate said first and second groups of data at said joint;
means for separating said first and second groups of data at said joint along a segmentation vector selected from said selecting means to form discrete objects; and
means for forwarding said objects from said grouping means and from said separating means to a character recognition processor to effect character recognition;
said isolating means including means for testing predetermined physical parameters of the image data associated with said objects against derived values;
said testing means including masks to search for particular patterns of binary ones and zeros which are indicative of a possible joint; and
said selecting means including means for finding the length of the shortest segmentation vector consisting of binary ones which lies within a predetermined range and which also provides a path of binary zeros from the outward end of said segmentation vector to a predetermined side of the associated object;
said predetermined range being given by the equation:

$$MP-MP/2 \leq R \leq (MP+MP/2);$$

wherein MP is equal to the midpoint of said discrete group of data bits and R is equal to said predetermined range.

* * * * *

UNITED STATES PATENT AND TRADEMARK OFFICE
CERTIFICATE OF CORRECTION

PATENT NO. : 4,680,803
DATED : July 14, 1987
INVENTOR(S) : Antonio Dilella

It is certified that error appears in the above—identified patent and that said Letters Patent is hereby corrected as shown below:

Column 129, line 8, delete "Possible" and substitute
--possible--.

Column 129, line 21, delete "zero" and substitute
--zeros--.

Column 130, line 21, delete "sid" and substitute
--said--.

Signed and Sealed this

Seventeenth Day of November, 1987

Attest:

DONALD J. QUIGG

Attesting Officer       Commissioner of Patents and Trademarks